(12) United States Patent
Sadahiro et al.

(10) Patent No.: US 9,030,736 B2
(45) Date of Patent: May 12, 2015

(54) REFLECTION SCREEN AND IMAGE DISPLAY SYSTEM

(71) Applicant: Dai Nippon Printing Co., Ltd., Tokyo (JP)

(72) Inventors: Tetsuya Sadahiro, Shinjuku-Ku (JP); Kazunobu Ogawa, Shinjuku-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 13/967,456

(22) Filed: Aug. 15, 2013

(65) Prior Publication Data

US 2014/0092471 A1    Apr. 3, 2014

(30) Foreign Application Priority Data

Sep. 28, 2012 (JP) .................................. 2012-217226
Jun. 20, 2013 (JP) .................................. 2013-130019

(51) Int. Cl.
*G03B 21/60*    (2014.01)
(52) U.S. Cl.
CPC .................................... *G03B 21/60* (2013.01)
(58) Field of Classification Search
CPC ...................................................... G03B 21/60

USPC .................................................. 359/449, 459
See application file for complete search history.

(56) References Cited

U.S. PATENT DOCUMENTS

| 7,826,135 B2 * | 11/2010 | Destain et al. ................ 359/449 |
| 7,990,614 B2 * | 8/2011 | Chou ............................ 359/459 |
| 2003/0039030 A1 * | 2/2003 | Myers ........................... 359/449 |

FOREIGN PATENT DOCUMENTS

JP    2008-076523 A1    4/2008

* cited by examiner

*Primary Examiner* — Christ Mahoney
(74) *Attorney, Agent, or Firm* — Burr & Brown, PLLC

(57) ABSTRACT

A reflection screen includes: a reflection layer provided on the back side and adapted to reflect light; and a surface shape layer provided on the reflection layer, at the image source side relative to the reflection screen, the surface shape layer having a plurality of unit optical shapes arrayed and deflecting image light toward the reflection layer side. The unit optical shape satisfies, in a section along the array direction of the unit optical shapes and orthogonal to a screen plane, the relationship of α+2φ−θ>90°, where θ is an angle that a total reflection surface makes with a plane parallel to the screen plane, φ is an angle that an incidence surface makes with a normal direction to the screen plane, and α is an angle that light incident on the incidence surface makes with the normal direction to the screen plane.

3 Claims, 21 Drawing Sheets

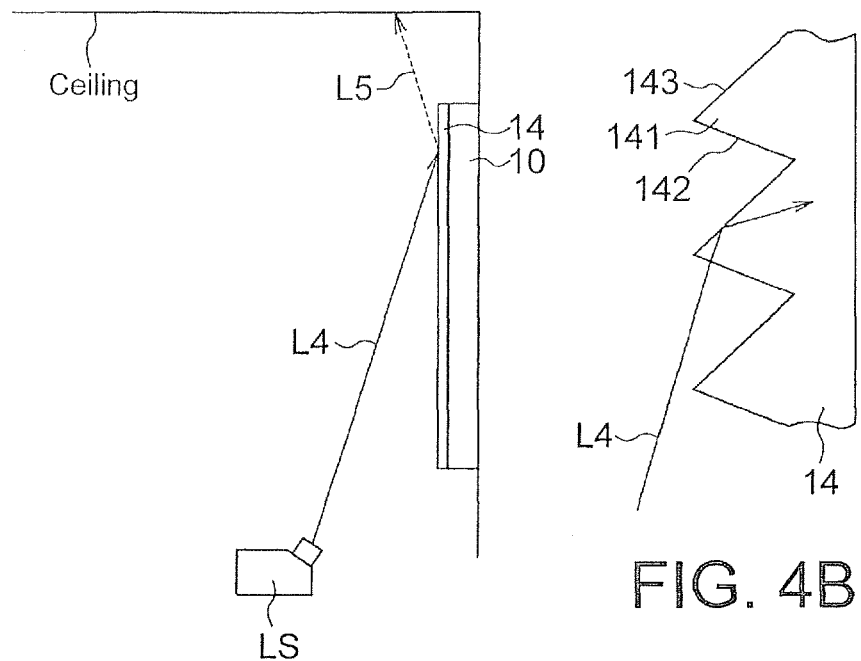
FIG. 4A
FIG. 4B
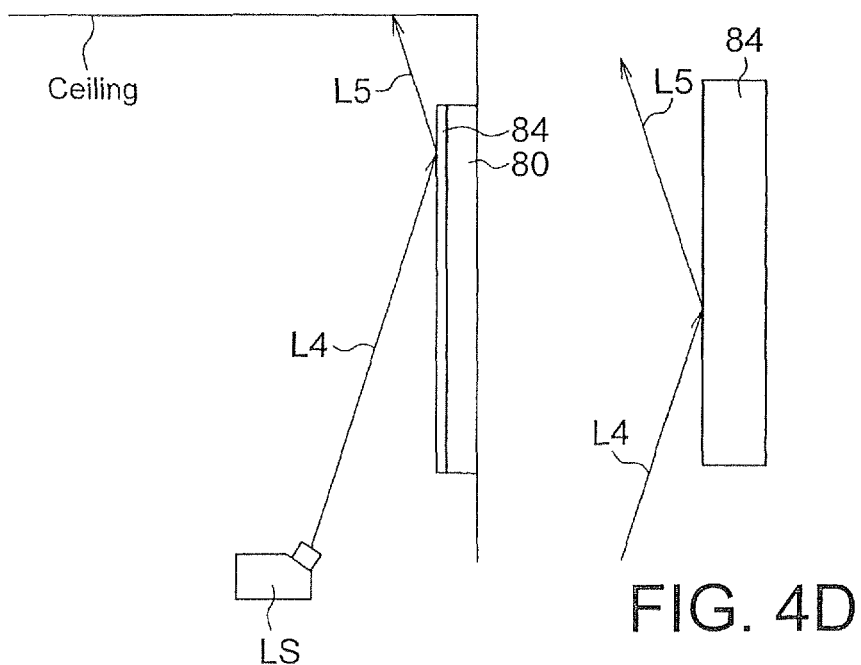
FIG. 4C
FIG. 4D

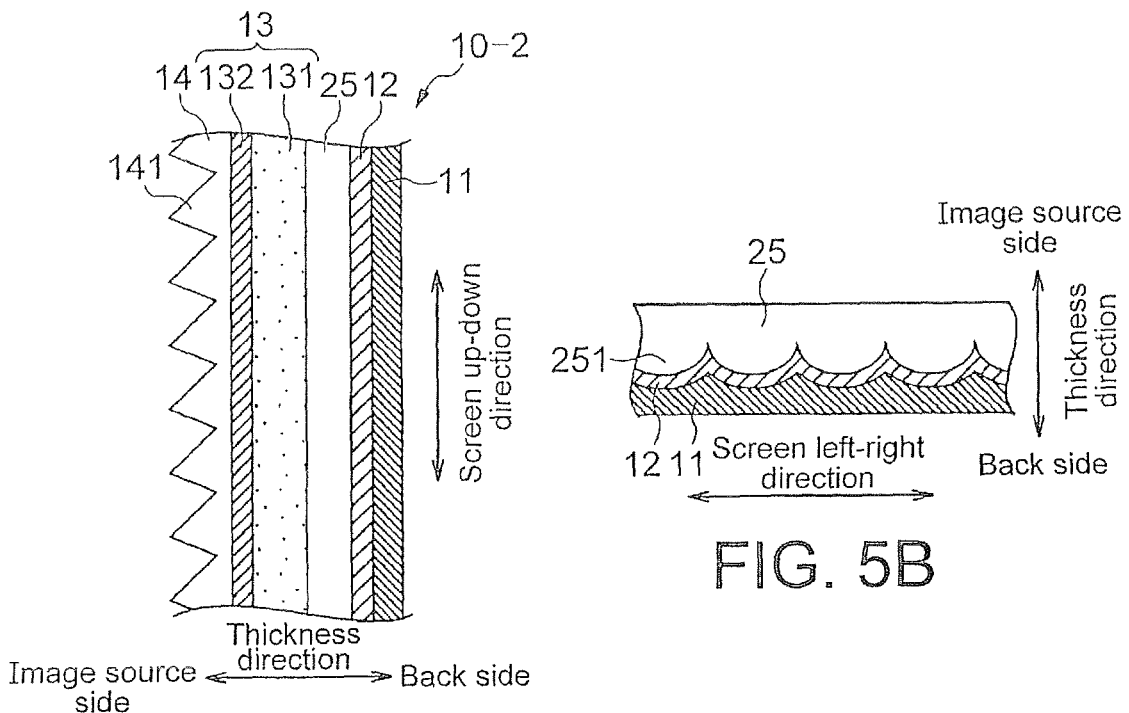
FIG. 5A
FIG. 5B
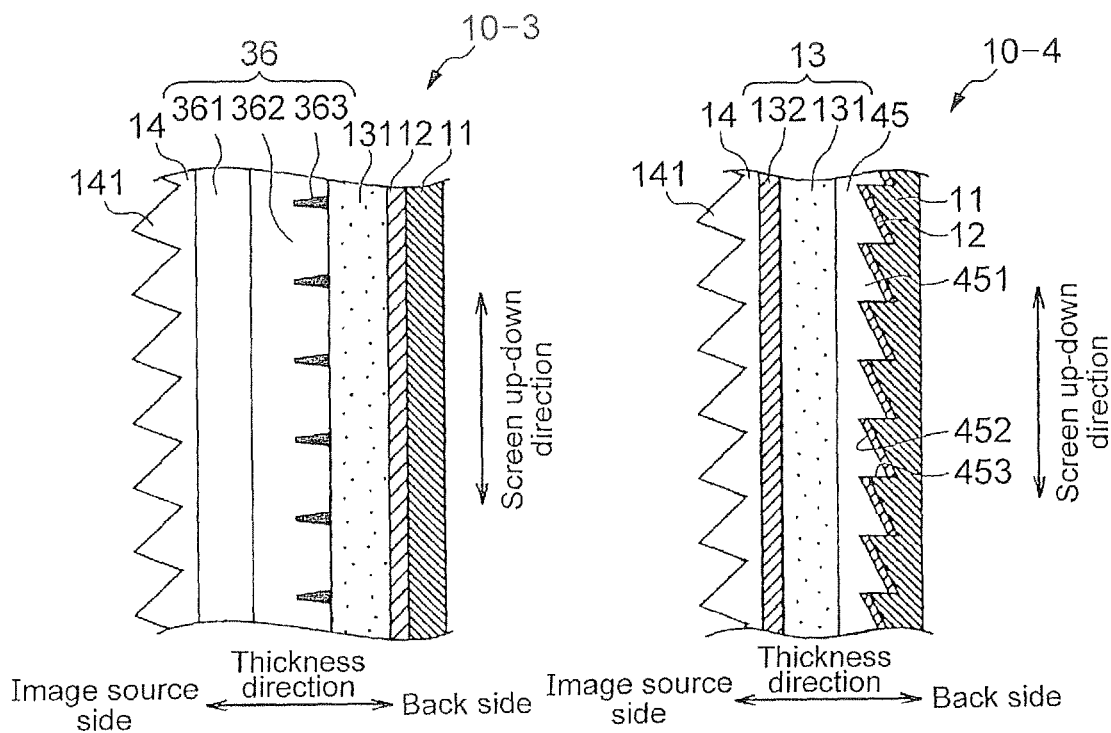
FIG. 5C
FIG. 5D

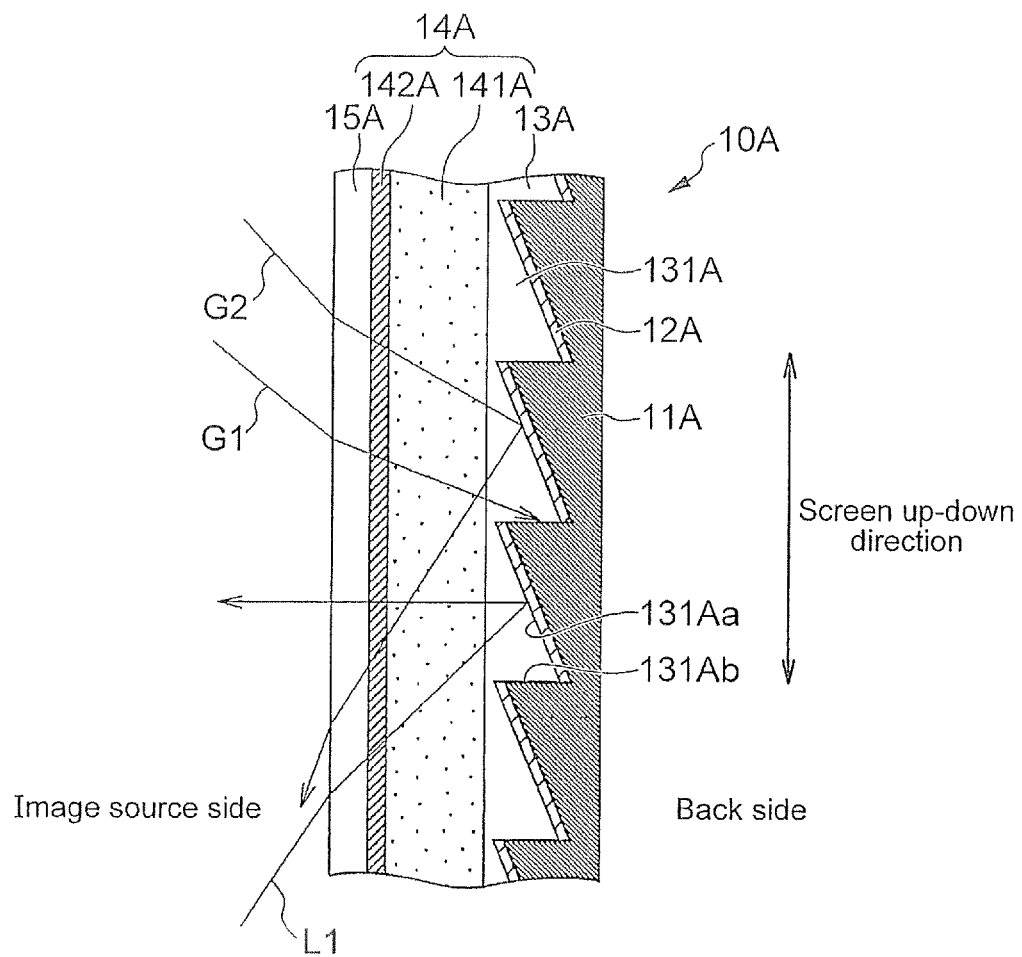
FIG. 11A
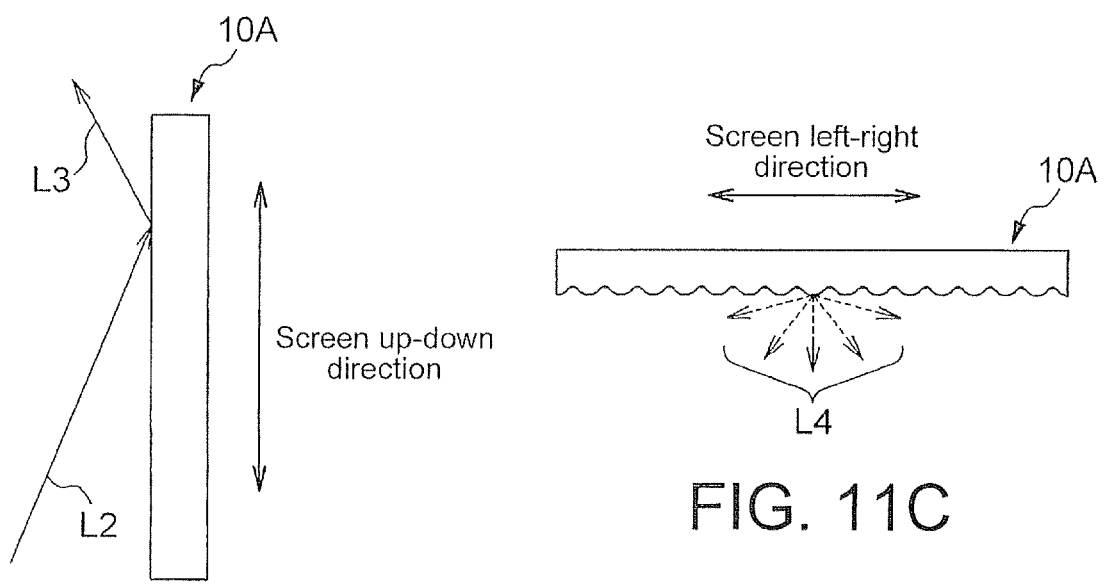
FIG. 11B
FIG. 11C

Region A $\theta 2 = \theta 3$

Region B $\theta 2 < \theta 3$

Region C $\theta 2 > \theta 3$

REFLECTION SCREEN AND IMAGE DISPLAY SYSTEM

CROSS REFERENCE TO RELATED APPLICATIONS

This application claims the benefit of Japanese Patent Application No. 2012-33963, filed on Feb. 20, 2012, Japanese Patent Application No. 2012-217226, filed on Sep. 28, 2012, and Japanese Patent Application No. 2013-130019, filed on Jun. 20, 2013. The entire disclosures of these prior applications are incorporated herein by reference.

BACKGROUND OF THE INVENTION

1. Field of the Invention

The present invention relates to a reflection screen adapted to reflect image light, projected from an image source, so as to display an image in a viewable manner, and to an image display system including the same.

2. Description of the Related Art

As an image source for projecting an image onto a reflection screen, there have widely been used, for example, short focus type image projection devices (projectors) which project image light from a very short distance at a comparatively large angle of incidence so as to realize a large screen display.

Such a short focus type image projection device can project image light onto a reflection screen from above or below at a larger incidence angle, as compared with image sources according to the related art. In addition, the distance between the image projection device and the reflection screen in the depth direction can be shortened. Therefore, the short focus type image projection device can contribute to space saving or the like in an image display system using a reflection screen.

In order to achieve favorable display of the image light projected by such a short focus type image projection device, there have been developed various reflection screens and the like which include a reflection layer formed on the surface of a lens layer having a linear Fresnel lens shape or circular Fresnel lens shape composed by arraying a plurality of unit lenses (see, for example, Japanese Patent Laid-open No. 2008-76523, hereinafter referred to as Patent Document 1).

SUMMARY

In recent years, attendant on the trends toward reflection screens of larger screen sizes and space savings in image display systems, the angle of projection of image light has been enlarged. In a reflection screen having a smooth surface on the image source side, therefore, part of the image light projected from below to be incident on the reflection screen may be reflected by the image-source-side surface, to reach the ceiling. Thus, there has been the problem of reflection of images onto the ceiling.

Such reflection of images onto the ceiling is worsened especially in a dark room, since the ceiling area of the reflected image is conspicuously bright. In addition, where the projected image is motion video, the motion video would appear also on the ceiling area, even though obscured. Consequently, pleasant viewing of the image projected on the reflection screen is hampered.

None of the reflection screens according to the related art has been improved as to the reflection of images onto the ceiling. Besides, the above-mentioned Patent Document 1 does not disclose any countermeasure against the reflection of images onto the ceiling.

Thus, there is a need for a reflection screen capable of minimizing the reflection of images onto the ceiling and capable of displaying a favorable image, and for an image display system including the same.

According to the present invention, the above-mentioned need can be fulfilled by the followings. Incidentally, while the following description will be made using reference signs corresponding to components in the embodiments of the present invention, this is not restrictive of the invention but is for easier understanding of the invention.

According to an embodiment of the present invention, there is provided: a reflection screen (10) adapted to reflect image light projected from an image source to display an image in a viewable manner, the reflection screen comprising: a reflection layer (12) provided on a back side of the reflection screen, the reflection layer adapted to reflect light; and a surface shape layer provided on the reflection screen on the side of the image source relative to the reflection layer, the surface shape layer having a plurality of unit optical shapes (141) arrayed at a surface on the image source side, the surface shape layer adapted to deflect the image light toward the reflection layer side; wherein the unit optical shapes each have a sectional shape in section in a direction orthogonal to a screen plane in a direction where the unit optical shapes are arrayed, the sectional shape being a substantially triangular shape protuberant toward the image source side; wherein the unit optical shapes each have an incidence surface (142) on which the light is incident, and a total reflection surface (143) on which at least part of the light coming from the incidence surface is totally reflected to go toward the back side; and wherein the unit optical shape satisfies, in the section, the relationship of:

$$\alpha + 2\phi - \theta > 90°,$$

where $\theta$ is an angle that the total reflection surface (143) makes with a plane parallel to the screen plane, $\phi$ is an angle that the incidence surface (142) makes with a normal direction to the screen plane, and $\alpha$ is an angle that the light incident on the incidence surface makes with the normal direction to the screen plane.

In the above-mentioned reflection screen (10), preferably, the reflection screen includes at least one layer having at least one function selected from among a light-diffusing function, a light-absorbing function, and a light-transmitting function, between the reflection layer (12) and the surface shape layer (14).

According to another embodiment of the present invention, there is provided an image display system (1) including: the above-mentioned reflection screen (10); and an image source (LS) adapted to project image light onto the reflection screen According to a further embodiment of the present invention, there is provided a reflection screen (10A) adapted to reflect image light (L) projected from an image source (LS) to display an image in a viewable manner, the reflection screen comprising: a lens layer provided on a back side thereof with a Fresnel lens shape having an array of a plurality of unit lenses (13A) provided on the back side, the unit lenses each having a lens surface (131Aa) and a non-lens surface (131Ab) and being protuberant toward the back side; a reflection layer (12A) adapted to reflect light, the reflection layer formed at least on the lens surfaces of the unit lenses; and a surface lens layer (15A) disposed on the reflection screen on the side of the image source, the surface lens layer having a lenticular lens shape provided on the image source side, the lenticular lens shape provided at an image-source-side surface thereof with a plurality of unit surface lenses (151A) each protuberant toward the image source side, the unit surface lenses being arrayed in a screen left-right direction of the reflection screen, with their longitudinal direction set in the screen up-down direction of the reflection screen; wherein the Fresnel lens shape has an optical center (C) located outside of a screen of the reflection screen; and the unit surface lenses are each so shaped that the width (W2) thereof in the array direction is not less than the height (h2) thereof.

In the above-mentioned reflection screen (10A), preferably,
the unit surface lens (151A) is so configured that,
in a section parallel to the array direction thereof and parallel to a thickness direction of the reflection screen,
an angle ($\theta 1$) that a tangent to a bottom-side surface of the unit surface lens (151A) makes with the screen plane is greater than an angle ($\theta 2$) that a tangent to an apex-side surface of the unit surface lens makes with the screen plane, and
a variation, per a predetermined length, of the angle that the tangent to the bottom-side surface of the unit surface lens is greater than a variation, per the predetermined length, of the angle that the tangent to the apex-side surface of the unit surface lens makes with the screen plane.

In the above-mentioned reflection screen (10A), preferably, recesses (152A) recessed away from the image source side are each formed between the unit surface lenses (151A).

In the above-mentioned reflection screen (10A), preferably, an image-source-side surface of the surface lens layer (15A) is formed with a minutely rugged (minutely recessed-and-projected) shape.

In the above-mentioned reflection screen (10A), preferably, the surface lens layer has a hard coating function.

In the above-mentioned reflection screen (10A), preferably, the Fresnel lens shape is a circular Fresnel lens shape.

In the above-mentioned reflection screen (10A), preferably, at least the non-lens surface (131Ab) is formed with a light absorption layer (11A) adapted to absorb light.

In the above-mentioned reflection screen (10A), preferably, the reflection screen includes at least one of a light diffusion layer (141A) adapted to diffuse light and a colored layer (142A) colored in a predetermined density, on the image source side relative to the lens layer (12A).

According to yet another embodiment of the present invention, there is provided an image display system (1A) including: the above-mentioned reflection screen (10A); and an image source (LS) adapted to project image light onto the reflection screen.

According to a yet further embodiment of the present invention, there is provided a reflection screen (10B, 20B) adapted to reflect image light projected from an image source (LS) to display an image in a viewable manner, the reflection screen comprising: a lens layer (13B) provided on a back side of the reflection screen with a Fresnel lens shape having an array of a plurality of unit lenses (131B) provided on the back side, the unit lenses each having a lens surface (132B) and a non-lens surface (133B) and being protuberant toward the back side; a reflection layer (12B) adapted to reflect light, the reflection layer formed at least on the lens surfaces of the unit lenses; and a surface optical layer (15B, 25B) provided on the reflection screen on the side of the image source, the surface optical layer provided on an image-source-side surface of the reflection screen with a plurality of unit optical elements (151B, 251B) each having a columnar shape protuberant toward the image source side, the unit optical elements arrayed in one direction along a screen plane of the reflection screen; wherein the unit optical elements each are substantially triangular in sectional shape in a section parallel to a direction in which the unit optical elements are arrayed and to a thickness direction of the reflection screen.

In the above-mentioned reflection screen (10B), preferably, the unit optical elements (151B) are arrayed in the screen left-right direction, with their longitudinal direction set in the screen up-down direction.

In the above-mentioned reflection screen (10B), preferably, the unit optical element (151B) is so shaped that the sectional shape thereof is substantially an isosceles triangular shape at a screen left-right-directional center of the reflection screen, and the sectional shape is varied gradually or stepwise into a scalene triangular shape toward both screen left-right-directional ends of the reflection screen.

In the above-mentioned reflection screen (20B), preferably, the unit optical elements (251B) are arrayed in the screen up-down direction, with their longitudinal direction set in the screen left-right direction.

In the above-mentioned reflection screen (20B), preferably, the unit optical element (251B) is so shaped that an angle ($\theta 6$) that a surface (253B) thereof on the screen up-down-directionally lower side relative to an apex (t3) thereof makes with a plane parallel to the screen plane is smaller than an angle ($\theta 5$) that a surface (252B) thereof on the screen up-down-directionally upper side relative to the apex thereof makes with a plane parallel to the screen plane.

In the above-mentioned reflection screen (10B, 20B), preferably, the surface optical layer (15B, 25B) has a hard coating function.

According to still another embodiment of the present invention, there is provided an image display system (1B) including: the above-mentioned reflection screen (10B, 20B); and an image source (LS) adapted to project image light onto the reflection screen.

According to the present invention, it is possible to provide a reflection screen capable of minimizing the reflection of images onto the ceiling and capable of displaying a favorable image, and an image display system including the same.

BRIEF DESCRIPTION OF THE DRAWINGS

FIGS. 4A to 4D are figures for illustrating the action of a surface shape layer in First Embodiment;

FIGS. 5A to 5D are figures for illustrating reflection screens according to another mode of First Embodiment;

FIGS. 11A to 11C are figures for illustrating the behavior of the image light and extraneous light incident on the reflection screen in Second Embodiment;

DETAILED DESCRIPTION OF THE INVENTION

First Embodiment

Figure 1A:
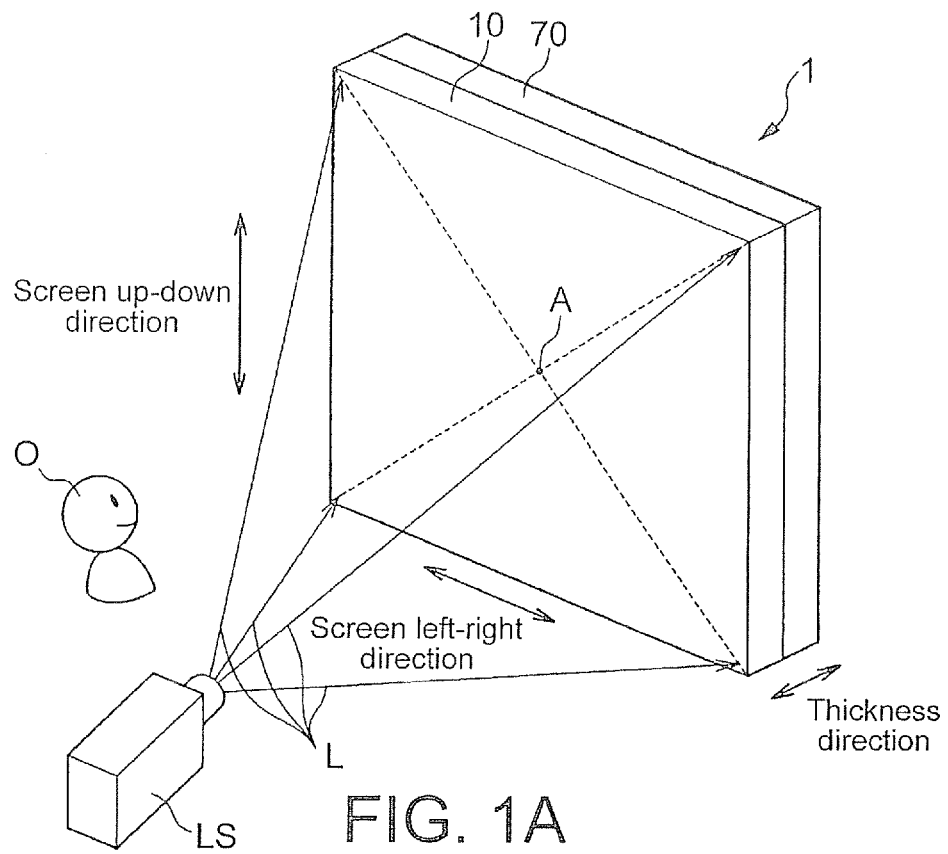
FIGS. 1A and 1B are figures for illustrating an image display system according to First Embodiment of the present invention.

Now, a first embodiment of the present invention will be described below, referring to the drawings and the like.

Incidentally, FIG. 1 and other figures set forth below are schematic figures, in which the sizes and shapes of components are exaggerated, as required, for allowing easier understanding.

In addition, such terms as "plate" and "sheet" are used in the following. Ordinarily, these terms are used in the order of plate, sheet, and film according as thickness decreases; in the present specification, also, these terms are used in conformity with the ordinary use thereof. Such a use of different terms for different things, however, does not have any technical meaning, and, accordingly, each of the terms may be replaced by another, if necessary.

Furthermore, numerical values (e.g., sizes), names of materials and the like of the members described herein are mere examples in embodiments, so that they are not restrictive but may be appropriately used selectively within applicable ranges.

Besides, the terms used herein for specifying shape and geometrical conditions, such as "parallel" and "orthogonal," include not only the strict meaning but also conditions accompanied by such degrees of errors that the members or parts can be regarded as parallel or orthogonal while exhibiting the same or equivalent optical functions to those of the strictly parallel or orthogonal members or parts.

Embodiment

Figure 1B:
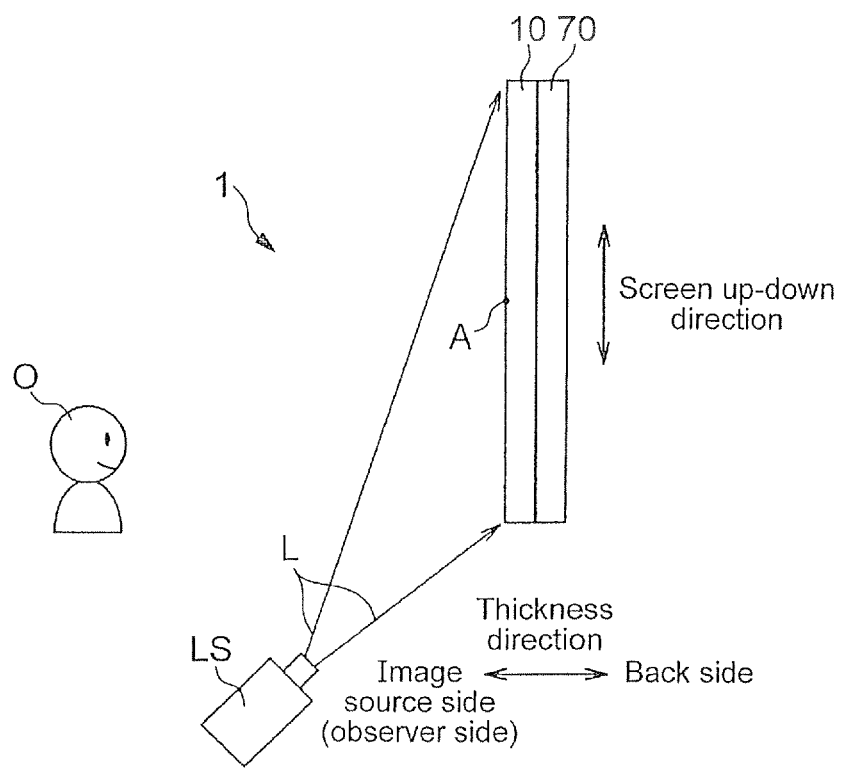

FIGS. 1A and 1B are figures for illustrating an image display system 1 according to the present embodiment, wherein FIG. 1A is a perspective view of the image display system 1, and FIG. 1B is a side view of the image display system 1.

The image display system 1 includes a reflection screen 10, an image source LS and so on. The image display system 1 in the present embodiment is a common image display system allowing image light L projected from the image source LS to be reflected by the reflection screen 10, thereby displaying an image on the screen of the reflection screen 10.

The image display system 1 can be used as a front projection TV system or the like. In addition, the image display system 1 may be used as an interactive board system including the reflection screen 10, the image source LS, and a position detection part for detecting the position of an input part on the observation screen of the reflection screen 10, together with a personal computer and the like.

The image source LS is an image light projector for projecting the image light L onto the reflection screen 10. The image source LS in the present embodiment is a general-purpose short focus type projector. The image source LS, in use state, is located at a position which is central in the screen left-right direction of the reflection screen 10 and below the screen (display region) of the reflection screen 10, as the screen of the reflection screen 10 is viewed in the normal direction (the direction normal to the screen plane).

Incidentally, the screen plane herein means a plane corresponding to the flat surface directions of the reflection screen, as the reflection screen is viewed in its entirety.

The image source LS can project the image light L from a position such that the distance thereof from the reflection screen 10 in the direction orthogonal to the screen of the reflection screen 10 (in the thickness direction of the reflection screen 10) is much shorter, as compared with that in a general-purpose projector according to the related art. In other words, this image source LS is so located that the projection distance to the reflection screen 10 is shorter and the angle of incidence of the image light L on the reflection screen 10 is larger, as compared with the general-purpose projector according to the related art.

The reflection screen 10 is a screen which reflects the image light L, projected by the image source LS, toward the side of an observer O, thereby displaying an image. In use state, an observation screen of the reflection screen 10 has a substantially rectangular shape with the longitudinal direction thereof set in the screen left-right direction, as viewed from the side of the observer O.

In the following description, the screen up-down direction, the screen left-right direction, and the thickness direction are the screen up-down direction (vertical direction), the screen left-right direction (horizontal direction), and the thickness direction (depth direction) of the reflection screen 10 in use state, unless especially specified otherwise.

The reflection screen 10 is provided on the back side thereof with a flat plate-shaped support plate 70, with a bonding layer (not shown) composed of a pressure sensitive adhesive or the like being interposed therebetween. The flatness of the reflection screen 10 is maintained by the support plate 70. Incidentally, this configuration is not restrictive, and, for example, a configuration may be adopted in which the reflection screen 10 is supported by a frame member or the like (not shown), whereby the flatness of the reflection screen 10 is maintained.

The reflection screen 10 has a large screen (display region), for example, 80 inches or 100 inches in diagonal size.

In addition, the incidence angle of the image light incident on the reflection screen 10 is about 40 to 80 degrees in the screen up-down direction. Thus, the incidence angle is greater than those for reflection screens according to the related art, as above-mentioned.

Figure 2:
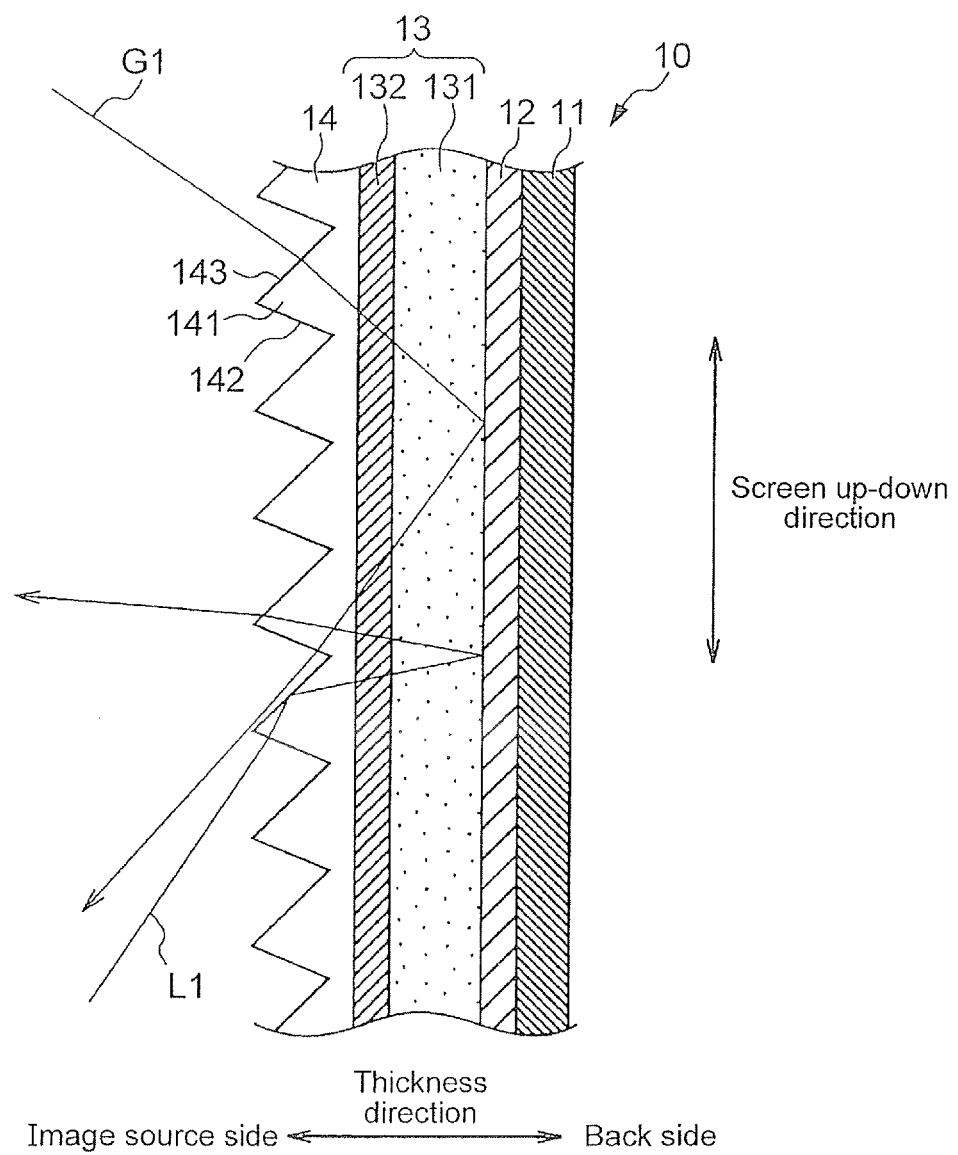
FIG. 2 is a figure showing the layer configuration of a reflection screen according to First Embodiment.

FIG. 2 is a figure showing the layer configuration of the reflection screen 10 according to the present embodiment. In FIG. 2, part of a section passing through a point A (see FIGS. 1A and 1B) serving as the geometrical center of the observation screen (display region) of the reflection screen 10 and being parallel to the screen up-down direction and orthogonal to the screen plane (parallel to the thickness direction) is shown in an enlarged form.

The reflection screen 10 includes a surface shape layer 14, a base layer 13 (a colored layer 132 and a light diffusion layer 131), a reflection layer 12, and a back protective layer 11, in this order from the image source side (the observer side).

The base layer 13 is a layer serving as a base for the surface shape layer 14 and the reflection layer 12. The base layer 13 has the light diffusion layer 131 and the colored layer 132. If sufficient in thickness and rigidity, the base layer 13 can have a function of maintaining the flatness of the reflection screen 10, so that there may be adopted a configuration in which the above-mentioned support plate 70 is not provided.

Examples of the resin which can be used as a base material for the light diffusion layer 131 include PET (polyethylene terephthalate) resin, PC (polycarbonate) resin, MS (methyl methacrylate-styrene) resin, MBS (methyl methacrylate-butadiene-styrene) resin, acrylic resin, TAC (triacetyl cellulose) resin, and PEN (polyethylene naphthalate) resin.

As the diffusing material contained in the light diffusion layer 131, there can be used particles of such resins as acrylic resins, epoxy resins, etc. and inorganic particles based on silicon or the like, having an average particle diameter of about 1 to 50 μm.

The thickness of the light diffusion layer 131, which varies depending on such factors as the screen size of the reflection screen 10, is preferably 100 to 200 μm.

The colored layer 132 is a layer colored with a black or other dark colored colorant or the like so as to have a predetermined light transmittance. The colored layer 132 has a function of absorbing unrequired extraneous light such as illumination light incident on the reflection screen 10 or reducing the black luminance of the image displayed, thereby enhancing the contrast of the image. In the present embodiment, the colored layer 132 is provided on the image source side (observer side) of the light diffusion layer 131.

Examples of the colorant which can be used in the colored layer 132 include grey or black or other dark colored dyes and pigments and the like, carbon black, graphite, and such metallic salts as black iron oxide.

Examples of the resin which can be used as a base material of the colored layer 132 include PET resin, PC resin, MS resin, MBS resin, acrylic resins, TAC resin, and PEN resin.

The thickness of the colored layer 132, which varies depending on such factors as the screen size of the reflection screen 10, is preferably 30 to 3,000 μm.

The reflection layer 12, which is a layer having an action of reflecting the image light to return it to the image source LS side (the observer O side), is formed on the back side of the base layer 13.

The reflection layer 12 in the present embodiment is formed by vapor deposition of aluminum on the back-side surface of the base layer 13.

This configuration is not restrictive. The reflection layer 12 may also be formed by sputtering of a highly light-reflective metal such as aluminum, silver, chromium, etc., or transfer of a metallic foil, or the like methods. Alternatively, the reflection layer 12 may also be formed by appropriate use of an ultra violet (UV)-curing resin or thermosetting resin containing highly reflective white or silver-colored pigment, beads or the like, or a coating material or the like containing particles or minute flakes obtained by pulverizing a vapor-deposited metallic film, metallic foil or the like based on silver, aluminum or the like. As the method for forming the reflection layer 12, there can be used spray coating, gravure reverse coating, screen printing, ink-jet coating, and the like.

The thickness of the reflection layer 12 may be freely set according to the material thereof and the like, insofar as the thickness is sufficient for achieving reflection of light.

The back protective layer 11 is a layer which is provided on the most back side of the reflection screen 10. The back protective layer 11 is a layer for protecting the back surface of the reflection screen 10 from scratches or the like, for protecting the reflection layer 12 from peeling or breaking, and also for protecting the reflection layer 12 from oxidation or the like that is liable to occur in the case where the reflection layer 12 is made of metal.

The back protective layer 11 may be provided by a method in which a sheet-shaped member made of PET resin or the like containing a black or other dark-colored pigment or the like or a black or other dark-colored fabric or the like is adhered to the back side of the reflection layer 12 through a bonding layer (not shown). Alternatively, the back protective layer 11 may be formed by a method in which a UV-curing resin or the like containing a black pigment or the like is applied to the back side of the reflection layer 12, followed by curing.

With a light-absorbing action thus imparted to the back protective layer 11, incidence of extraneous light on the reflection screen 10 from the back side can be prevented.

Incidentally, the back protective layer 11 may be colored in other color than the above-mentioned. Furthermore, the back protective layer 11 may be transparent or substantially transparent, so long as it is possible to restrain incidence of extraneous light from the back side, oxidation of the reflection layer 12, or the like trouble.

Besides, the back protective layer 11 may be so configured as to have a hard coating function, an antistatic function, an antifouling function, a UV-absorbing function, or the like.

The surface shape layer 14 is a layer provided on the image source side of the base layer 13. In the present embodiment, the surface shape layer 14 is disposed on the most image source side.

The surface shape layer 14 has a plurality of unit optical shapes 141 arrayed at its surface on the image source side. The surface shape layer 14 is formed integrally with the image source side surface of the base layer 13.

Figure 3A:
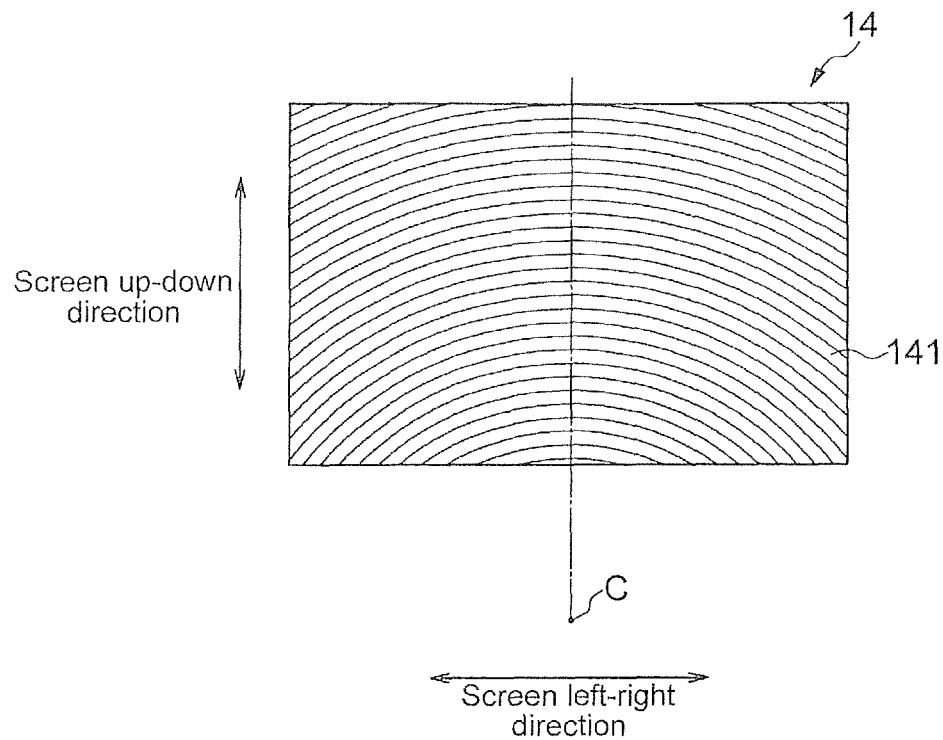
FIGS. 3A and 3B are figures for illustrating unit optical shapes in First Embodiment.
Figure 3B:
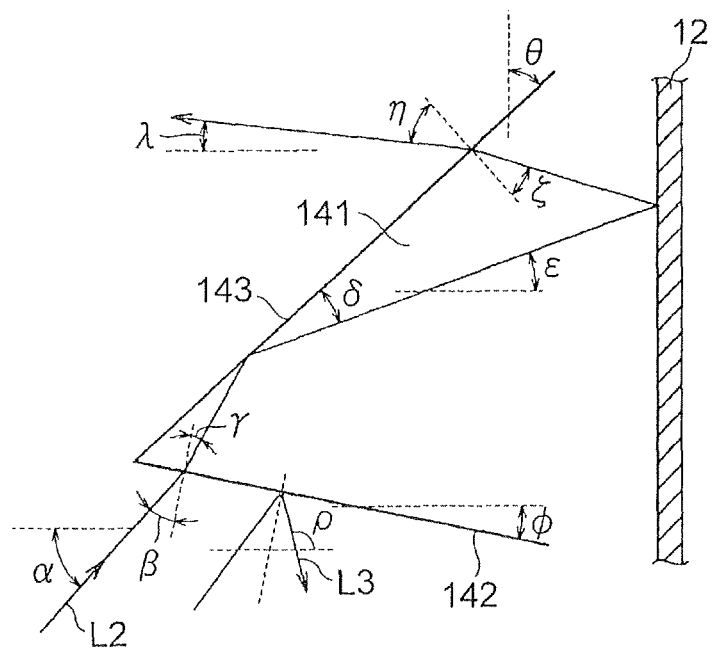

FIGS. 3A and 3B are figures for illustrating the unit optical shapes 141 in the present embodiment. FIG. 3A is a figure showing the surface shape layers 14 as viewed from the front side on the image source side (observer side). FIG. 3B is a figure showing one unit optical shape 141 and an example of the ray of image light passing through the unit optical shape 141. In FIG. 3B, the same section as that in FIG. 2 of the unit optical shape 141 is shown in an enlarged form, while other members than the unit optical shape 141 and the reflection layer 12 are omitted.

The unit optical shape 141 is protuberant toward the image source side (observer side), and its sectional shape in a section along its array direction and orthogonal to the screen plane is a substantially triangular shape.

The unit optical shape 141 in the present embodiment includes: an incidence surface 142 on which the projected image light is incident; and a total reflection surface 143 on which at least part of the light coming from the incidence surface undergoes total reflection. In addition, as shown in FIG. 3A, the unit optical shapes 141 are arrayed concentrically, with a point C as a center. The point C is located at a position which is situated outside of the screen (outside of the display region) of the reflection screen 10, below the reflection screen 10, and on a straight lines passing through the screen left-right-directional center. In other words, the surface shape layer 14 is provided on the image source side thereof with a so-called circular Fresnel lens shape composed of total reflection type unit lenses (the unit optical shapes 141).

Incidentally, this configuration (or shape) is not restrictive. Another configuration (or shape) may be adopted in which the unit optical shape 141 is a triangular shape having an incidence surface 142 and a total reflection surface 143, and the unit optical shapes 141 are arrayed in the screen up-down direction, with their longitudinal direction (their edge line direction) set in the screen left-right direction. This shape is a so-called linear Fresnel lens shape composed of total reflection type unit lenses (the unit optical shapes 141).

In the unit optical shape 141, as shown in FIG. 2, the light L1 coming from the image source LS is incident on and refracted at the incidence surface 142, to go toward the total reflection surface 143, and undergoes total reflection on the total reflection surface 143, to go toward the back side (the reflection layer 12 side).

The surface shape layer 14 has the unit optical shapes 141 as above-mentioned. This ensures that the flux of the image light divergingly projected onto the reflection screen 10 from obliquely below can be converted into a substantially parallel flux of light advancing toward the back side, through the refraction and total reflection taking place respectively on the incidence surfaces 142 and the total reflection surfaces 143 of the unit optical shapes 141.

The angles)(°) shown in FIG. 3B are as follows. All of the angles are in a section passing through the point A, namely, the center of the screen and being parallel to the screen up-down direction and parallel to the thickness direction (in other words, a section along the array direction and orthogonal to the screen plane). In addition, the image light L2 shown in FIG. 3B is an example of the ray of image light passing through the unit optical shape 141.

$\alpha$: the angle that the image light L2 coming from the image source LS makes with the normal direction to the screen plane $\beta$: the incidence angle of the image light L2 on the incidence surface 142

$\gamma$: the refraction angle of the image light L2 at the incidence surface 142

$\delta$: the angle that the image light L2 having been totally reflected on the total reflection surface 143 makes with the total reflection surface 143

$\epsilon$: the angle that the image light L2 reflected on the total reflection surface 143 makes with the normal direction to the screen plane $\zeta$: the incidence angle of the image light L2 on the total reflection surface 143 functioning as an outgoing surface $\eta$: the outgoing angle of the image light L2 from the total reflection surface 143 functioning as the outgoing surface $\lambda$: the angle that the outgoing image light L2 makes with the normal direction of the screen plane $\phi$: the angle that the incidence surface 142 makes with the normal direction to the screen plane $\theta$: the angle that the total reflection surface 143 makes with a direction parallel to the screen plane Among the just-mentioned angles, the following relational expressions (1) to (7) are established. Incidentally, the refractive index of the unit optical shape 141 is assumed to be n.

$$\beta=90°-(\alpha+\phi) \quad (1)$$

$$\gamma=\sin^{-1}((\sin\beta)/n) \quad (2)$$

$$\delta=\theta-(\gamma+\phi) \quad (3)$$

$$\epsilon=90°-(\delta+\theta) \quad (4)$$

$$\zeta=\theta-\epsilon \quad (5)$$

$$\eta=\sin^{-1}(n\times\sin\zeta) \quad (6)$$

$$\lambda=90°-(\theta+\eta) \quad (7)$$

Accordingly, the angles $\theta$ and $\phi$ and the refractive index n are set based on the angle $\alpha$, in such a manner that the image light from the image source LS goes toward the observer side, in other words, that the above-mentioned angle $\lambda$ approaches 0°, in the section shown in FIG. 3B.

Incidentally, the angle $\lambda$ can be set arbitrarily in an intended direction. For instance, the angles $\theta$, $\phi$ and the like may be so set that the image light outgoes toward the screen up-down-directionally lower side at an upper part of the screen, in a horizontal direction (the normal direction to the screen plane) at the center of the screen, and toward the screen up-down-directionally upper side at a lower portion of the screen, on a straight line extending in the array direction while passing through the point C, in order that light is condensed toward the observer O side.

The provision of the surface shape layer 14 having such unit optical shapes ensures that optical compensation for realizing brightness uniformity and a viewing angle in the screen up-down direction and the screen left-right direction in the case where the unit optical shapes 141 are in the form of the circular Fresnel lens as shown in FIG. 3A (bright uniformity and a viewing angle of the image light in the screen up-down direction in the case of the linear Fresnel lens form in which the unit optical shapes 141 are arrayed in the screen up-down direction) may not necessarily be performed by appropriately setting the surface shape of the reflection surface of the reflection layer 12, and, therefore, the reflection surface of the reflection layer 12 can be made flat.

Accordingly, the provision of the surface shape layer 14 facilitates the production of the reflection screen 10, so that the production cost can be suppressed.

Here, of the image light incident on the incidence surface 142, the image light L3 reflected at the interface between the incidence surface 142 and air will be discussed.

As shown in FIG. 3B, the image light L3, as part of the image light incident on the incidence surface 142 at an incidence angle $\alpha$ to the screen plane, is reflected at the interface between the incidence surface 142 and the air. The angle $\rho$ that the reflected light L3 makes with the normal direction to the screen plane is represented by the following expression.

$$\rho=180°-(\alpha+2\phi) \quad (8)$$

If this light L3 is incident on and reflected by the total reflection surface 143 adjacent to and on the lower side of the incidence surface 142, the light L3 becomes stray light going toward the observer O side. Such stray light is observed as a bright line by the observer O, obstructing pleasant viewing of an image.

The angle that the total reflection surface 143 makes with a direction parallel to the screen is the angle $\theta$. Therefore, if the angle $\rho$ satisfies the relationship represented by the expression:

$$\rho=180°-(\alpha+2\phi)<90°-\theta,$$

the light L3 reflected on the incidence surface 142 is not incident on the total reflection surface 143 located on the lower side of the incidence surface 142, so that such stray light as just-mentioned is not generated.

Accordingly, from the viewpoint of suppressing defective display such as bright lines and displaying a favorable image, it is preferable that the angles $\phi$, $\theta$, and $\alpha$ satisfy the following expression, which is obtained by expanding the above-mentioned expression.

$$\alpha+2\phi-\theta>90° \tag{9}$$

Incidentally, for easier understanding, FIG. 2 shows an example in which the array pitch of the unit optical shapes 141 and the angles θ and φ are constant in the array direction of the unit optical shapes 141. However, the array pitch of the unit optical shapes 141 may vary and the angles θ and φ may vary, in the array direction of the unit optical shapes 141.

In addition, the array pitch of the unit optical shapes 141 may be appropriately set according to the size of pixels in the image source LS projecting the image light, the projection angle of the image source LS (the incidence angle of the image light onto the screen plane of the reflection screen 10), the screen size of the reflection screen 10, refractive indices of the layers, etc.

In the present embodiment, there has been shown an example in which the sectional shape of the unit optical shape 141 is a substantially triangular shape. The sectional shape is preferably a shape having both a function of providing the incidence surface and the total reflection surface for the image light and a function as an outgoing surface for the image light. The sectional shape may be other shape than the triangular shape (for example, a substantially trapezoidal shape).

The surface shape layer 14 can be formed by use of an ionizing radiation-curable resin, such as UV-curing resins and electron beam-curing resins, for example, epoxy acrylate or urethane acrylate. Alternatively, the surface shape layer 14 can be formed by use of a thermoplastic resin such as acrylic resin, styrene resin, PC resin, PET resin, etc.

For forming the surface shape layer 14, there is desirably used a material which is excellent in optical properties, mechanical properties, stability, processability, etc. and available at low price.

Incidentally, the surface shape layer 14 may be configured to have such functions, for example, as a hard coating function, a UV-absorbing function, an antistatic function, or an antifouling function.

Now, the routes of the image light incident on the reflection screen 10 and extraneous light such as illumination light will be described, while taking as an example the image light L1 and an extraneous light G1 shown in FIG. 2. It should be noted here, however, that the exemplary optical paths of the image light L1 and the extraneous light G1 presented in the figure are conceptual representation of light routes, and are not precise representation of the degree of refraction and the angles of reflection. Besides, in FIG. 2, the base materials of the surface shape layer 14, the colored layer 132 and the light diffusion layer 131 are regarded as having the same refractive index, and such actions as the diffusing action of the light diffusion layer 131 for the image light L and the extraneous light G1 are omitted.

The image light L1 outgoing from the image source LS advances while diverging radially. Most of the image light L1 is incident on and refracted at the incidence surface 142 of the surface shape layer 14, undergoes total reflection on the total reflection surface 143, is then deflected so that its traveling direction in the screen up-down direction approaches the normal direction to the screen plane, and travels toward the back side.

Then, the image light L1 is transmitted through the colored layer 132 and the light diffusion layer 131, and is reflected on the reflection layer 12, to travel toward the image source side.

The image light L1 is again transmitted through the light diffusion layer 131 and the colored layer 132, and is incident on the surface shape layer 14. Then, the image light L1 outgoes from the total reflection surface 143, functioning as an outgoing surface, in the normal direction of the screen plane or in a direction which forms a small angle with the normal direction.

Therefore, the reflection screen 10 ensures that the surface shape layer 14 allows the image light from the image source LS to efficiently enter into and be deflected in the reflection screen 10, and that the image light reflected on the reflection layer 12 can go out toward the observer O side. Consequently, according to the reflection screen 10 in the present embodiment, the light from the image source LS can be adequately directed toward the observer O side, whereby a bright image can be displayed, both in the screen up-down direction and in the screen left-right direction in regard of the image light.

In this instance, moreover, the light diffusion layer 131 possessed by the reflection screen 10 diffuses the image light L1 before and after reflection. As a result, the reflection screen 10 can realize a sufficient angle of view.

In addition, in the reflection screen 10, the unrequired extraneous light (e.g., illumination light, sunlight coming from a window, etc.) other than the image light is mainly incident on the reflection screen 10 from obliquely above. Most of such extraneous light G1 enters the reflection screen 10 through the total reflection surface 143, and travels toward the back side. Then, part of the extraneous light G1 is absorbed in the colored layer 132. The rest of the extraneous light G1 is reflected by the reflection layer 12, and outgoes from the incidence surface 142 of the unit optical shape 141 on the screen up-down-directionally lower side, to travel toward the screen lower side as shown in FIG. 2.

Thus, according to the reflection screen 10 of the present embodiment, the extraneous light can be absorbed or can be reflected into such a direction as not to reach the observer O. Moreover, the extraneous light is not reflected or diffused on the image source side surface. Consequently, it is possible to lower the black luminance and to enhance the contrast of the image displayed on the screen plane.

FIGS. 4A to 4D are figures for illustrating the action of the surface shape layer 14 in the present embodiment.

FIG. 4A shows the manner in which the image light is reflected on the reflection screen 10 in the present embodiment, and FIG. 4B is a figure obtained by enlarging FIG. 4A so as to illustrate the reflection of the image light on the surface shape layer 14 in the present embodiment. FIG. 4C shows the manner in which image light is reflected by a reflection screen 80 in a comparative example which includes a surface layer 84 having a smooth surface on the image source side, and FIG. 4D is a figure obtained by enlarging FIG. 4C so as to illustrate the reflection of the image light on the surface layer 84 in the comparative example. FIGS. 4B and 4D show respective sections parallel to the screen up-down direction and the thickness direction, of the surface shape layer 14 in the present embodiment and the surface layer 84 in the comparative example.

The reflection screen 80 in the comparative example is the same as the reflection screen 10 in the present embodiment, except that the image source side surface of the surface layer 84 is a smooth surface.

In the case of the reflection screen 80 in the comparative example that includes the surface layer 84 having a smooth surface on the image source side, the image light projected from the lower side of the reflection screen 80 and incident on the reflection screen at a large incidence angle, especially the image light L4 incident on an upper-side portion of the screen of the reflection screen 80, is partly reflected by substantially regular (specular) reflection on the image source side surface of the reflection screen 80, as light L5 shown in FIGS. 4C and 4D, to reach the ceiling.

Such light L5 leads to reflection of the image onto the ceiling in the vicinity of the reflection screen 80, thereby hampering pleasant viewing of the image. Such reflection of an image onto the ceiling tends to become more conspicuous in the case where the reflection screen 80 is large in display size and the distance thereof from the ceiling is short or in a dark room environment, thereby obstructing pleasant viewing of the image. In addition, where the image is motion video, such reflection of an image onto the ceiling greatly hampers pleasant viewing of the image.

On the other hand, the surface shape layer 14 of the reflection screen 10 according to the present embodiment is provided at the image source side surface thereof with the unit optical shapes 141; therefore, as shown in FIGS. 4A and 4B, the image light L4 incident on the reflection screen at a large incidence angle is mostly made to pass through the incidence surface 142 into the unit optical shape 141, and undergoes total reflection on the total reflection surface 143, to go toward the back side.

Therefore, there is little light L5 reflected on the image source side surface of the reflection screen 10 to go toward the ceiling side, so that reflection of an image onto the ceiling is greatly reduced. Besides, a reduction in the amount of light reflected on the image source side surface of the reflection screen 10 permits a high image light utilization efficiency and a display of bright images.

In other words, since the surface shape layer 14 of the reflection screen 10 in the present embodiment has the unit optical shapes 141, as shown in FIGS. 4A and 4B, the image light L4 incident on the reflection screen 10 has a smaller angle of incidence on the incidence surface of the unit optical shape 141, as compared with the case of the reflection screen 80 in the comparative example having the smooth surface layer 84.

Generally speaking, as the angle of incidence on an interface becomes smaller, the reflectance on the interface is lowered. Therefore, in the case where the image light is incident on the reflection screen 10 in the present embodiment, the amount of light reflected by the incidence surfaces of the unit optical shapes 141 is reduced.

In addition, the image light L4 undergoes regular reflection on the incidence surface of the unit optical shape 141, so that the reflected light is directed toward the lower side. After all, there is little light L5 reflected on the image source side surface of the reflection screen 10 to go toward the ceiling side.

Incidentally, part of the image light may be reflected at the interface between the incidence surface 142 and the air (see light L3 shown in FIG. 3). In view of this, the angles θ and φ and the refractive index n of the unit optical shapes 141 and the like factors are so designed that such part of the image light will be reflected toward the screen lower side and will not undergo total reflection on the total reflection surface 143. Accordingly, the above-mentioned part of the image light would not become stray light, through reflection on the total reflection surface 143, to reach the observer O side and be observed as a bright line, thereby lowering the contrast of the image.

From the foregoing it is understood that according to the present embodiment, reflection of images onto the ceiling can be reduced, and favorable images free of defects in display such as bright lines can be displayed.

FIGS. 5A to 5D are figures for illustrating reflection screens 10-2 to 10-4 according to other forms of the embodiment. FIGS. 5A, 5C, and 5D each show a section corresponding to the section shown in FIG. 2 above.

In the reflection screen 10, the layer or layers located between the surface shape layer 14 and the reflection layer 12 can be appropriately selectively provided according to the desired optical performance and the like.

For instance, a light-transmitting glass substrate or resin plate or the like may be provided, for maintaining the flatness of the reflection screen 10 as a whole.

Besides, for instance, there may be provided an anisotropic diffusion layer of which the diffusing action in the screen left-right direction is greater than the diffusing action in the screen up-down direction.

Furthermore, for example, like the reflection screen 10-2 shown in FIG. 5A, the reflection layer 12 may be formed on the back side of a shaping layer 25, which is formed on the back side of the base layer 13, along the back-side surface shape of the shaping layer 25.

The shaping layer 25 is a layer which is provided on the back side of the base layer 13 so as to impart a predetermined shape to the reflection surface of the reflection layer 12.

FIG. 5B shows, in an enlarged form, part of a section parallel to the screen left-right direction and the thickness direction, of the shaping layer 25, the reflection layer 12, and the back protective layer 11.

The shaping layer 25 is light-transmitting, and has a plurality of unit back surface shapes 251 arrayed at the back-side surface thereof. The unit back surface shapes 251 in the present embodiment each have a shape which is part of the shape of an elliptic cylinder or cylinder projected to the back side. The unit back surface shapes 251 are arrayed in the screen left-right direction, with their longitudinal direction (their edge line direction) set in the screen up-down direction. In other words, a so-called lenticular lens shape is formed at the back-side surface of the shaping layer 25. Incidentally, the unit back surface shape 251 may be in the shape of a sine wave or the like in section.

The shaping layer 25 may be formed integrally with the back-side surface of the base layer 13 from a UV-curing resin by a UV molding method or the like. Alternatively, the shaping layer 25 may be formed from a thermoplastic resin such as acrylic resin or PET resin by co-extrusion with the base layer 13. Further, the shaping layer 25 may be formed by extrusion and be bonded to the back side of the base layer 13 through a bonding layer (not shown).

Such a shaping layer 25 may be provided, to thereby enhance the viewing angle in the screen left-right direction.

In addition, like a reflection screen 10-3 shown in FIG. 5C, a light control layer 36 may be provided between the surface shape layer 14 and the light diffusion layer 131. The light control layer 36 includes a support layer 361, light-transmitting parts 362, and light-absorbing parts 363, and has a function of controlling the optical path of the image light as well as a function of absorbing part of stray light and extraneous light.

The support layer 361 is a layer serving as a base for forming the light-transmitting parts 362. As the support layer 361, there can be used a light-transmitting sheet-shaped member made of PET resin, PC resin, acrylic resin or the like. In the form shown in FIG. 5C, the surface shape layer 14 is formed on the image source side of the support layer 361; thus, the support layer 361 serves also as a base for the surface shape layer 14.

The light-transmitting part 362 is formed integrally on the back side of the support layer 361.

The light-transmitting parts 362 are light-transmitting, and a plurality of them are arrayed side by side in the screen up-down direction, with their longitudinal direction set in the screen left-right direction. As shown in FIG. 5C, the light-transmitting parts 362 are each roughly trapezoidal, in a section parallel to the array direction thereof and parallel to the thickness direction of the reflection screen 10.

The light-transmitting parts 362 are formed, for example, from an ionizing radiation-curing resin such as UV-curing resin.

The light-absorbing parts 363 are formed at valley bottom parts between the light-transmitting parts 362, and are elements exhibiting a light-absorbing action. Namely, the light-absorbing parts 363 show an action of absorbing extraneous light, stray light and the like. As shown in FIG. 5C, the light-absorbing parts 363 are roughly wedge-shaped, in a section parallel to the array direction thereof and parallel to the thickness direction of the reflection screen 10. The wedge shape here means a shape which is wide at one end thereof and is gradually narrowed along the direction toward the other end thereof. The wedge shape includes triangular shapes and trapezoidal shapes.

The light-absorbing parts 363 are formed by a method in which an ionizing radiation-curing resin, such as a UV-curing resin, containing light-absorbing particles is loaded between the light-transmitting parts 362 by wiping (squeezing), followed by curing.

Preferable examples of the light-absorbing particles include light-absorbing colored particles such as organic particulates colored with carbon black, graphite, metallic salt such as black iron oxide, etc., pigment, dye, or the like, and colored glass beads. Besides, there may be used colored particles capable of selective absorption of a specified wavelength, according to the properties of the image light.

The light-transmitting parts 362 shown in FIG. 5C are each so shaped that the width of a back-side end portion thereof in the screen up-down direction is smaller than the width of an image source-side end portion thereof. This configuration is not restrictive. The light-transmitting parts 362 may each be so formed that the width of a back-side end portion thereof in the screen up-down direction is greater than the width of an image source-side end portion thereof. In this instance, the light-transmitting parts 362 and the light-absorbing parts 363 may be formed on the image source side of the support layer 361. Further, a configuration may be adopted in which the support layer 361 is omitted, and the light-transmitting parts 362 and the light-absorbing parts 363 are formed at the image source-side surface of the light diffusion layer 131.

The angle that the interface between the light-transmitting part 362 and the light-absorbing part 363 makes with the normal direction to the screen plane (the thickness direction) is preferably 0° to 20°.

In addition, the magnitude relationship between the refractive index Np of the light-transmitting parts 362 and the refractive index Nb of the light-absorbing parts 363 may be appropriately set according to the desired optical performance.

Such a light control layer 36 as above-mentioned may be provided, so as to control the viewing angle of the image light in the screen up-down direction, to efficiently absorb extraneous light, or to contrive an enhanced contrast.

Incidentally, while the reflection screen 10-3 has not have the colored layer 132 in the configuration shown in FIG. 5C, the colored layer 132 may be provided in an arbitrary desired position in order to obtain an enhanced contrast.

Furthermore, like the reflection screen 10-4 shown in FIG. 5D, a configuration may be adopted in which the shaping layer 45 has a Fresnel lens shape including an array of a plurality of unit lenses 451 each having a lens surface 452 and a non-lens surface 453, with a reflection layer 12 formed on each lens surface 452. In this case, a configuration in which the non-lens surfaces 453 are coated with a black or other-colored back protective layer 11 having a light-absorbing action, as shown in FIG. 5D, is preferred from the viewpoint of enhancement of contrast. Incidentally, the reflection layer 12 may be formed also on the non-lens surfaces 453.

The Fresnel lens shape of the shaping layer 45 is preferably a circular Fresnel lens shape in which unit lenses 451 are arrayed concentrically, from the viewpoint of such factors as in-plane uniformity of brightness and clearness of the image. However, a linear Fresnel lens shape may also be adopted.

The shaping layer 45 can be formed on the back side of the base layer 13, for example, from a light-transmitting ionizing radiation-curing resin such as UV-curing resin.

Such a shaping layer 45 as above-mentioned may be provided so as to efficiently reflect the image light, thereby enhancing the brightness of images, and to contrive enhancement of contrast through extraneous-light absorption or the like.

Incidentally, the above-mentioned various embodiments may be combined with one another, as required.

Comparison Between Example and Comparative Examples

Here, a reflection screen corresponding to Example of the reflection screen 10 according to the present embodiment and reflection screens corresponding to Comparative Examples were fabricated, and they were compared with one another as to reflection of images onto the ceiling and generation of bright lines.

The reflection screen of Example is an example of the reflection screen 10 according to the present embodiment, wherein the angles concerning the unit optical shape 141 of the surface shape layer 14 satisfy the above-mentioned expressions (1) to (7) and (9). Besides, in the reflection screen of Example, the image light reflected by the reflection layer 12 outgoes from the reflection screen in a substantially frontward direction (a substantially normal direction to the screen plane).

The reflection screen of Comparative Example 1 is provided with a surface shape layer having an array of a plurality of unit optical shapes 141, wherein the angles concerning the unit optical shapes satisfy the above-mentioned expressions (1) to (7), but the angles $\phi$, $\theta$, and $\alpha$ do not satisfy the expression (9): $\alpha + 2\phi - \theta > 90°$. In this point, the reflection screen of Comparative Example 1 differs from the reflection screen of Example, and it is configured to be the same as the reflection screen of Example in the other points. In the reflection screen of Comparative Example 1, the image light reflected by the reflection layer 12 outgoes from the reflection screen in a substantially frontward direction (a substantially normal direction to the screen plane).

The reflection screen of Comparative Example 2 is not provided with any surface shape layer, but is provided with a surface layer (not shown) having a hard coating function and having a substantially smooth surface on the image source side. In addition, it is provided on the back side of the base layer 13 with a lens layer (not shown) having a circular Fresnel lens shape. The circular Fresnel lens shape has an array of a plurality of unit lenses, each of which has a lens surface and a non-lens surface and is projected to the back side. A reflection layer is formed on each of the lens surfaces. In these points, the reflection screen of Comparative Example 2 differs from the reflection screen of Example, and it is configured to be the same as the reflection screen of Example in the other points. Incidentally, the lens layer in Comparative Example 2 is designed to be suitable for the image light in this projection system to outgo from the reflection screen in a substantially frontward direction.

In the reflection screens of Example and Comparative Examples 1 and 2, various angles concerning unit optical shape of the surface shape layer 14 at that point which is on the screen upper side of the reflection screen and at which the image light is incident on the screen plane at an incidence angle of 70° is as follows. The just-mentioned point has been selected, since the reflection of the image light which would cause reflection of the image onto the ceiling is liable to occur particularly on the screen upper side of the reflection screen.

In the case of the reflection screen of Example, the angle $\theta$ that the total reflection surface 143 makes with the screen plane is 48°, the angle $\phi$ that the incidence surface 142 makes with the normal direction to the screen plane is 35°, and $\alpha+2\phi-\theta=92°>90°$; thus, the expression (9) is satisfied.

In the case of the reflection screen of Comparative Example 1, the angle $\theta$ that the total reflection surface 143 makes with the screen plane is 43°, the angle $\phi$ that the incidence surface 142 makes with the normal direction to the screen plane is 0°, and $\alpha+2\phi-\theta=27°<90°$; thus, the expression (9) is not satisfied.

Besides, the reflection screen of Comparative Example 2 does not have the surface shape layer, and, therefore it satisfies none of the expressions (1) to (7) and (9).

By using these reflection screens of Example and Comparative Examples 1 and 2, respective image display systems were produced. Setting each of the image display systems in a dark-room environment, image light was projected from an image source LS, and reflection of the image onto the ceiling and generation of bright lines were observed by visual inspection.

The reflection screens of Example and Comparative Examples 1 and 2 have a diagonal display size of 100 inches (2,214 mm×1,245 mm)

Each of the reflection screens of Example and Comparative Examples 1 and 2 is disposed on a wall surface in a room, and the image source LS projects image light onto the reflection screen from the lower side. In this instance, in regard of the image light incident on a point A at the center of the screen of each reflection screen, the angle of incidence on the screen plane in the screen up-down direction is 61°.

Incidentally, the observing position is at a distance of 3 m along the frontward direction from the reflection screen.

TABLE 1

|  | Image light, | Unit optical shape | | | Reflection | |
| --- | --- | --- | --- | --- | --- | --- |
|  | Angle α (°) | Angle θ (°) | Angle φ (°) | α + 2φ − θ (°) | of images onto ceiling | Bright line |
| Example | 70 | 48 | 35 | 92 | ○ | ○ |
| Comparative Example 1 | 70 | 43 | 0 | 27 | ○ | X |
| Comparative Example 2 | 70 | — | — | — | X | ○ |

Reflection of images onto ceiling ○: suppressed X: conspicuous
Bright line ○: not observed X: conspicuous Table 1 shows various angles and evaluation results, for the reflection screens of Example and Comparative Examples 1 and 2.

As shown in Table 1, in the case of the reflection screen of Comparative Example 2 that is not provided with any surface shape layer 14, conspicuous reflection of the image onto the ceiling occurred and pleasant viewing of the image was thereby hampered, although bright lines were not observed.

In the case of the reflection screen of Comparative Example 1, bright lines were observed and image quality was thereby lowered, although reflection of the image onto the ceiling was reduced.

In the case of the reflection screen of Example, on the other hand, reflection of the image onto the ceiling did not occur and no bright line was observed. Therefore, the reflection screen of Example and the image display system using the same are successful to minimize reflection of the image onto the ceiling and to display a favorable image.

<Modification>

The present invention is not restricted to the above-described embodiment, and various modifications and alterations are possible within the scope of the invention.

(1) While an example in which the base layer 13 includes the colored layer 132 and the light diffusion layer 131 was shown in the present embodiment, this is not restrictive. For instance, a configuration in which the base layer 13 does not have the colored layer 132 but has only the light diffusion layer 131 or a configuration in which the light diffusion layer 131 further contains a colorant may also be adopted.

In addition, there can be adopted a configuration in which the base layer 13 includes the colored layer 132 and the light diffusion layer 131, and the colored layer 132 also contains a light-diffusing material.

Furthermore, the positions of the light diffusion layer 131 and the colored layer 132 may be arranged as required.

(2) In the present embodiment, an example has been shown in which the reflection screen 10 is bonded to the support plate 70 provided on the back side, through a pressure sensitive adhesive layer or the like (not shown), and is substantially flat plate-like in shape. This configuration is not restrictive, though. For instance, there can be adopted a configuration in which the support plate 70 is absent and the reflection screen 10 is bonded to a wall surface or the like through a pressure sensitive adhesive layer or the like, a configuration in which the reflection screen 10 with the support plate 70 bonded to the back side thereof is secured to a wall surface, or a configuration in which the reflection screen 10 is suspended from a wall surface through a support member such as a hook or hooks.

While an example in which the reflection screen 10 is substantially flat plate-shaped in use and in non-use state has been shown in the present embodiment, this configuration is not restrictive. For example, a configuration may be adopted in which the reflection screen 10 may be rolled up and stored in a roll form when not used. In such a case, it is preferable that the support plate 70 or the like is omitted, and the back protective layer 11 provided on the back side of the reflection screen 10 has a hard coating function, an anti-fouling function, an anti-static function or the like.

(3) In the present embodiment, an example has been shown in which the image source LS is located below the reflection screen 10 with respect to the vertical direction, and the image light L is projected onto the reflection screen 10 from obliquely below. This configuration is not restrictive, though. For instance, the image source LS may be located above the reflection screen 10 with respect to the vertical direction so that the image light L is projected onto the reflection screen 10 from obliquely above.

In this situation, it suffices for the reflection screen 10 to have a configuration in which the form of the surface shape layer 14 shown in FIG. 2 and the like is inverted upside down. In this case, reflection of the image onto the floor surface or the like can be reduced.

Incidentally, the present embodiment and its modifications may be used in an appropriate combination, the details of which are omitted. Besides, the present invention is not to be restricted by the above-described embodiment or the like.

Second Embodiment

Now, a second embodiment of the present invention will be described below, referring to the drawings, etc. Incidentally, the figures set forth below as well as FIGS. 1A and 1B are schematic drawings, in which the sizes and shapes of members or components are exaggerated, as required, for allowing easier understanding.

In addition, such terms as "plate" and "sheet" are used in the following. Ordinarily, these terms are used in the order of plate, sheet, and film according as thickness decreases; in the present specification, also, these terms are used in conformity with the ordinary use thereof. Such a use of different terms for different things, however, does not have any technical meaning, and, accordingly, each of the terms may be replaced by another, if necessary.

Furthermore, numerical values (e.g., sizes), names of materials and the like of the members described herein are mere examples of embodiment, so that they are not restrictive but may be appropriately used selectively.

Embodiment

Figure 6A:
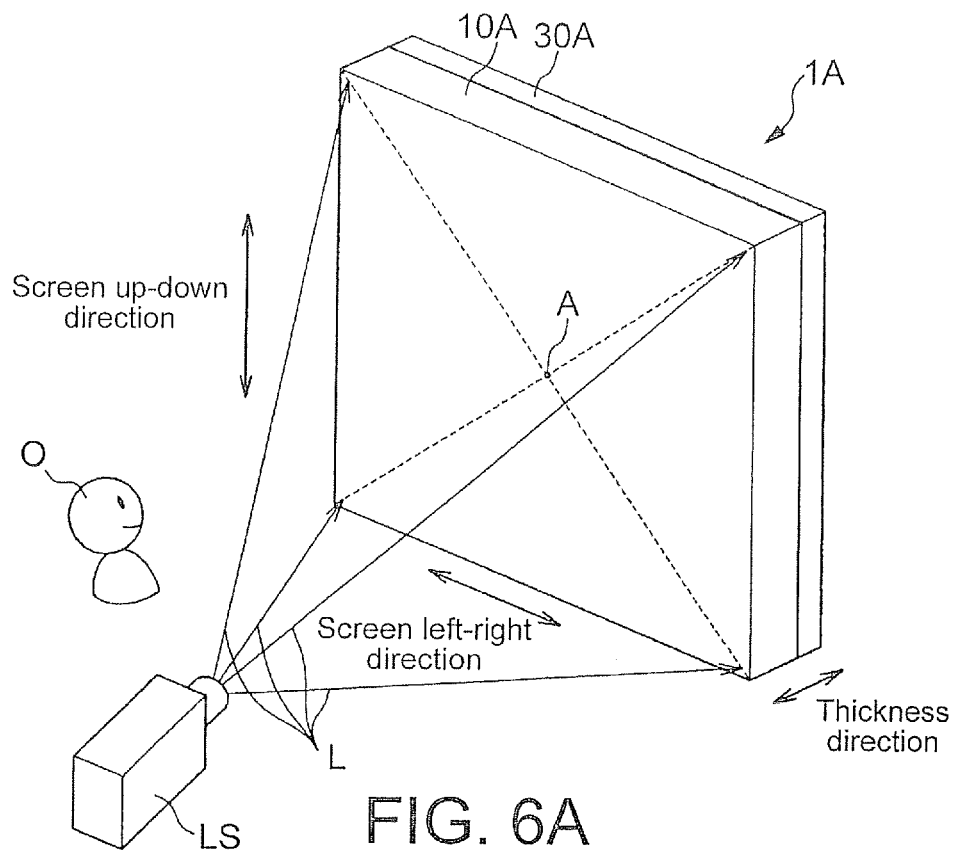
FIGS. 6A and 6B are figures for illustrating an image display system according to Second Embodiment of the present invention.
Figure 6B:
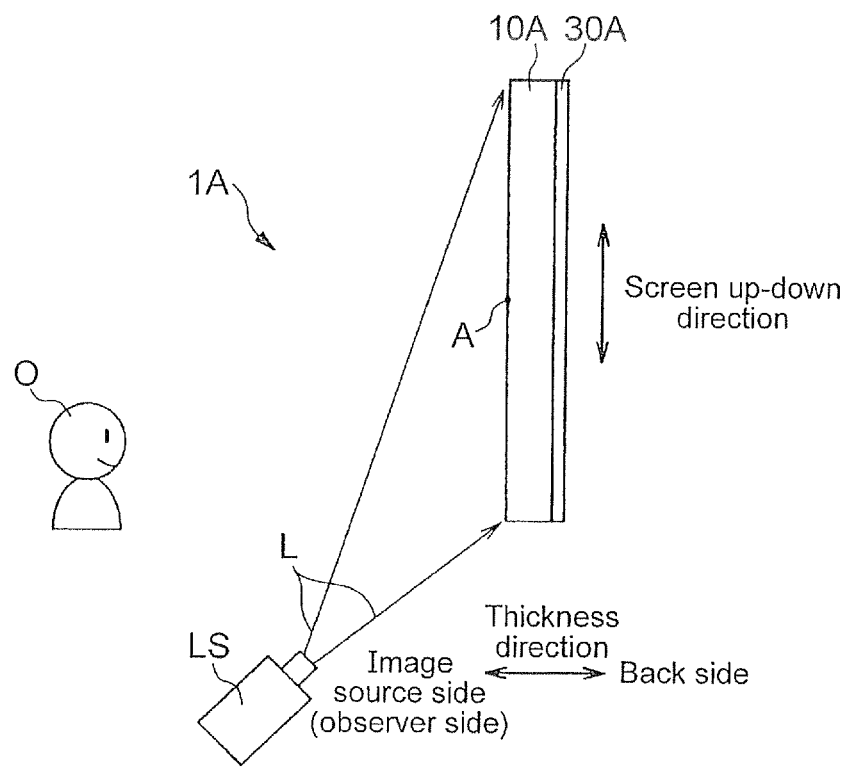

FIGS. 6A and 6B are figures for illustrating an image display system 1A according to the present embodiment. FIG. 6A is a perspective view of the image display system 1A, and FIG. 6B is a side view of the image display system 1A.

The image display system 1A includes a reflection screen 10A, an image source LS and so on. The image display system 1A of the present embodiment is a common image display system allowing image light L projected from the image source LS to be reflected by the reflection screen 10A, thereby displaying an image on the screen of the reflection screen 10A.

The image display system 1A is not restricted to the just-mentioned. For instance, it may be a front projection TV system or the like in which image light is projected from an image source LS. Alternatively, the image display system 1A may be an interactive board system including the reflection screen 10A, the image source LS, and a position detection part for detecting the position of an input part on the observation screen of the reflection screen 10A, together with a personal computer and the like.

The image source LS is a device for projecting image light L onto the reflection screen 10A. A general-purpose short focus type projector or the like can be used as the image source LS. The image source LS, in use state, is located at a position which is central in the screen left-right direction of the reflection screen 10A and below the screen (display region) of the reflection screen 10A, as the screen of the reflection screen 10A is viewed in the normal direction (the direction normal to the screen plane). Incidentally, the screen plane herein means a plane corresponding to the flat surface directions of the reflection screen, as the reflection screen is viewed in its entirety.

The image source LS can project the image light L from a position such that the distance thereof from the reflection screen 10A in the direction orthogonal to the screen of the reflection screen 10A (in the thickness direction of the reflection screen 10A) is much shorter, as compared with that in a general-purpose projector according to the related art. In other words, this image source LS is so located that the projection distance to the reflection screen 10A is shorter and the angle of incidence of the image light L on the reflection screen 10A is larger, as compared with the general-purpose projector according to the related art.

The reflection screen 10A is a screen which reflects the image light L projected by the image source LS toward the side of an observer O, thereby displaying an image. In use state, an observation screen of the reflection screen 10A has a substantially rectangular shape with the longitudinal direction thereof set in the screen left-right direction, as viewed from the side of the observer O.

In the following description, the screen up-down direction, the screen left-right direction, and the thickness direction are the screen up-down direction (vertical direction), the screen left-right direction (horizontal direction), and the thickness direction (depth direction) in use state of the reflection screen 10A, unless especially specified otherwise.

The reflection screen 10A is provided on the back side thereof with a flat plate-shaped support plate 30A, with a bonding layer (not shown) composed of a pressure sensitive adhesive or the like being interposed therebetween. The flatness of the reflection screen 10A is maintained by the support plate 30A. Incidentally, this configuration is not restrictive, and, for example, a configuration may be adopted in which the reflection screen 10A is supported by a frame member or the like (not shown), whereby the flatness of the reflection screen 10A is maintained.

The reflection screen 10A has a large screen (display region), for example, 80 inches or 100 inches in diagonal size. The reflection screen 10A in the present embodiment has a diagonal display size of, for example, 80 inches (1771 mm×996 mm).

Figure 7:
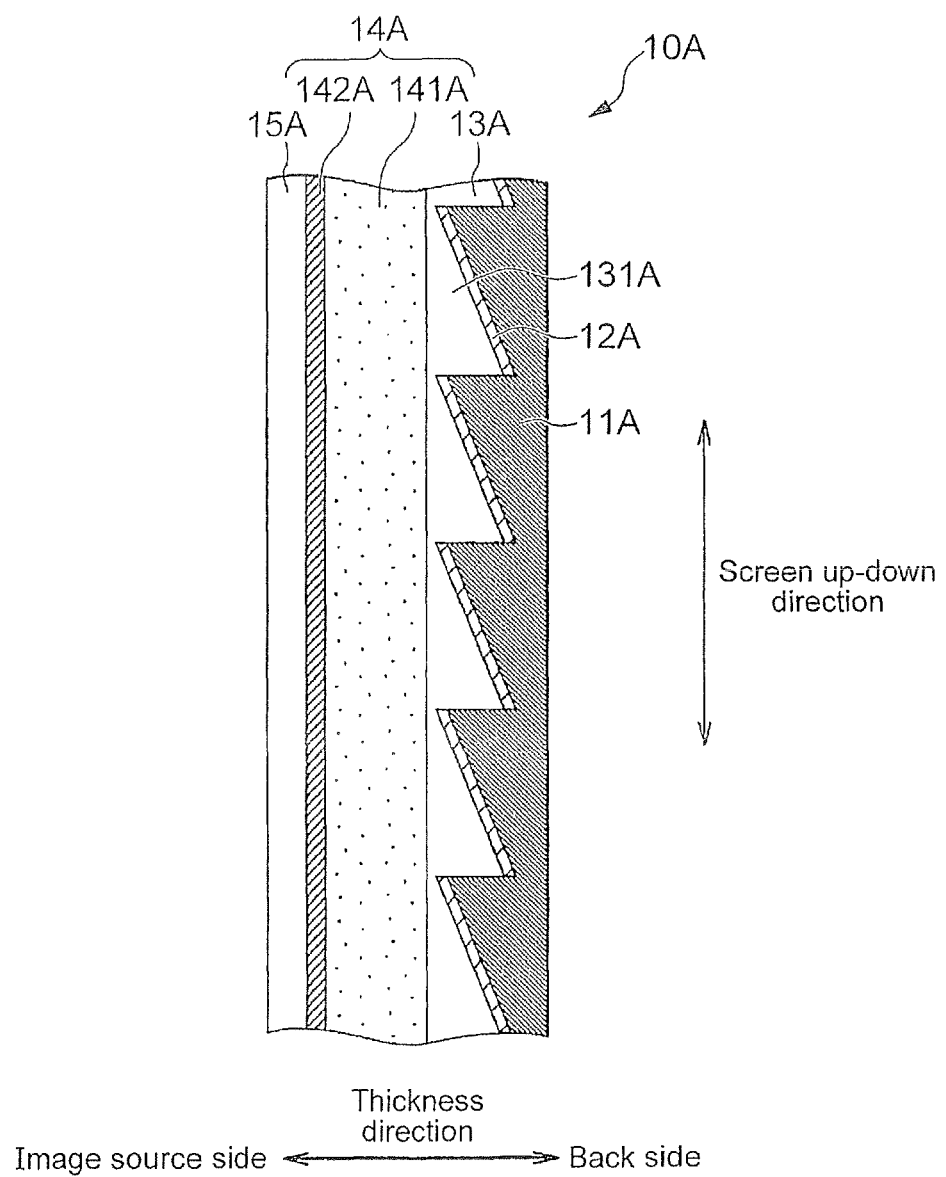
FIG. 7 is a figure for illustrating the layer configuration of a reflection screen according to Second Embodiment.

FIG. 7 is a figure for illustrating the layer configuration of the reflection screen 10A in the present embodiment.

In FIG. 7, part of a section passing through a point A (see FIGS. 6A and 6B) as the geometrical center of the observation screen (display region) of the reflection screen 10A and being parallel to the screen up-down direction and being orthogonal to the screen plane (namely, being parallel to the thickness direction) is shown in an enlarged form.

The reflection screen 10A includes a surface lens layer 15A, a base layer 13A, a lens layer 13A, a reflection layer 12A, and a light absorption layer 11A, in this order from the image source side (the observer side).

The base layer 14A is a sheet-shaped member serving as a base for forming the lens layer 13A and the surface lens layer 15A. The surface lens layer 15A is integrally formed on the image source side (the observer side) of the base layer 14A, while the lens layer 13A is integrally formed on the back side of the base layer 14A.

The base layer 14A includes a light diffusion layer 141A and a colored layer 142A. The base layer 14A in the present embodiment has the light diffusion layer 141A and the colored layer 142A integrally laminated on each other.

The light diffusion layer 141A is a layer which has a light-transmitting resin as a base material and contains a diffusing material capable of diffusing light. The light diffusion layer 141A has a function of broadening the viewing angle and a function of contrive an enhanced in-plane uniformity of brightness.

Examples of the resin which can be used as the base material for the light diffusion layer 141A include PET (polyethylene terephthalate) resin, PC (polycarbonate) resin, MS (methyl methacrylate-styrene) resin, MBS (methyl methacrylate-butadiene-styrene) resin, acrylic resin, TAC (triacetyl cellulose) resin, and PEN (polyethylene naphthalate) resin. Besides, as the diffusing material contained in the light diffusion layer 141A, there can be used particles of such resins as acrylic resins, styrene resins, acrylic-styrene copolymer resins, etc. and inorganic particles based on silicon or the like, having an average particle diameter of about 1 to 30 μm.

In the present embodiment, an MBS resin-made sheet-shaped member (thickness: about 140 to 160 μm) containing an MS resin-made diffusing material (average particle diameter: about 10 μm) is used as an example.

The colored layer 142A is a layer colored with a grey or black or other colored dye, pigment or the like so as to have a predetermined transmittance. In the present embodiment, the colored layer 142A is located on the image source side (the observer side) of the light diffusion layer 141A.

This colored layer 142A has a function of absorbing unrequired extraneous light (e.g., illumination light) incident on the reflection screen 10A as well as stray light, thereby enhancing the contrast of the image displayed.

The colored layer 142A is formed, for example, from PET resin, PC resin, MS resin, MBS resin, acrylic resin, TAC resin, PEN resin or the like containing a dye or pigment.

In the present embodiment, an MBS resin-made sheet-shaped member colored in a black transparent color with a dye or colorant or the like and having a thickness of about 70 μm is used as an example.

The base layer 14A in the present embodiment is formed in an integrally laminated form by co-extrusion of the light diffusion layer 141A and the colored layer 142A. Incidentally, a configuration may be adopted in which the base layer 14A is a single layer containing both the diffusion material and the colorant such as pigment or dye.

Figure 8A:
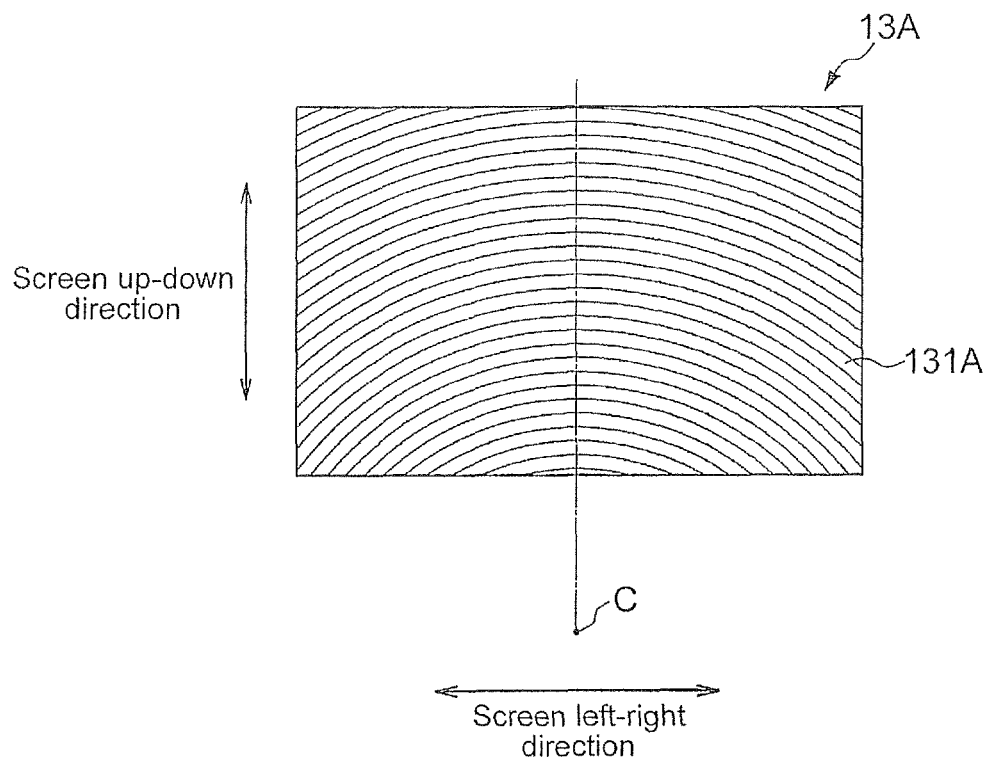
FIGS. 8A and 8B are figures for illustrating a lens layer in Second Embodiment.
Figure 8B:
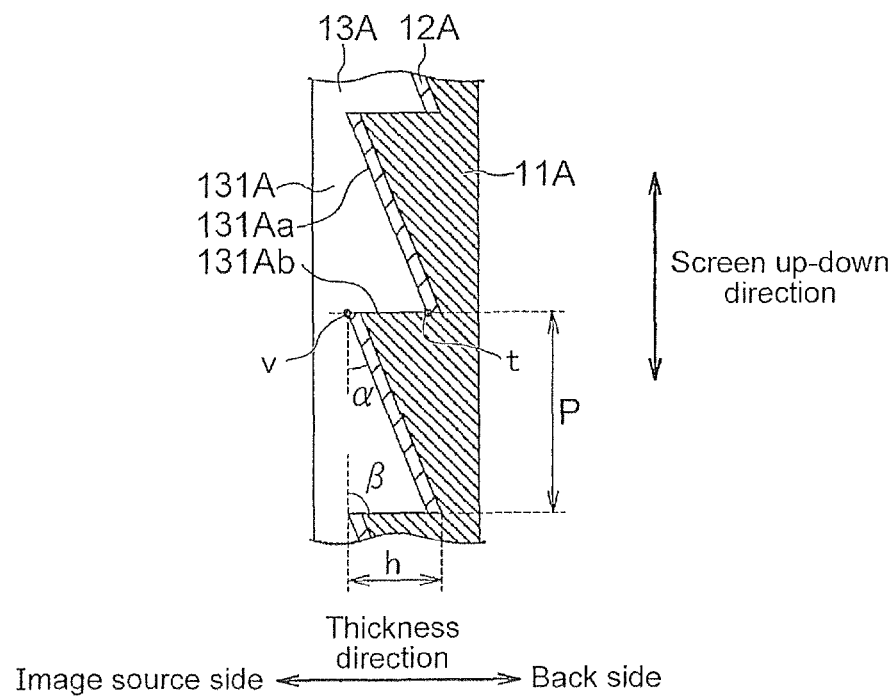

FIGS. 8A and 8B are figures for illustrating the lens layer 13A in the present embodiment. FIG. 8A shows the lens layer 13A as viewed from the normal back side, wherein the reflection layer 12A and the light absorption layer 11A are omitted for allowing easier understanding. FIG. 8B shows part of the section shown in FIG. 7, in a further enlarged form.

The lens layer 13A is a light-transmitting layer provided on the back side of the base layer 14A. As shown in FIG. 8A, the lens layer 13A is provided on the back side thereof with a circular Fresnel lens shape in which a plurality of unit lenses 131A are arrayed concentrically. In this circular Fresnel lens shape, a point C serving as the optical center (Fresnel center) is located in a position which is outside of the screen (display region) of the reflection screen 10A and is below the reflection screen 10A.

While an example in which the lens layer 13A has the circular Fresnel lens shape is described in the present embodiment, a configuration may be adopted in which the lens layer 13A has a linear Fresnel lens shape.

As shown in FIGS. 7 and 8B, the unit lenses 131A are each substantially triangular in sectional shape in a section which is parallel to the direction orthogonal to the screen plane (the thickness direction of the reflection screen 10A) and is parallel to the array direction of the unit lenses 131A.

The unit lens 131A is projected to the back side, and includes a lens surface 131Aa and a non-lens surface 131Ab opposed to the lens surface 131Aa, with an apex t therebetween.

In use state of the reflection screen 10A, the unit lens 131A has the lens surface 131Aa located on the vertically upper side of the non-lens surface 131A, with the apex t situated therebetween.

In the unit lens 131A, as shown in FIG. 8B, the angle that the lens surface 131Aa makes with a plane parallel to the screen plane is α, while the angle that the non-lens surface 131Ab makes with a plane parallel to the screen plane is β (β>α).

In addition, the array pitch of the unit lenses 131A is P, and the lens height of the unit lenses 131A (the dimension from the apex t to a point v corresponding to the bottom of the valley between the unit lenses 131A, in the screen thickness direction) is h.

In FIG. 7 and the like, the unit lenses 131A are shown in such a manner that their array pitch P and the angles α and β are constant in the array direction thereof, for allowing easier understanding. In practice, however, the unit lenses 131A in the present embodiment have such a configuration that the array pitch P and the like are constant, but the angle α is gradually enlarged along the direction of going away from the point C (Fresnel center) in the array direction of the unit lenses 131A.

This configuration is not restrictive. For instance, the angle α and the like may be constant, and the array pitch P may gradually vary along the array direction of the unit lenses 131A. Thus, these factors can be appropriately modified according to the size of pixels in the image source LS for projecting the image light, the projection angle of the image source LS (the angle of incidence of the image light on the screen plane of the reflection screen 10A), the screen size (display size) of the reflection screen 10A, the refractive indices of the layers, etc.

In the present embodiment, an exemplary configuration is adopted in which the array pitch P is 100 μm, the angle α at the lower end of a central portion in the screen left-right direction of the reflection screen 10A is about 10 degrees, while the angle α at the upper end of the central portion in the screen left-right direction is about 18 degrees, and the angle β is 90 degrees.

The lens layer 13A is formed from a UV-curing resin such as urethane acrylate or epoxy acrylate. Incidentally, the lens layer 13A may also be formed from other ionizing radiation-curing resin such as electron beam-curing resin.

The lens layer 13A can be formed, for example, by a UV molding method in which one surface of the base layer 14A (in the present embodiment, the surface on the light diffusion layer 141A side) is pressed against a mold loaded with a UV-curing resin and designed to form a circular Fresnel lens shape, followed by irradiation with UV rays to cure the resin and then by demolding. Incidentally, the method for forming the lens layer 13A is not restricted to the just-mentioned method but may be selected appropriately.

The reflection layer 12A is a layer having a light-reflecting action. The reflection layer 12A is formed at least on the lens surfaces 131Aa.

As shown in FIGS. 7 and 8B, the reflection layer 12A in the present embodiment is formed on the lens surfaces 131Aa, but not formed on the non-lens surfaces 131Ab.

The reflection layer 12A can be formed by a method wherein a white or silver coating material, a UV-curing resin or thermosetting resin containing a white or silver pigment, beads or the like, a coating material containing particles or minute flakes obtained by pulverizing a vapor-deposited metallic film or a metallic foil or the like (of silver, aluminum or the like), or the like coating material is applied by any of various coating methods such as spray coating, die coating, screen printing, groove filling by wiping, etc., followed by curing. Further, the reflection layer 12A can be formed, for example, by vapor deposition or sputtering of a metal such as aluminum, silver, or nickel on the lens surface 131Aa or by transfer of a metallic foil onto the lens surface 131Aa.

The reflection layer 12A in the present embodiment is formed by vapor deposition of aluminum on the lens surface 131Aa.

The light absorption layer 11A is provided on the back side of the lens layer 13A and the reflection layer 12A, and has a light-absorbing action. As shown in FIGS. 7 and 8B, the light absorption layer 11A in the present embodiment is coating the reflection layer 12A and the non-lens surfaces 131Ab; thus, the light absorption layer 11A is formed on the non-lens surfaces 131Ab.

The light absorption layer 11A is formed by a method wherein a black or other dark colored coating material or a thermosetting resin or UV-curing resin containing a black or other dark colored pigment or dye or light-absorbing beads is applied to the back side (the Fresnel lens shape side) of the lens layer 13A (having the reflection layer 12A formed on each of the lens surfaces 131Aa), followed by curing.

Figure 9A:
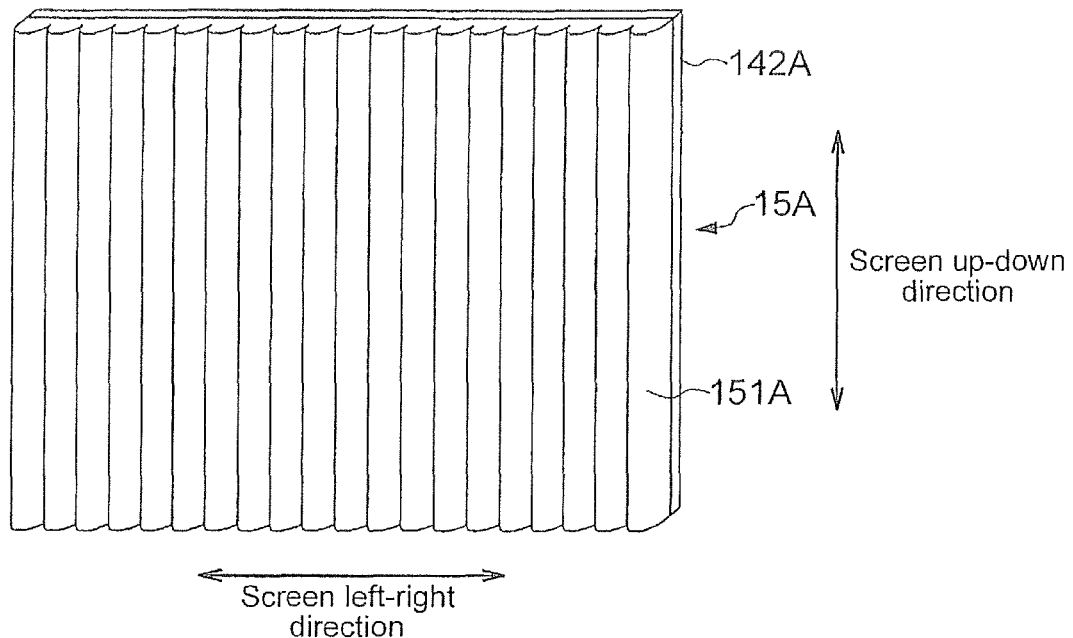
FIGS. 9A and 9B are figures for illustrating a surface lens layer in Second Embodiment.
Figure 9B:
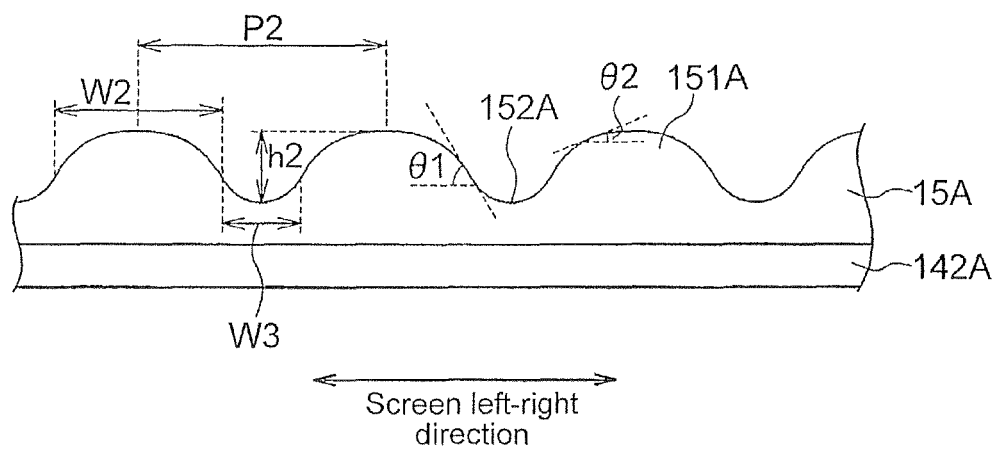

FIGS. 9A and 9B are figures for illustrating the surface lens layer 15A in the present embodiment. FIG. 9A is a figure showing the surface lens layer 15A as viewed from the observer side (the image source side). FIG. 9B is an enlarged view of part of a section of the surface lens layer 15A, the section being a section parallel to the array direction of the unit surface lenses 151A and parallel to the direction orthogonal to the screen plane (the thickness direction). In FIGS. 9A and 9B, only the surface lens layer 15A and the colored layer 142A are shown, and the other layers are omitted, for allowing easier understanding.

The surface lens layer 15A is a layer formed on the most image source side (the most observer side) in the reflection screen 10A. The surface lens layer 15A is provided at the image source side surface thereof with a lenticular lens shape in which a plurality of unit surface lenses 151A are arrayed.

The surface lens layer 15A is formed from an ionizing radiation-curing resin, such as a UV-curing resin, having a hard coating function.

The unit surface lenses 151A are each a columnar lens projected to the image source side. A plurality of the unit surface lenses 151A are arrayed in the screen left-right direction, with their longitudinal direction set in the screen up-down direction.

Between the unit surface lenses 151A in the present embodiment, there is formed a recess 152A which is recessed away from the image source side. The unit surface lenses 151A and the recesses 152A are alternately arrayed in the array direction.

As shown in FIG. 9B and the like, the unit surface lens 151A is so designed that the width thereof in the array direction is W2, the lens height is h2, and the width W2 is not less than the lens height ($W2 \geq h2$). In addition, the unit surface lens 151A is so shaped that its apex shows a projected shape composed of a more gently curved line, as compared with a general convex lens having part of the shape of a cylinder or an elliptic cylinder. A tangent to a part near the apex of the unit surface lens 151A is roughly parallel to the screen plane.

As shown in FIG. 9B, in the unit surface lens 151A, the angle $\theta 1$ that a tangent to the surface on the recess 152A side (the valley bottom side) makes with the screen plane is greater than the angle $\theta 2$ that a tangent to the surface on the apex side makes with the screen plane. In addition, the variation in the angle $\theta 1$ that the tangent to the surface on the recess 152A side (the valley bottom side) makes with the screen plane, per a predetermined length in the array direction, is greater than the variation in the angle $\theta 2$ that a tangent to the surface on the apex side makes with the screen plane, per the predetermined length in the array direction.

In addition, the width W3 of the recess 152A in the array direction is smaller than the width W2 of the unit surface lens 151A (W2>W3). The array pitch P2 of the unit surface lenses 151A corresponds to the sum of the width W2 and the width W3, namely, P2=W2+W3.

The surface lens layer 15A may have a smooth surface or a minutely rugged rough surface as an image source side surface thereof. Where the image source side surface of the surface lens layer 15A is a rough surface, the enhancing effect on the viewing angle in the screen left-right direction and the reducing effect on the reflection of images onto the ceiling can be enhanced.

While the surface lens layer 15A in the present embodiment has been described by showing an example in which the above-mentioned apex portion is shaped to be a more gently curved surface as compared with the side surface portion (see FIG. 9B), this is not restrictive. For example, there can be adopted a configuration in which the unit surface lens 151A is in the shape of part of a cylinder or part of an elliptic cylinder, or a configuration in which the unit surface lens 151A has a columnar lens shape composed of a plurality of curved surfaces. Besides, while an example in which the recess 152A is formed between the unit surface lenses 151A in the present embodiment has been described, a configuration can be adopted in which the recess 152A is not present between the unit surface lenses 151A.

The surface lens layer 15A is formed by use of an ionizing radiation-curing resin such as a UV-curing resin.

Figure 10A:
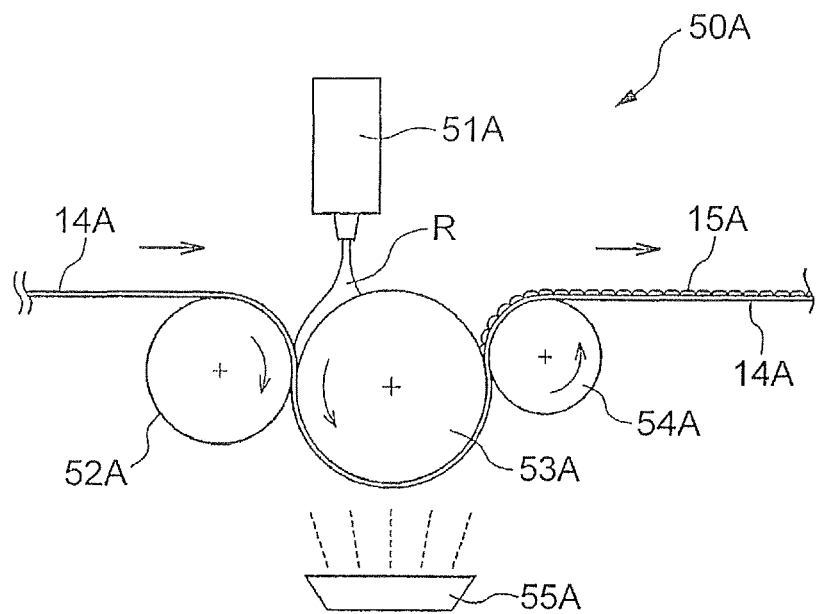
FIGS. 10A and 10B are figures for illustrating a method of forming the surface lens layer in Second Embodiment.
Figure 10B:
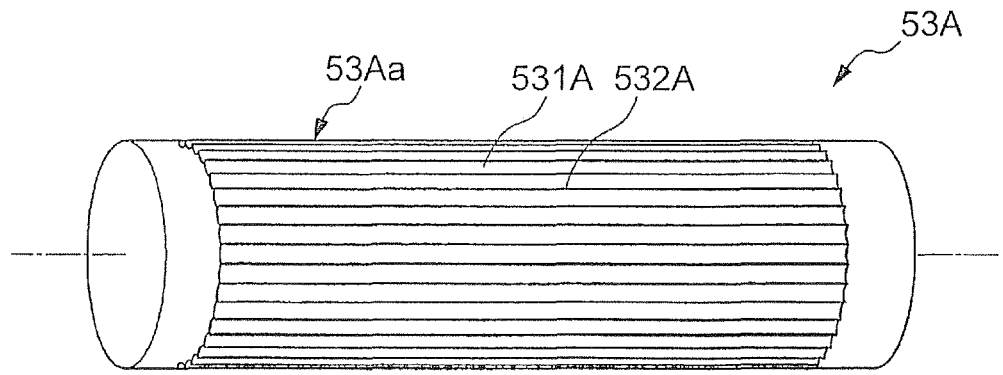

FIGS. 10A and 10B are figures for illustrating a method for forming the surface lens layer 15A in the present embodiment. FIG. 10A shows part of a surface lens layer forming device 50A for forming the surface lens layer 15A, and FIG. 10B shows a perspective view of a second roll 53A for giving the lenticular lens shape of the surface lens layer 15A.

The surface lens layer forming device 50A, for forming the surface lens layer 15A on one side of the base layer 14A, includes a nozzle 51A, a first roll 52A, a second roll 53A, a third roll 54A, and a UV irradiation part 55A.

The nozzle 51A supplies therethrough an uncured UV-curing resin R for forming the surface lens layer 15A, from a resin tank (not shown). While the nozzle 51A in the present embodiment discharges therethrough the UV-curing resin R onto a circumferential surface of the second roll 53A, this configuration is not restrictive; for example, the UV-curing resin R may be discharged onto the base layer 14A.

Each of the first roll 52A, the second roll 53A, and the third roll 54A is roughly cylindrical in shape, and can be driven to rotate with its center axis as an axis of rotation. In addition, the temperature of the second roll or the like is controlled by a temperature control section (not shown). Furthermore, the size of the gap between the first roll 52A and the second roll 53A, or the like, is controlled by a pressure control section (not shown).

The first roll 52A is a pressure roll which presses the base layer 14A against the second roll 53A with a predetermined pressure.

The second roll 53A is a mold for giving the lenticular lens shape of the surface lens layer 15A, and is formed with a shaping part 53Aa at the circumferential surface thereof. For example as shown in FIG. 10B, the shaping part 53Aa of the second roll 53A may have a configuration in which recessed molds 531A for shaping the unit surface lenses 151A and projected molds 532A for shaping the recesses 152A are alternately arrayed in the circumferential direction, with the longitudinal direction of the recessed molds 531A and the projected molds 532A set in parallel to the axial direction of the second roll 53A. Alternatively, the shaping part 53Aa may have a configuration in which recessed molds 531A and projected molds 532A are alternately arrayed in the axial direction of the second roll 53A and they extend in the circumferential direction.

The second roll 53A is produced by a method in which the surface of a metallic roll-shaped base material is subjected to hard copper plating or the like, followed by etching to thereby form the shaping part 53Aa. This is not restrictive. For example, the circumferential surface of the second roll 53A may be subjected to cutting by a cutting tool, or the like processing, to thereby shape the recessed molds 531A and the like.

As shown in FIG. 10A, the third roll 54A is a release roll which is provided adjacently to the second roll 53A and releases (strips) the base layer 14A from the second roll 53A.

The UV irradiation part 55A is a device for irradiation with UV rays for curing the UV-curing resin. Incidentally, the UV irradiation part is used because the surface lens layer 15A in the present embodiment is formed from a UV-curing resin. Other irradiation devices for irradiation with ionizing radiations such as electron beams, visible rays, X-rays, gamma rays, charged particle beams, etc. may also be used, in accordance with the resin forming the surface lens layer 15A.

In the present embodiment, a preformed web-shaped base layer 14A is continuously supplied to the surface lens layer forming device 50A. The base layer 14A has the colored layer 142A and the light diffusion layer 141A formed by co-extrusion. The base layer 14A is continuously fed to the surface lens layer forming device 50A, in a condition wherein the surface on the second roll 53A side is the surface on the colored layer 142A side.

Then, the shaping part 53Aa at the circumferential surface of the second roll 53A is supplied and filled with the UV-curing resin R, for forming the surface lens layer 15A, through the nozzle 51A. The base layer 14A is pressed against the second roll 53A, filled with the uncured UV-curing resin R, by the first roll 52A and is taken up onto the second roll 53A. Then, in the state where the base layer 14A is pressed against the shaping part 53Aa of the second roll 53A with the UV-curing resin R interposed therebetween, the UV irradiation part 55A irradiates the UV-curing resin R with UV rays from the base layer 14A side. The UV-curing resin R is cured by the UV rays with which it is irradiated, whereby the lenticular lens shape is imparted, and the surface lens layer 15A is integrally formed on one side of the base layer 14A.

After the UV-curing resin R is cured, the base layer 14A is stripped from the second roll 53A. The third roll 54A is so provided as to make contact with the base layer 14A which is in secure contact with the second roll 53A. With the third roll 54A rotated, the base layer 14A is released from the second roll 53A, together with the cured UV-curing resin R (the surface lens layer 15A).

In the subsequent steps, the lens layer 13A is formed on the side of the other-side surface (the light diffusion layer 141A) of the base layer 14A, the resulting web-shaped material is cut appropriately to a predetermined size, and, further, the reflection layer and the light absorption layer and the like are formed on each of the cut pieces, to complete the reflection screen 10A.

The manner in which image light and extraneous light are incident on the reflection screen 10A according to the present embodiment will now be described.

FIGS. 11A to 11C are figures for illustrating the manner in which the image light and the extraneous light are incident on the reflection screen 10A of the present embodiment. In FIG. 11A, part of a section passing through the point A and being parallel to the screen up-down direction of the reflection screen 10A and parallel to the thickness direction of the reflection screen 10A is shown in an enlarged form. FIG. 11B is a figure showing the reflective surface 10A as viewed from a lateral side, and FIG. 11C is a figure showing the reflection screen 10A as viewed from the screen up-down-directionally upper side. For easier understanding, the reflection screen 10A is shown in a simplified form in FIGS. 11B and 11C; in addition, the surface lens layer 15A, the base layer 14A, and the lens layer 13A are shown to have the same refractive index in FIG. 11A.

As shown in FIG. 11A, most of image light L1 projected from the image source LS is incident on the reflection screen 10A from below, and is transmitted through the surface lens layer 15A and the base layer 14A, to be incident on the unit lens 131A of the lens layer 13A.

Then, the image light L1 is incident on the lens surface 131Aa, is reflected by the reflection layer 12A, and outgoes from the reflection screen 10A toward the observer O side. Incidentally, since the image light L1 is projected from below the reflection screen 10A and the angle β is greater than the angle of incidence of the image light L1 at any point in the screen up-down direction of the reflection screen 10A, the image light L1 would not be directly incident on the non-lens surface 131Ab; therefore, the non-lens surfaces 131Ab would not influence the reflection of the image light L1.

On the other hand, as shown in FIG. 11A, unrequired extraneous lights G1 and G2 such as illumination light are mainly incident on the reflection screen 10A from above, and are transmitted through the surface lens layer 15A and the base layer 14A, to be incident on the unit lens 131A of the lens layer 13A.

Then, part of the extraneous light G1 is incident on the non-lens surface 131Ab to be absorbed by the light absorption layer 11A. Besides, part of the extraneous light G2 is incident on the lens surface 131Aa, and goes mainly toward the lower side of the reflection screen 10A, so that it does not directly reach the observer O side. Even if this extraneous light G2 should reach the observer O side, the quantity of the reaching light would be much smaller as compared with the image light L1. Accordingly, in the reflection screen 10A, the lowering in the contrast of the image due to the extraneous lights G1 and G2 can be suppressed.

Furthermore, as shown in FIG. 11B, part of the image light projected onto the reflection screen 10A may be reflected by the surface (front surface) of the reflection screen 10A.

In the case of a reflection screen 10A not provided with the surface lens layer 15A, particularly in the case where the image source side surface of the reflection screen 10A is a smooth surface or the like, part of the light L2 incident on an upper screen portion undergoes substantially regular reflection toward an upper side of the reflection screen 10A, as represented by light L3, to reach the ceiling or the like. Such light L3 causes reflection of the image onto the ceiling, thereby hampering pleasant viewing of the image. Particularly, in the case where the reflection screen 10A is disposed in a dark-room environment or where the projected image is motion video, the ceiling part onto which the image is reflected may have a conspicuous lightness, or obscure motion video may appear on the ceiling part. Consequently, when the observer O views the image displayed on the reflection screen 10A, pleasant viewing may be obstructed.

According to the reflection screen 10A of the present embodiment, however, the shape of the surface lens layer 15A allows most of the light reflected on the surface of the surface lens layer 15A to be diffused in the screen left-right direction, as represented by light L4 shown in FIG. 11C.

Therefore, the quantity of the light which would cause reflection of an image onto the ceiling can be greatly reduced, and such reflection onto the ceiling can be improved. In this instance, in addition, there is little light diffusively reflected toward the observer O side; therefore, blurring of the image or a lowering in the contrast of the image can be greatly suppressed, and a favorable image can be displayed.

Furthermore, the shape of the surface lens layer 15A ensures that the image light reflected by the reflection layer 12A outgoes while being diffused in the screen left-right direction. Therefore, the viewing angle in the screen left-right direction of the image can be widened, and a good viewing angle can be realized. In this instance, moreover, the amount of the diffusing material contained in the light diffusion layer 141A can be reduced, while realizing a good viewing angle in the screen left-right direction, particularly. Consequently, defective display, such as a lowering in frontal luminance, due to the diffusing material can be suppressed.

Here, reflection screens of Examples 1 and 2 of the present embodiment which have the surface lens layer 15A as above-mentioned and a reflection screen of Comparative Example which does not have the surface lens layer 15A were prepared, and evaluation of the reflection screens as to reflection of the image onto the ceiling was carried out.

Figure 12:
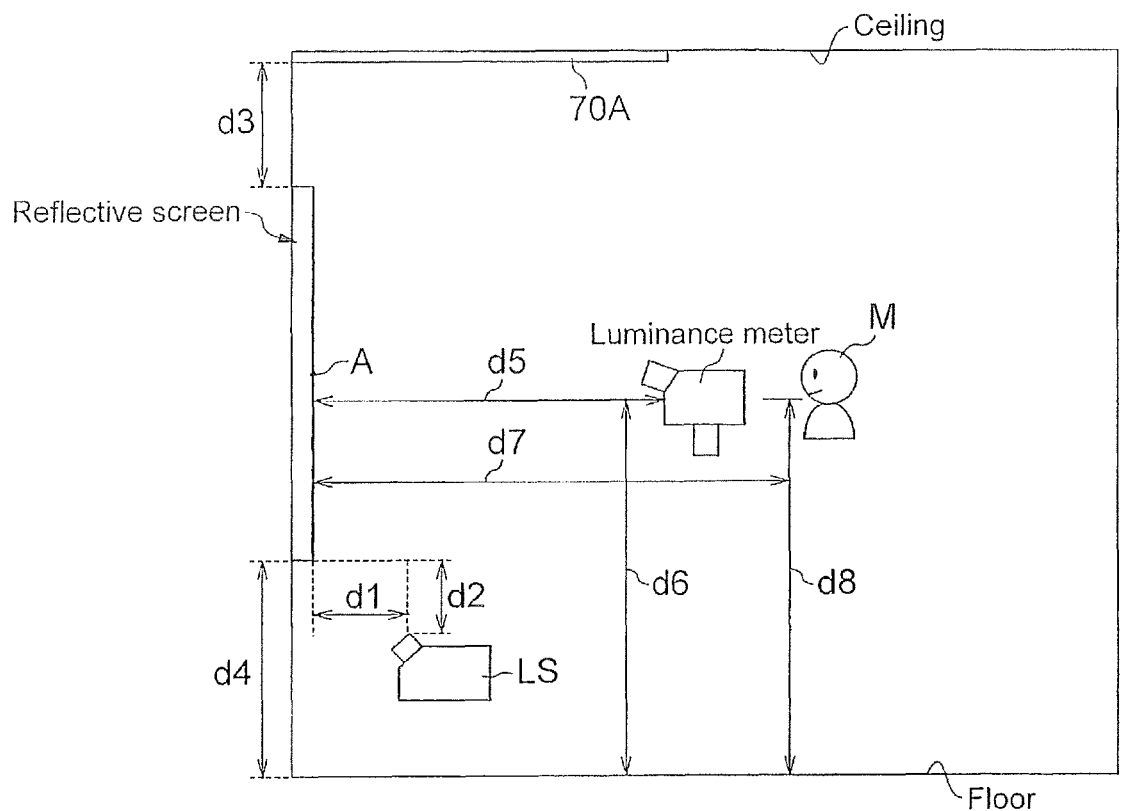
FIG. 12 is a figure for illustrating an evaluation method for reflection of image onto a ceiling.

FIG. 12 is a figure for illustrating the method of evaluating the reflection of the image onto the ceiling.

The reflection screens of Examples 1 and 2 correspond to the example of the reflection screen 10A in the present embodiment. The reflection screen of Example 1 and the reflection screen of Example 2 are the same with each other, except that the surface lens layer 15A in the former reflection screen has a smooth surface on the image source side while the surface lens layer 15A of the latter reflection screen has a rough surface on the image source side.

On the other hand, the reflection screen of Comparative Example does not have the surface lens layer 15A. This reflection screen is provided at the image source side surface thereof with a minutely rugged sheet-like matt layer (having an arithmetic mean roughness (JIS B0601-2001) of 0.6 μm, and a haze in the transmitted light of 7%, as measured by a haze meter (HM-150, produced by Murakami Color Research Laboratory Co., Ltd.; corresponding to ASTM D-1003)). In these points, the reflection screen of Comparative Example differs from the reflection screens of Examples 1 and 2.

In addition, the reflection screen of Comparative Example and the reflection screens of Examples 1 and 2 are controlled in regard of the diffusing material contained in the light diffusion layer 141A so that their gains are approximately equal. Accordingly, the amount of the diffusing material contained in the light diffusion layer 141A of the reflection screen of Comparative Example is greater than the amounts of the diffusing material contained in the light diffusion layers 141A of the reflection screens of Examples 1 and 2.

The reflection screens of Examples 1 and 2 and the reflection screen of Comparative Example are the same in shape, except for the above-mentioned differences.

The reflection screens of Examples 1 and 2 and Comparative Example each have a diagonal display size of 80 inches (1771 mm×996 mm). Each of the reflection screens of Examples 1 and 2 and Comparative Example is disposed on a wall surface in a room. A white screen 70 (white matt (KPV-ST80W, produced by Kikuchi Science Laboratory Inc.) is disposed on the ceiling portion on the upper side of each of the reflection screens of Examples 1 and 2 and Comparative Example.

Each of the reflection screens of Examples 1 and 2 and Comparative Example is so disposed that the distance d3 from its upper end to the white screen 70 on the ceiling is 0.25 m, and the distance d4 from its lower end to the floor is 0.5 m.

The image source LS is so disposed that its projection port for projecting the image light is located at a distance d1=0.32 m toward the observer side from the screen left-right-directional center of each of the reflection screens of Examples 1 and 2 and Comparative Example, and at a distance d2=0.1 m downward from the lower end of each of the reflection screens. In this case, the image light is incident on the point A (the center of the screen) of each of the reflection screens at an incidence angle of 62° in the screen up-down direction.

The reflection screens of Examples 1 and 2 and Comparative Example were evaluated as to the viewing angle characteristics in the screen left-right direction. For the evaluation, in a dark-room environment, white light such as to give an illuminance of 1,100 lx at the point A (the center of the screen) of each of the reflection screens was projected from the image source LS. In this condition, the luminance of each of the reflection screens was measured by use of a luminance meter (LS-110, produced by Konica Minolta Sensing, Inc.), in a plane passing through the point A and parallel to the screen left-right direction, while changing the observation angle with reference to the direction of the normal to the screen plane that passes through the point A. In this manner, luminance distribution in the screen left-right direction was measured, for each of the reflection screens.

In using the luminance meter, the position at a distance d5=3 m toward the image source side in the frontward direction relative to the screen plane passing through the point A of each of the reflection screens and at a distance d6=1.04 m from the floor surface, in the above-mentioned plane, was set as a reference position (observation angle: 0°). Luminance was measured at each of positions corresponding to observation angles of 0°, ±5°, ±10°, ±15°, ±20°, ±25°, ±30°, ±45°, ±60°, and ±80° (the right side of the measurer M facing the reflection screen is taken as a positive direction) toward the screen left-right direction relative to the normal direction to the screen plane passing through the point A, in a plane containing the reference position and parallel to the screen left-right direction.

In addition, contrast ratio in a bright-room environment (the illuminance of extraneous light such as illumination light is 150 lx at the center of the screen) was determined in the frontward direction relative to the screen plane. The contrast ratio is defined as the ratio (W/B) of the luminance (W) of the reflection screen when white-reproducing light is projected from the image source LS to the luminance (B) of the reflection screen when black-reproducing light is projected from the image source LS. As the contrast ratio is higher, a higher contrast is obtained and a sharper image is observed. As the contrast ratio is lower, on the other hand, a lower contrast is obtained and a whitish obscurer image is observed. The luminance (W) and the luminance (B) were measured by a luminance meter disposed in the above-mentioned reference position.

Furthermore, in a position at a distance d7=3 m toward the image source side from the reflection screen 10 and at a distance d8=1.04 m from the floor, in a dark-room environment, the measurer M determined the brightness of the region of reflection of light onto the ceiling (the reflection of light onto the ceiling) by visual inspection. As for evaluation, a condition wherein reflection of the image onto the ceiling does not worry the measurer M was rated good (◯), while a condition wherein reflection of the image onto the ceiling worries the measurer M (pleasant viewing is hampered) was rated bad (x).

TABLE 2

|  | | Comparative Example | Example 1 | Example 2 |
|---|---|---|---|---|
| Contrast ratio (W/B) | | 47.8 | 51.8 | 50.9 |
| Viewing angle | αH (°) | 25.3 | 27.2 | 28.2 |
|  | γH (°) | 58.0 | 63.9 | 65.6 |
| Reflection of images onto ceilig | | X | ◯ | ◯ |

Reflection of images onto ceiling ◯: much improved X: conspicuous

Table 2 is a table in which the evaluation results of the reflection screens of Examples 1 and 2 and Comparative Example are set forth.

Figure 13:
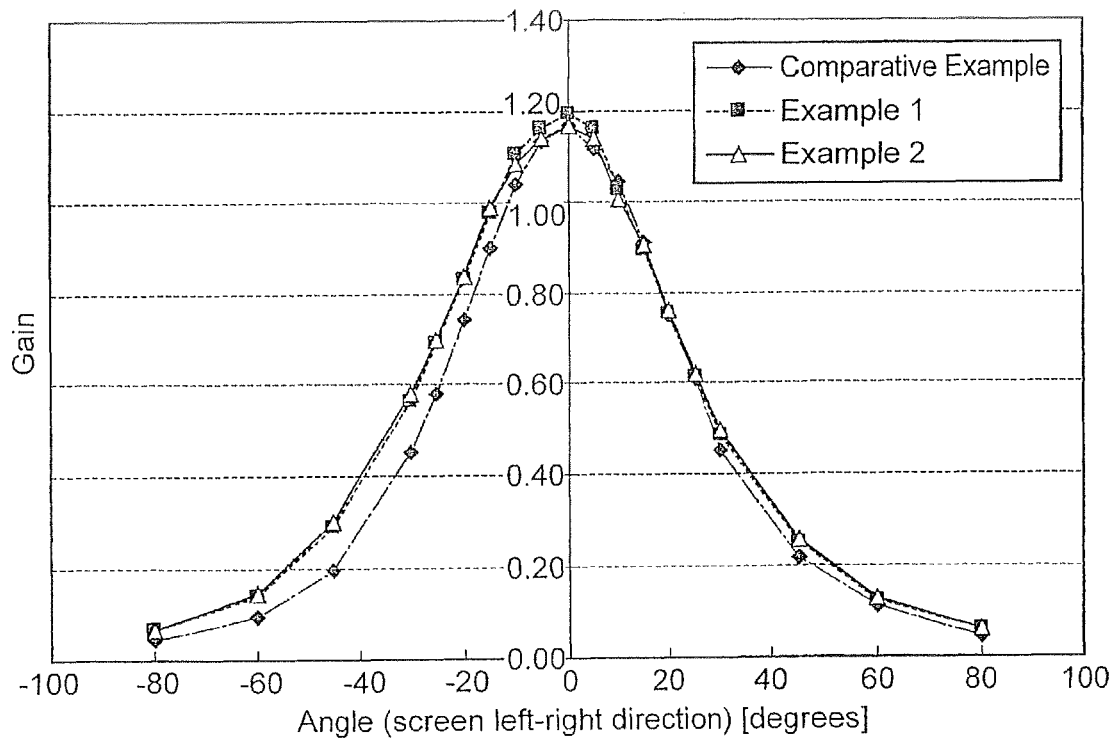
FIG. 13 is a diagram showing the distribution of gain in the screen left-right direction, for reflection screens according to Examples 1 and 2 and Comparative example.

FIG. 13 is a diagram showing the distribution of gain in the screen left-right direction, for the reflection screens of Examples 1 and 2 and Comparative Example. In FIG. 13, the gain obtained from the luminance measured by the above-mentioned method is taken on the axis of ordinates, and the outgoing angle of light in the screen left-right direction is taken on the axis of abscissas. The graphs shown in FIG. 13 represent the viewing angle characteristics in the screen left-right direction, for the reflection screens of Examples 1 and 2 and Comparative Example.

The gain here is a value obtained in the following manner. The illuminance at the point A (the center of the screen) on the most observer side surface of each of the reflection screens of Examples 1 and 2 and Comparative Example as well as the luminance of the light outgoing from each of the reflection screens of Examples 1 and 2 and Comparative Example was measured. This measurement was carried out at various angles relative to the normal direction to the screen plane in the screen left-right direction. From the thus measured illuminance and luminance, the gain is obtained according to the following formula (Formula 1).

$G = \pi \times B/I$ (Formula 1)

In Formula 1, G represents gain, π represents circular constant, B (cd/m$^2$) represents luminance, and I (lx) represents illuminance.

As shown in Table 2 and FIG. 13, the reflection screens of Examples 1 and 2 were higher than the reflection screen of Comparative Example in ½ angle αH and ¹⁄₁₀ angle γH in the screen left-right direction. Therefore, the reflection screens of Examples 1 and 2 can each show an enhanced viewing angle in the screen left-right direction, as compared with the reflection screen of Comparative Example.

In addition, as shown in Table 2, in the cases of the reflection screens of Examples 1 and 2, the brightness of the image reflection area on the ceiling under practical visual inspection was lowered, so that pleasant viewing of the image was attainable.

Furthermore, as compared with the reflection screen of Comparative Example, the reflection screens of Examples 1 and 2 allowed the amount of the diffusing material contained in the light diffusion layer to be reduced, while maintaining substantially the same level of gain.

From the foregoing it is seen that, according to the present embodiment, the lenticular lens shape of the surface lens layer 15A allows the image light to be diffused in the screen left-right direction, thereby allowing the viewing angle in the screen left-right direction to be widened.

In addition, according to the present embodiment, it is possible to greatly suppress the phenomenon in which the image light radiated obliquely from the image source located on a lower side of the reflection screen is reflected on the frontmost surface of the reflection screen to reach the ceiling above, resulting in reflection of the image onto the ceiling. Consequently, it is possible to realize pleasant viewing of the image.

Furthermore, according to the present embodiment, the amount of the diffusing material contained in the light diffusion layer 141A can be reduced, while maintaining a frontal luminance comparable to that in Comparative Example. Thus, such troubles as a lowering in the frontal luminance due to the isotropic diffusing action of the diffusing material can be suppressed, and a good bright image can be displayed.

<Modifications>

The above-described embodiment is not restrictive of the present invention, and various modifications and alterations are possible within the scope of the present invention.

(1) In the present embodiment, an example has been shown in which the surface lens layer 15A has a hard coating function and a function of reducing reflection of images onto the ceiling. The example, however, is not restrictive. An anti-reflection function, an anti-glare function, a UV-absorbing function, an antifouling function, an antistatic function, and so on may be appropriately selected and further imparted to the example. In this case, for instance, a layer or layers having these functions may be provided as separate layers between the surface lens layer 15A and the base layer 14A. Alternately, in forming the surface lens layer 15A, a resin or resins having the above-mentioned functions may be selected and used.

(2) While an example in which the unit lens 131A is roughly triangular in sectional shape as shown in FIG. 7 and the like has been shown in the present embodiment, this is not restrictive. For example, a roughly trapezoidal lens shape may be adopted in which a lens surface and a non-lens surface are opposed to each other, with an apex surface parallel to the screen plane being therebetween. In this case, the apex surface is preferably formed in such a region as not to contribute to reflection of the image light. On the apex surface, there may be formed a light absorption layer or a reflection layer.

(3) In the present embodiment, an example has been shown in which the reflection screen 10A includes the light absorption layer 11A, and the non-lens surfaces 131Ab are each covered with the light absorption layer 11A. However, this is not restrictive. A configuration may be adopted in which the reflection screen 10A does not include the light absorption layer 11A, and the reflection layer 12A is formed also on the non-lens surfaces 131Ab.

In this case, the reflection layer 12A may fill the valley parts between the unit lenses 131A, and its back-side surface may be substantially flat. Alternatively, the reflection surface 12A may be formed in a predetermined thickness along the rugged (recessed-and-projected) shape of the unit lenses 131A. Furthermore, the reflection layer 12A may not necessarily be uniform in thickness, if it has sufficient reflection characteristics.

(4) In the present embodiment, the reflection screen 10A may include a glass- or resin-made highly rigid base layer, for maintaining the flatness of the screen of the reflection screen 10A.

Besides, while an example in which the base layer 14A includes the light diffusion layer 141A and the colored layer 142A has been shown in the present embodiment, this is not restrictive. The base layer 14A may have only either one of the light diffusion layer 141A and the colored layer 142A. Furthermore, the number and/or positions of these component layers may be modified, as required.

(5) In the present embodiment, an example has been shown in which the reflection screen 10A is bonded to the support plate 30A provided on the back side thereof, through a pressure sensitive adhesive layer or the like (not shown) interposed therebetween, and is substantially flat plate-like in shape. This configuration, however, is not restrictive. For instance, the support plate 30A may be omitted, and the reflection screen 10A may be bonded to a wall surface or the like through a pressure sensitive adhesive layer or the like. Furthermore, the reflection screen 10A with the support plate 30A bonded to the back side thereof may be fixed to a wall surface, or the reflection screen 10A may be suspended from a wall surface by a support member such as a hook or hooks.

In addition, while an example wherein the reflection screen 10A is substantially flat plate-like in shape in use and in non-use state has been shown in the present embodiment, this is not restrictive. The reflection screen 10A may be of a rollable type so that it can be rolled up and stored in a roll form when not used. In the case of such a rollable type, the support plate 30A or the like is omitted, and the back side of the reflection screen 10A may be covered with a light-transmission reducing fabric- or resin-made light-blocking screen, a protective layer for enhancing scratch resistance, or the like component.

(6) In the present embodiment, an example has been shown wherein the unit lens 131A has the lens surface 131Aa and the non-lens surface 131Ab which are straight in profile in the section shown in FIG. 7, etc. This is not restrictive. For example, part of the profiles of the lens surface 131Aa and the non-lens surface 131Ab in this section may be a curved line.

Besides, in the present embodiment, an example has been shown in which the lens surface 131Aa and the non-lens surface 131Ab of the unit lens 131A are each composed of a single surface. This configuration, however, is not restrictive. For instance, at least one of the lens layer 131Aa and the non-lens layer 131Ab may include a plurality of surfaces.

(7) In the present embodiment, there has been shown an example in which the surface lens layer 15A and the lens layer 13A are each formed from a UV-curing resin, and they are integrally formed on respective surfaces of the base layer 14A by a UV molding method. However, this is not restrictive. For instance, the surface lens layer 15A and the lens layer 13A may each be formed from a thermoplastic resin, and they may be formed by an extrusion method, an injection molding method or the like.

(8) In the present embodiment, an example has been shown in which the image source LS is located below the reflection screen 10A with respect to the vertical direction, and the image light L is projected obliquely from below the reflection screen 10A. This configuration, however, is not restrictive. For instance, a configuration may be adopted in which the image light source LS is located above the reflection screen 10A with respect to the vertical direction, and the image light L is projected obliquely from above the reflection screen 10A. In this instance, it suffices for the reflection screen 10A to have a configuration wherein the lens layer 13A as shown in FIGS. 7, 8A and 8B and the like is inverted upside down.

Incidentally, the present embodiment and the modifications may be used in appropriate combination thereof, the detailed description of which is omitted. Besides, the present invention is not to be restricted by the above-described embodiment.

Third Embodiment

Now, a third embodiment of the present invention will be described, referring to the drawings, etc. Incidentally, FIG. 14 and other figures below are schematic drawings, in which the sizes and shapes of members or components are exaggerated, as required, for allowing easier understanding.

In addition, such terms as "plate" and "sheet" are used in the following. Ordinarily, these terms are used in the order of plate, sheet, and film according as thickness decreases; in the present specification, also, these terms are used in conformity with the ordinary use thereof. Such a use of different terms for different things, however, does not have any technical meaning, and, accordingly, each of the terms may be replaced by another, if necessary.

Further, numerical values (e.g., sizes), names of materials and the like of the members described herein are mere examples of embodiment, so that they are not restrictive but may be appropriately used selectively.

The terms used herein for specifying shapes and geometrical conditions, such as "parallel" and "orthogonal," include not only the strict meaning but also conditions accompanied by such degrees of errors that the members or parts can be regarded as parallel or orthogonal while exhibiting the same or equivalent optical functions to those of the strictly parallel or orthogonal members or parts.

Third Embodiment-1

Figure 14A:
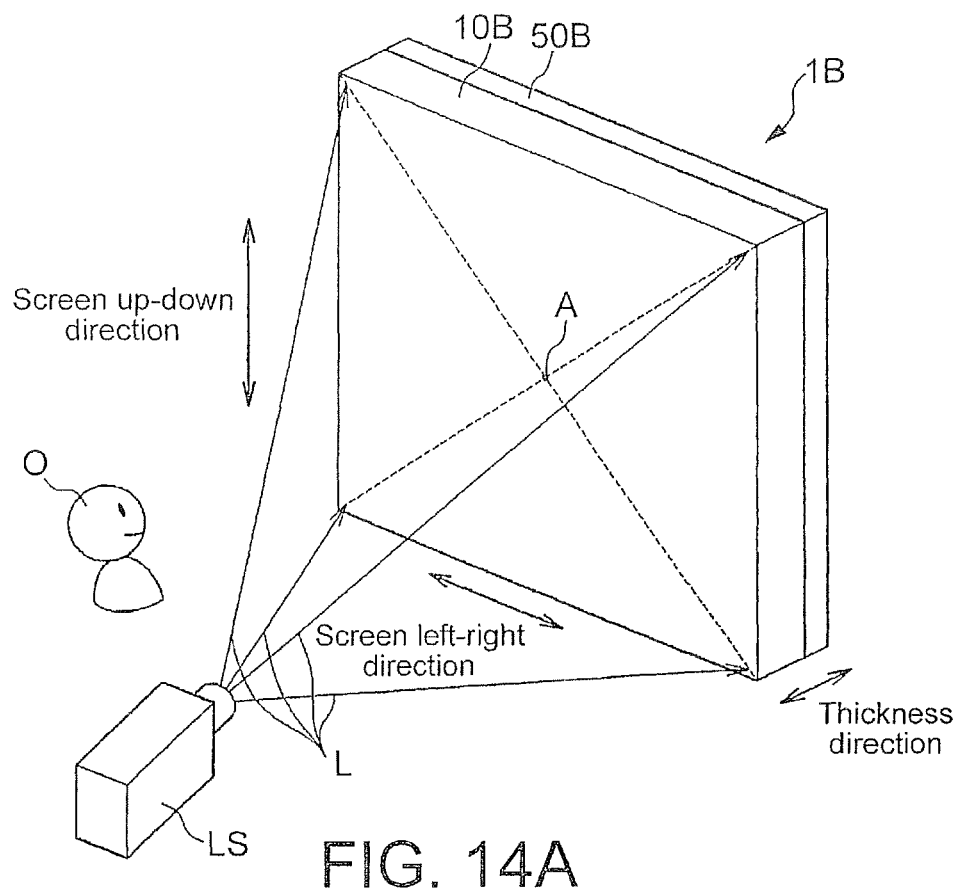
FIGS. 14A and 14B are figures for illustrating an image display system according to Third Embodiment-1.
Figure 14B:
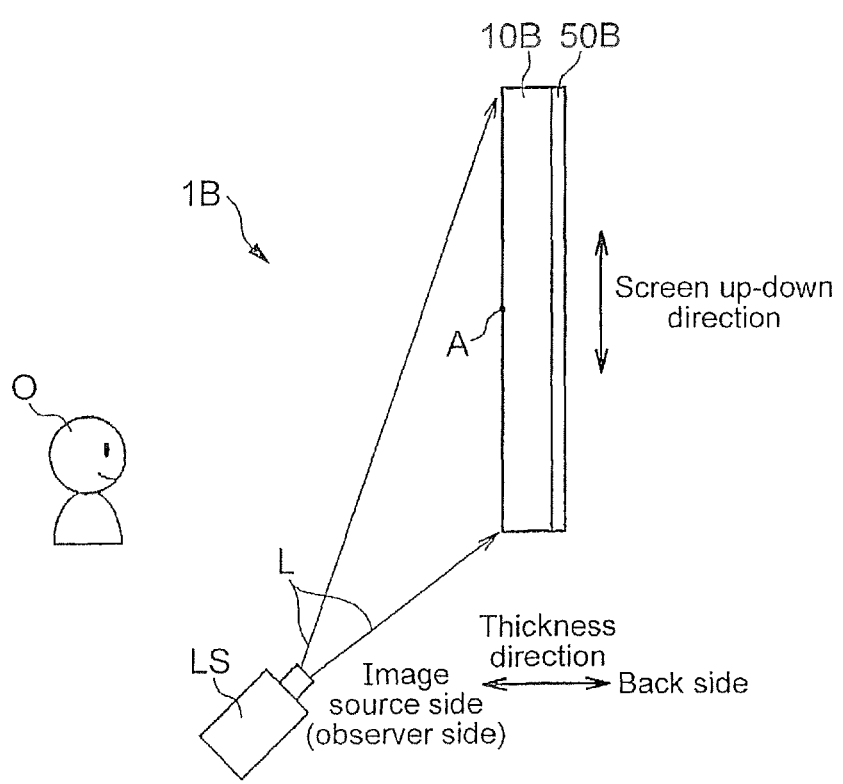

FIGS. 14A and 14B are figures for illustrating an image display system 1B according to Third Embodiment-1.

FIG. 14A is a perspective view of the image display system 1B, and FIG. 14B is a side view of the image display system 1B.

The image display system 1B includes a reflection screen 10B, an image source LS and so on. The image display system 1B of the present embodiment is a common image display system allowing image light L projected from the image source LS to be reflected by the reflection screen 10B, thereby displaying an image on the screen of the reflection screen 10.

The image display system 1B can be used, for example, as a front projection TV system or the like in which image light is projected from an image source LS.

The image source LS is a device for projecting image light L onto the reflection screen 10B. A general-purpose short focus type projector or the like can be used as the image source LS. The image source LS, in use state, is located at a position which is central in the screen left-right direction of the reflection screen 10B and below the screen (display region) of the reflection screen 10B, as the screen of the reflection screen 10B is viewed in the normal direction (the direction normal to the screen plane). Incidentally, the screen plane herein means a plane corresponding to the flat surface directions of the reflection screen 10B, as the reflection screen 10B is viewed in its entirety.

The image source LS can project the image light L from a position such that the distance thereof from the reflection screen 10B in the direction orthogonal to the screen of the reflection screen 10B (in the thickness direction of the reflection screen 10B) is much shorter, as compared with that in a general-purpose projector according to the related art. In other words, this image source LS is so located that the projection distance to the reflection screen 10B is shorter and the angle of incidence of the image light L on the reflection screen 10B is larger, as compared with the general-purpose projector according to the related art.

The reflection screen 10B is a screen which reflects the image light L projected by the image source LS toward the side of an observer O, thereby displaying an image. In use state, an observation screen of the reflection screen 10B has a substantially rectangular shape with the longitudinal direction thereof set in the screen left-right direction, as viewed from the side of the observer O.

In the following description, the screen up-down direction, the screen left-right direction, and the thickness direction are the screen up-down direction (vertical direction), the screen left-right direction (horizontal direction), and the thickness direction (depth direction) of the reflection screen 10B in use state, unless especially specified otherwise.

The reflection screen 10B is provided on the back side thereof with a flat plate-shaped support plate 50B, with a bonding layer (not shown) composed of a pressure sensitive adhesive or the like being interposed therebetween. The flatness of the reflection screen 10B is maintained by the support plate 50B. Incidentally, this configuration is not restrictive, and, for example, a configuration may be adopted in which the reflection screen 10B is supported by a frame member or the like (not shown) at its four edges or the like, whereby the flatness of the reflection screen 10B is maintained.

The reflection screen 10B has a large screen (display region), for example, 80 inches or 100 inches in diagonal size.

Figure 15:
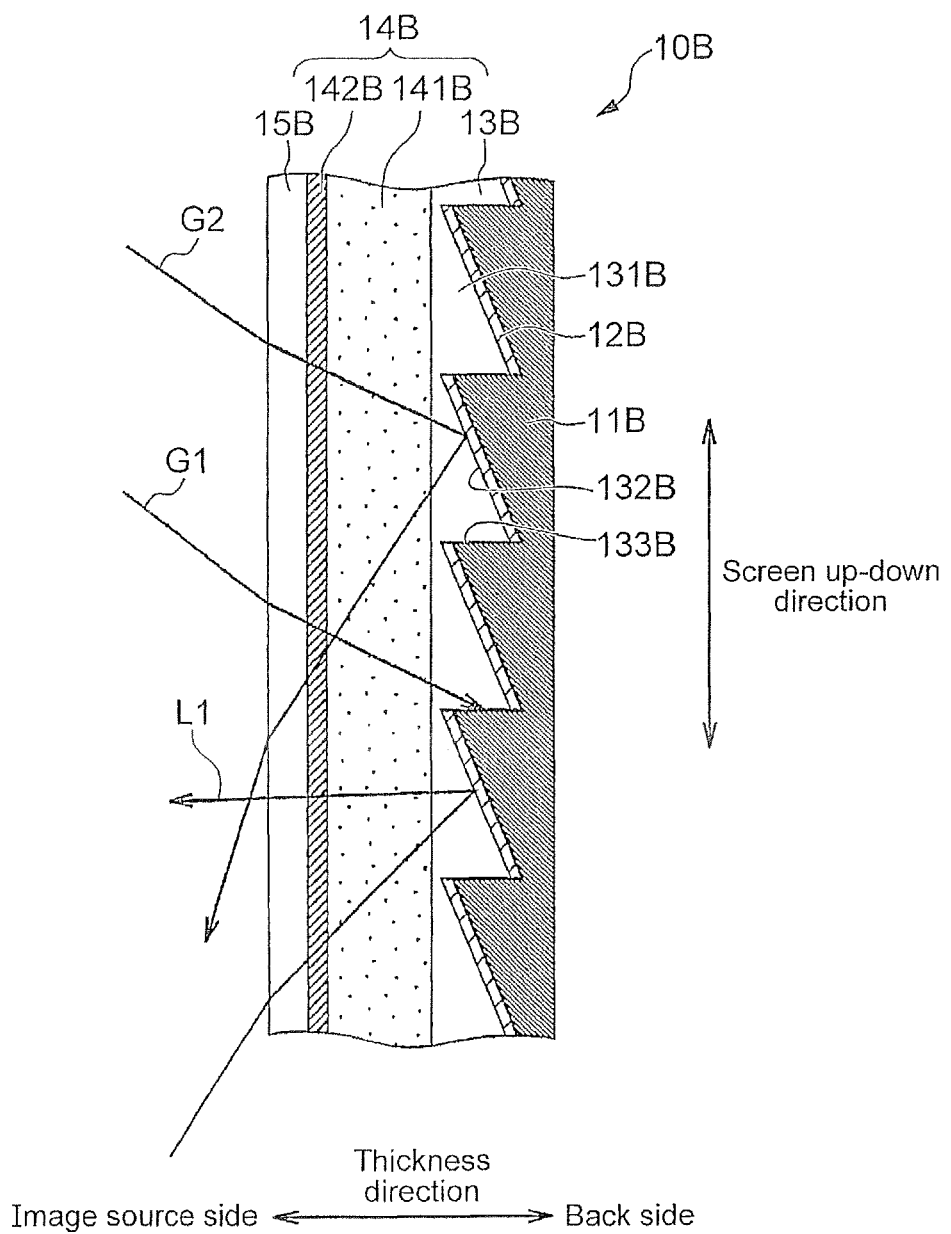
FIG. 15 is a figure for illustrating the layer configuration of a reflection screen in Third Embodiment-1.

FIG. 15 is a figure for illustrating the layer configuration of the reflection screen 10B in Third Embodiment-1.

In FIG. 15, part of a section passing through a point A (see FIGS. 14A and 14B) as the geometrical center (screen center) of the observation screen (display region) of the reflection screen 10B and being parallel to the screen up-down direction and being orthogonal to the screen plane (namely, being parallel to the thickness direction) is shown in an enlarged form.

The reflection screen 10B includes a surface optical layer 15B, a base layer 14B, a lens layer 13B, a reflection layer 12B, and a protective layer 11B, in this order from the image source side (the observer side).

Now, the layers will be described below.

The base layer 14B is a sheet-shaped member serving as a base for forming the lens layer 14B and the surface optical layer 15B. The surface optical layer 15B is integrally formed on the image source side (the observer side) of the base layer 14B, and the lens layer 13B is integrally formed on the back side of the base layer 14B.

The base layer 14B includes a light diffusion layer 141B and a colored layer 142B. The base layer 14B in the present embodiment has the light diffusion layer 141B and the colored layer 142B integrally laminated on each other.

The light diffusion layer 141B is a layer in which a light-transmitting resin is used as a base material and a diffusing material capable of diffusing light is contained. The light diffusion layer 141B has a function of broadening the viewing angle and a function of enhancing in-plane uniformity of brightness.

Examples of the resin which can be used as the base material of the light diffusion layer 141B include PET (polyethylene terephthalate) resin, PC (polycarbonate) resin, MS (methyl methacrylate-styrene) resin, MBS (methyl methacrylate-butadiene-styrene) resin, acrylic resin, TAC (triacetyl cellulose) resin, and PEN (polyethylene naphthalate) resin. Examples of the diffusing material which can be used here include particles of a resin such as acrylic resins, styrene resins, acrylic-styrene copolymer resins, etc. and inorganic particles based on silicon or the like. The average particle diameter of the diffusing material is preferably about 1 to 50 µm.

The thickness of the light diffusion layer 141B, which varies depending on such factors as the screen size of the reflection screen 10B, is preferably about 100 to 3,000 µm, from the viewpoint of avoiding blurring of images and attaining such advantageous as a sufficient viewing angle and in-line uniformity of brightness.

The colored layer 142B is a layer colored with a grey or black or the like colored dye, pigment or the like for realizing a predetermined transmittance. In the present embodiment, the colored layer 142B is located on the image source side (the observer side) of the light diffusion layer 141B.

The colored layer 142B has a function of absorbing unrequired extraneous light (e.g., illumination light) incident on the reflection screen 10B as well as stray light, thereby enhancing the contrast of the image.

The colored layer 142B is formed, for example, from PET resin, PC resin, MS resin, MBS resin, acrylic resin, TAC resin, PEN resin or the like which contains a dye or pigment.

Though depending on the screen size of the reflection screen 10B, the colored layer 142B preferably has a thickness of about 30 to 3,000 µm, and preferably has a transmittance of about 30 to 80%.

The base layer 14B is formed in an integrally laminated form by co-extrusion of the light diffusion layer 141B and the colored layer 142B.

Figure 16A:
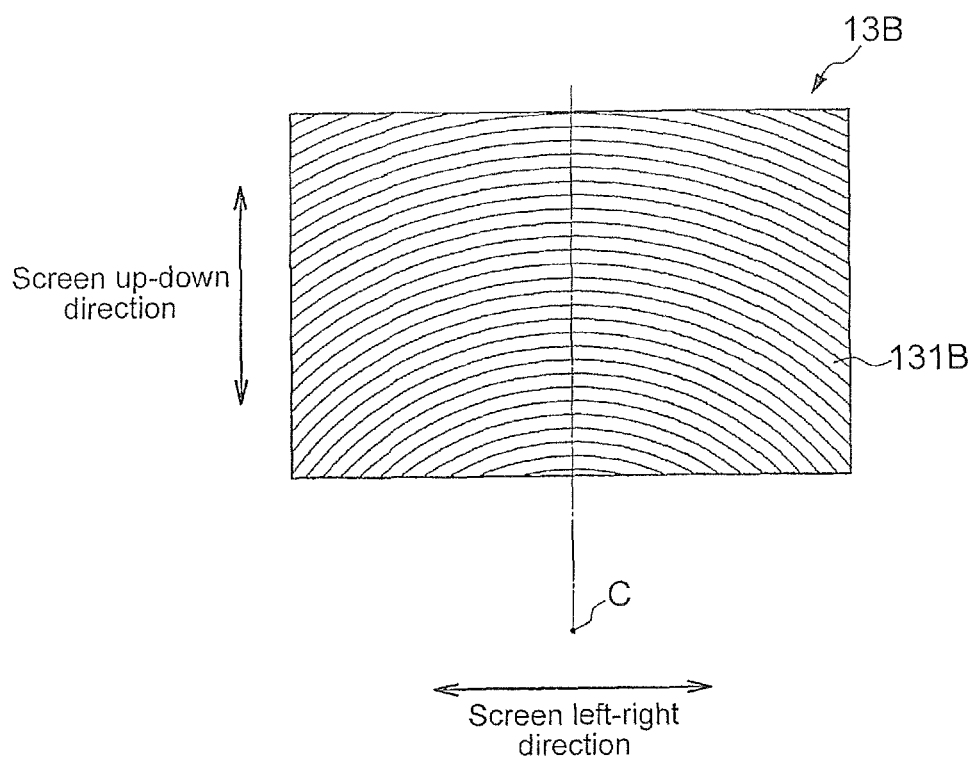
FIGS. 16A and 16B are figures for illustrating a lens layer 13B.
Figure 16B:
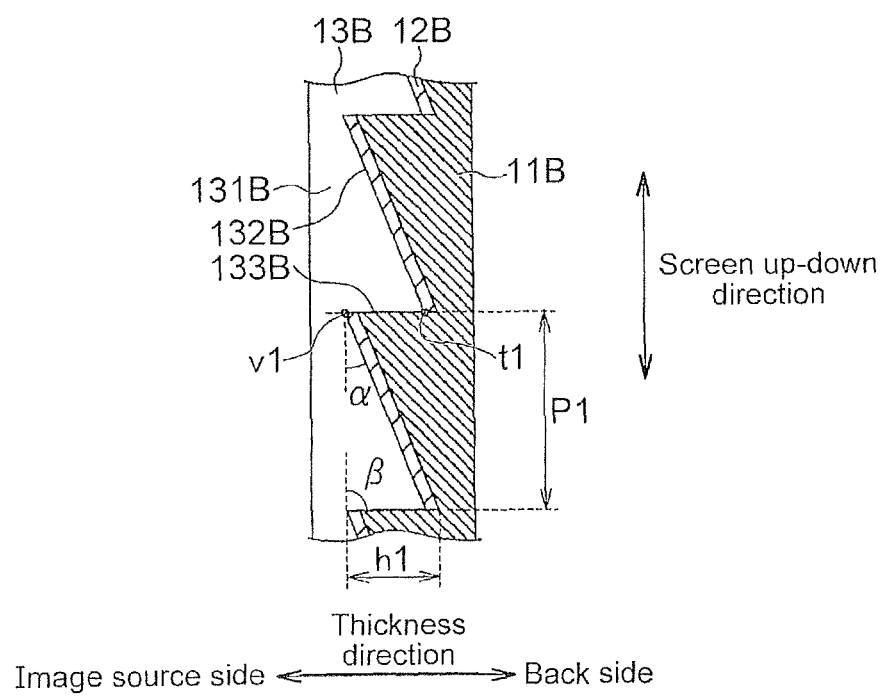

FIGS. 16A and 16B are figures for illustrating the lens layer 13B.

FIG. 16A shows the lens layer 13B as observed from the back side (in the normal direction), wherein the reflection layer 12B and the protective layer 11B are omitted for allowing easier understanding. FIG. 16B shows part of the section shown in FIG. 15, in a further enlarged form.

The lens layer 13B is a light-transmitting layer provided on the back side of the base layer 14B. As shown in FIG. 16A, the lens layer 13B is provided on the back side thereof with a circular Fresnel lens shape in which a plurality of unit lenses 131B are arrayed concentrically. In this circular Fresnel lens shape, a point C serving as the optical center (Fresnel center) is located in a position which is outside of the screen (display region) of the reflection screen 10B and is below the reflection screen 10B.

While an example in which the lens layer 13B has the circular Fresnel lens shape is described in the present embodiment, a configuration may be adopted in which the lens layer 13B has a linear Fresnel lens shape having unit lenses 131B arrayed in the screen up-down direction.

As shown in FIGS. 15 and 16B, the unit lenses 131B are each substantially triangular in sectional shape in a section which is parallel to the direction orthogonal to the screen plane (the thickness direction of the reflection screen 10B) and is parallel to the array direction of the unit lenses 131B.

The unit lens 131B is projected to the back side, and includes a lens surface 132B and a non-lens surface 133B opposed to the lens surface 132B, with an apex t1 therebetween.

In use state of the reflection screen 10B, the unit lens 131B has the lens surface 132B located on the vertically upper side of the non-lens surface 133B, with the apex t1 interposed therebetween.

In the unit lens 131B, as shown in FIG. 16B, the angle that the lens surface 132B makes with a plane parallel to the screen plane is $\alpha$, while the angle that the non-lens surface 133B makes with a plane parallel to the screen plane is $\beta$ ($\beta > \alpha$).

In addition, the array pitch of the unit lenses 131B is P1, and the lens height of the unit lenses 131B (the dimension from the apex t1 to a point v1 corresponding to the bottom of the valley between the unit lenses 131B, in the screen thickness direction) is h1.

In FIG. 15 and the like, the unit lenses 131B are shown in such a manner that their array pitch P1 and the angles α and β are constant in the array direction thereof, for allowing easier understanding. In practice, however, the unit lenses 131B in the present embodiment have such a configuration that the array pitch P1 is constant, but the angle α is gradually enlarged along the direction of going away from the point C (Fresnel center) in the array direction of the unit lenses 131B.

This configuration is not restrictive. For instance, the angle α and the like may be constant, and the array pitch P1 may gradually vary along the array direction of the unit lenses 131B. Thus, these factors can be appropriately modified according to the size of pixels in the image source LS for projecting the image light, the projection angle of the image source LS (the angle of incidence of the image light on the screen plane of the reflection screen 10B), the screen size (display size) of the reflection screen 10B, the refractive indices of the layers, etc.

The lens layer 13B is formed from a UV-curing resin such as urethane acrylate or epoxy acrylate. Incidentally, the lens layer 13B may also be formed from other ionizing radiation-curing resin such as electron beam-curing resin.

The lens layer 13B can be formed, for example, by a UV molding method in which one surface of the base layer 14B (in the present embodiment, the surface on the light diffusion layer 141B side) is pressed against a mold loaded with a UV-curing resin and designed to form a circular Fresnel lens shape, followed by irradiation with UV rays to cure the resin and then by demolding. Incidentally, the method for forming the lens layer 13B is not restricted to the just-mentioned method but may be selected appropriately.

The reflection layer 12B is a layer having a light-reflecting action. The reflection layer 12B is formed at least on the lens surfaces 132B.

As shown in FIGS. 15 and 16B, the reflection layer 12B in the present embodiment is formed on the lens surfaces 132B, but not formed on the non-lens surfaces 133B.

The reflection layer 12B is formed, for example, by vapor deposition or sputtering of a metal such as aluminum, silver, or nickel on the lens surfaces 132B or by transfer of a metallic foil onto the lens surfaces.

The protective layer 11B is a layer provided on the back side of the lens layer 13B and the reflection layer 12B. The protective layer 11B has a function of restraining such troubles as deterioration or peeling of the reflection layer 12B, breakage of the reflection layer 12B and the lens layer 13B, etc. and a function of protecting the reflection layer 12B and the lens layer 13B. In addition, the protective layer 11B has a light-absorbing function.

As shown in FIGS. 15 and 16B, the protective layer 1113 is covering the reflection layers 12B and the non-lens surfaces 133B from the back side. Therefore, the protective layer 11B is formed on the non-lens surfaces 133B. In addition, the protective layer 1113 is sufficiently filling the recessed-and-projected shape of the unit lenses 131B of the lens layer 13B, and the back-side surface thereof is a substantially flat surface parallel to the screen plane.

In designing the protective layer 11B, the dimension from the apex t1 of the unit lens 131B to the back-side surface of the protective layer 11B in the thickness direction of the reflection type screen 10B is preferably set to be about 5 to 100 µm, from the viewpoint of promising a sufficient protective function, a sufficient light-absorbing function, etc.

Incidentally, the protective layer 11B may have its back-side surface in a recessed-and-projected shape (for example, the protective layer 11B may be formed in a substantially constant thickness along the recessed-and-projected shape of the unit lenses 131B), insofar as it has a sufficient protective function and a sufficient light-absorbing function.

The protective layer 11B is formed, for example, in the following manner. A urethane resin, an epoxy resin, an acrylic resin, or a mixture of such resins is prepared as a base material. The base material is admixed with a black or other dark colored coating material, a black or other dark colored dye or pigment or the like, or beads containing such a dye or pigment or the like, as a light-absorbing material, and admixed further with various additives, e.g., an additive having a function of protecting the reflection layers 12B from deterioration such as oxidation. The resultant admixture is applied to the back side of the lens layer 13B, which has been formed thereon with the reflection layers 12B, and the applied admixture is cured, to form the protective layer 11B. Incidentally, the protective layer 11B may be formed by use of a thermosetting resin or UV-curing resin containing a light-absorbing material and various additives, or by use of a black coating material or the like.

Figure 17A:
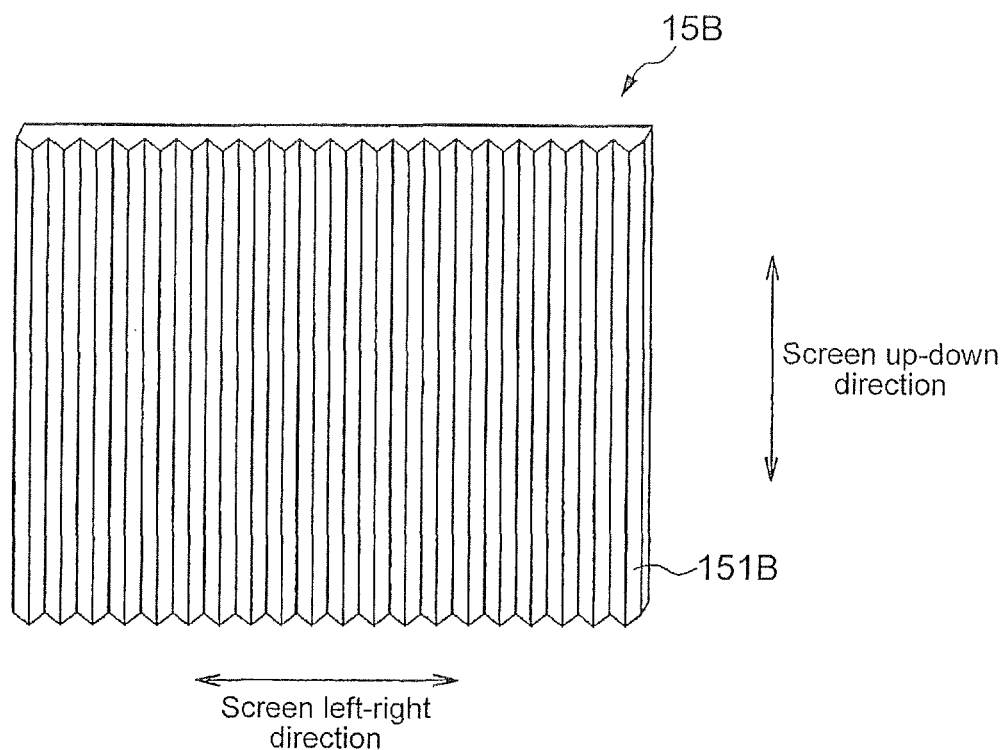
FIGS. 17A and 17B are figures for illustrating a surface optical layer in Third Embodiment-1.
Figure 17B:
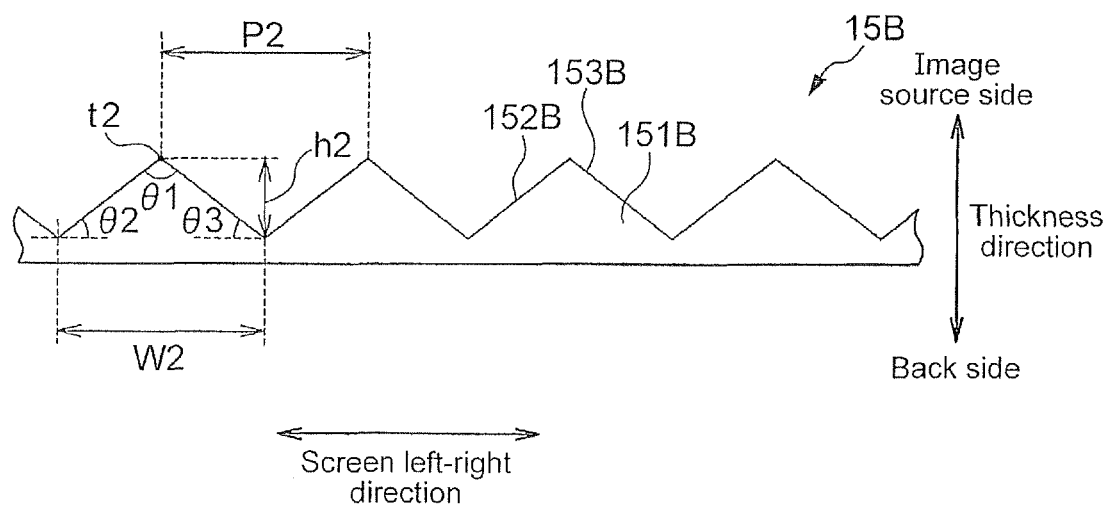

FIGS. 17A and 17B are figures for illustrating the surface optical layer 15B in Third Example-1. FIG. 17A shows the surface optical layer 15B as viewed from the observer side (the image source side). FIG. 17B shows, in an enlarged form, part of a section of the surface optical layer 15B, the section being parallel to the array direction of unit optical elements 151B and parallel to the direction (thickness direction) orthogonal to the screen plane. Incidentally, in FIGS. 17A and 17B, only the surface optical layer 15B is shown and the other layers are omitted, for allowing easier understanding.

The surface optical layer 15B is a layer formed on the most image source side (most observer side) in the reflection type screen 10B, and has a plurality of unit optical elements 151B arrayed at its surface on the image source side.

The surface optical layer 15B is formed from an ionizing radiation-curing resin, such as UV-curing resin, having a hard coating function. Incidentally, the surface optical layer 15B may be formed from a thermoplastic resin or the like.

The unit optical elements 151B are each roughly in the shape of a triangular prism projected to the image source side. A plurality of the unit optical elements 151B are arrayed in the screen left-right direction, with their longitudinal direction set in the screen up-down direction.

As shown in FIG. 17B and the like, the unit optical elements 151B are so designed that the array pitch in the array direction thereof is P2, the lens height is h2, and the width of each thereof in the array direction is W2 (W2=P2).

The apex angle of the unit optical elements 151B is θ1. The unit optical elements 151B are substantially isosceles triangular in sectional shape in a section which is parallel to the array direction thereof and parallel to the normal direction to the screen plane. The angle that one slant surface 152B of the unit optical element 151B makes with a plane parallel to the screen plane is θ2, and the angle that the other slant surface 153B (opposed to the one slant surface 152B, with an apex t2 interposed therebetween) makes with a plane parallel to the screen plane is θ3.

In the case where the apex angle θ1 is 90°, the light reflected on the reflection surface 12B to go toward the observer side along the frontward direction with reference to the screen left-right direction may undergo total reflection on the slant surfaces 152B and 153B of the unit optical element 151B so as to go again toward the back side. Due to this phenomenon, the image may become darker. In view of this, the apex angle θ1 is preferably not 90°.

In addition, for example where the apex angle θ1 is an acute angle (0°<θ1<90°, the reflection of the image light toward the ceiling side as described below can be suppressed, but the frontal luminance of the image tends to be somewhat lowered.

Besides, where the apex angle θ1 is an obtuse angle (θ1>90°), the frontal luminance of the image is enhanced as compared with the case of the acute angle, but the reflection of the image light toward the ceiling side is somewhat strengthened.

Accordingly, in designing the apex angle θ1, it may be appropriately selected according to such factors as the environment in which the reflection screen 10B is used, the screen size of the same, and the desired optical performance.

In addition, the array pitch P2 of the unit optical elements 151B is preferably smaller than the array pitch P1 of the unit lenses 131B, from the viewpoint of suppression of moire or the like.

Referring to FIG. 15 and the like, behaviors of the image light L1 and extraneous lights G1 and G2 which are incident on the reflection screen 1013 in the present embodiment will be described. For allowing easier understanding, the image light L1 and the extraneous lights G1 and G2 shown in FIG. 15 are illustrated while assuming that the surface optical layer 15B, the base layer 14B, and the lens layer 13B have the same refractive index and while omitting such factors as the diffusing action of the light diffusion layer 141B.

As shown in FIG. 15, most of the image light L1 projected from the image source LS is incident on the reflection screen 10B from below, and is transmitted through the surface optical layer 15B and the base layer 14B, to be incident on the unit lens 131B of the lens layer 13B.

Then, the image light L1 is incident on the lens surface 132B, where it is reflected by the reflection layer 12B, to outgo from the reflection screen 10B toward the observer O side. In this instance, the image light L1 is projected onto the reflection screen 10B from a lower side, and the angle β is greater than the incidence angle of the image light L1 at each point in the screen up-down direction of the reflection screen 10B. This ensures that the image light L1 would not be directly incident on the non-lens surface 133B, and, therefore, the non-lens surfaces 133B do not influence the reflection of the image light L1.

On the other hand, the unrequired extraneous lights G1 and G2 such as illumination light are incident on the reflection screen 10B mainly from above, as shown in FIG. 15, and are transmitted through the surface optical layer 15B and the base layer 14B, to be incident on the unit lens 131B of the lens layer 13B.

Then, part of the extraneous light G1 is incident on the non-lens surface 133B, and is absorbed by the protective layer 11B. Besides, part of the extraneous light G2 is reflected on the lens surface 132B, to go mainly toward a lower side of the reflection screen 10B. Therefore, this extraneous light G2 would not directly reach the observer O side, and, even if it should reach the observer O side, the amount of the reaching extraneous light G2 is much smaller as compared with the amount of the image light L. In the reflection screen 10B, accordingly, it is possible to restrain the contrast of the image from being lowered due to the extraneous lights G1 and G2.

Here, depending on such factors as the shape of the frontmost surface (the surface on the most observer side) of the reflection screen 10B, part of the image light projected onto the reflection screen 10B may be reflected on the surface of the reflection screen 10B.

FIGS. 18A to 18D are figures for illustrating the function of the surface optical layer 15B in Third Embodiment-1.

Figure 18A:
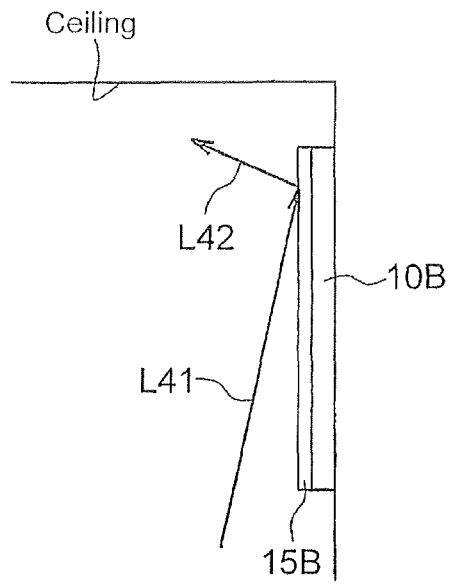
FIGS. 18A to 18D are figures for illustrating a function of the surface optical layer in Third Embodiment-1.
Figure 18B:
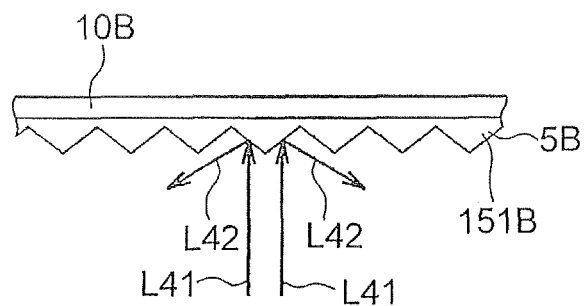
Figure 18C:
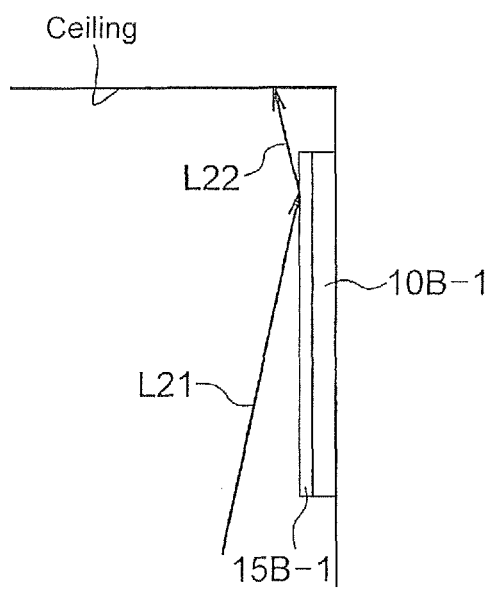
Figure 18D:
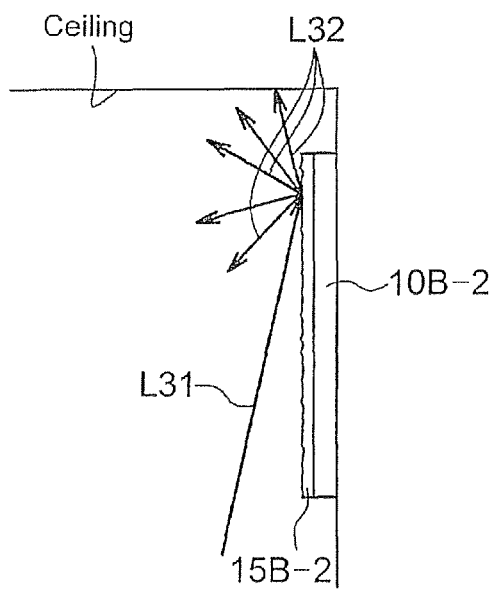

FIG. 18A shows the reflection screen 10B in the present embodiment as viewed from a lateral side, and FIG. 18B shows the reflection screen 10B in the present embodiment as viewed from the screen up-down-directionally upper side. FIG. 18C shows a reflection screen 10B-1 according to a comparative example as viewed from a lateral side, and FIG. 18D shows a reflection screen 10B-2 according to another comparative example as viewed from a lateral side. In FIGS. 18A to 18D, each of the reflection screens 10B, 10B-1, and 10B-2 is shown in simplified form, for allowing easier understanding.

The reflection screen 10B-1 of the comparative example is configured in the same way as the reflection screen 10B of the present embodiment, except that it does not have the surface optical layer 15B but, instead, it has a surface layer 15B-1 which has a smooth surface on the image source side.

The reflection screen 10B-2 of the comparative example is configured in the same manner as the reflection screen 10B of the present embodiment, except that it does not have the surface optical layer 15B but, instead, it has a surface matt layer 15B-2. The surface matt layer 15B-2 is a layer which has a minutely rugged (minutely recessed-and-projected) surface and, hence, has an action of diffusing light isotropically.

In the reflection screen 10B-1, its surface on the image source side is a smooth surface. Therefore, as shown in FIG. 18C, part of image light L21 incident on an upper portion of the screen undergoes substantially regular reflection toward an upper side of the reflection screen 10B-1, as represented by light L22, to reach the ceiling or the like. Such light L22 causes reflection of the image onto the ceiling, thereby hampering pleasant viewing of the image. Especially where the reflection screen 10B-1 is disposed in a dark-room environment or where the projected image is motion video or where the reflection screen 10B-1 has a large screen size, the brightness of the area of reflection onto the ceiling would be conspicuous or an obscure motion video would appear on the ceiling portion. Consequently, when the observer O views the image displayed on the reflection screen 10B-1, pleasant viewing is greatly obstructed.

In the case of the reflection screen 10B-2, of image light L31 incident on an upper portion of the screen, a light L32 reflected toward the ceiling is somewhat reduced in amount as compared with the case of the reflection screen 10B-1. As shown in FIG. 18D, however, at the time of incidence on the reflection screen 10B-2, the light L32 as part of the image light L31 would be reflected on the surface of the surface matt layer 15B-2 in an isotropically diffusing manner. As a result, the image would be blurred, or the contrast of the image on an upper screen portion would be lowered.

In contrast to these phenomena, according to the reflection screen 10B of the present embodiment, the shape of the surface optical layer 15B ensures the following. As shown in FIGS. 18A and 18B, the light L42 as part of the image light 41 incident on an upper screen portion which is reflected on the surface of the surface optical layer 15B is deflected and reflected in the screen left-right direction on the slant surfaces of the unit optical elements 151B.

According to the present embodiment, therefore, the image light reflected toward the ceiling side so as to cause the reflection of images onto the ceiling can be greatly reduced in amount, and such reflection of images onto the ceiling can be improved. In this instance, in addition, there is little light that is diffusively reflected toward the observer O side. Therefore, according to the present embodiment, it is possible to greatly suppress blurring of the image or lowering in the contrast. Consequently, a favorable image display can be achieved.

Further, the surface optical layer 15B is not complicated in shape, and is easy to produce. This allows the reflection screen 10B to be inexpensive and high in performance.

Furthermore, when the image light reflected on the reflection layer 12B outgoes from the reflection screen 10B, the image light is deflected leftward and rightward by the unit optical elements 151B. Therefore, the viewing angle in the screen left-right direction can be broadened, and, consequently, the amount of the diffusing material to be used in the light diffusion layer 141B can be reduced.

Incidentally, in the present embodiment, the unit optical elements 151B may vary in sectional shape, either gradually or stepwise, in the screen left-right direction, for example.

Figure 19A:
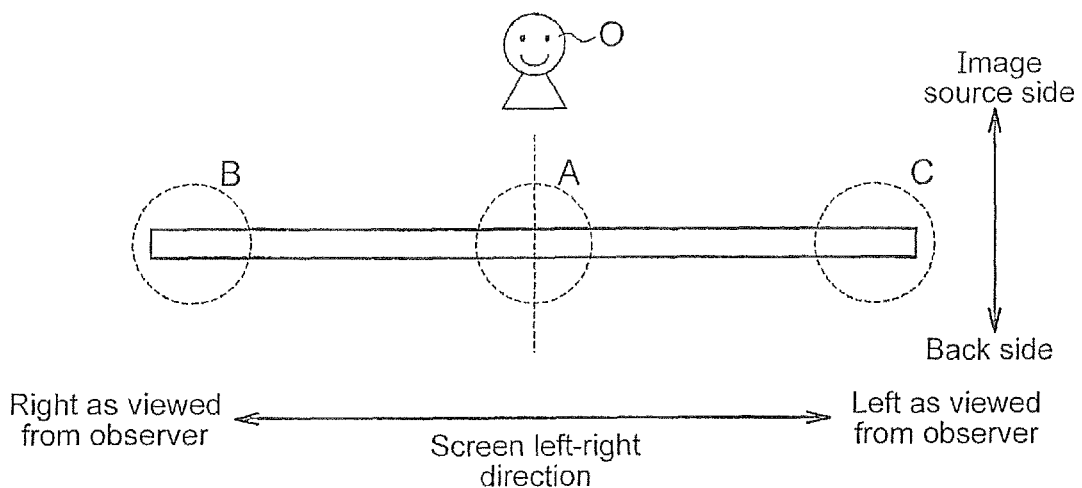
FIGS. 19A to 19D are figures for illustrating the manner of a surface optical layer in another mode of Third Embodiment-1.
Figure 19B:
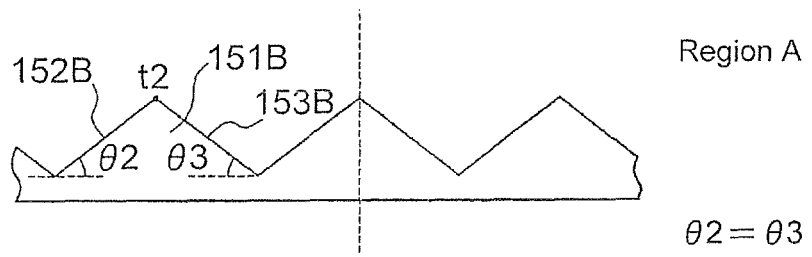
Figure 19C:
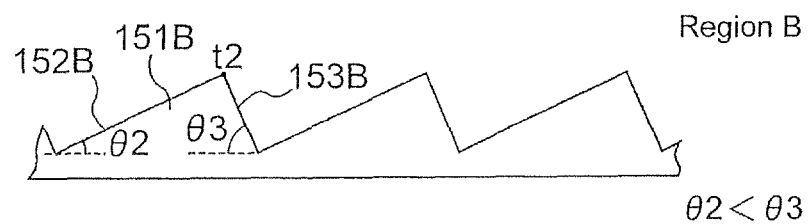
Figure 19D:
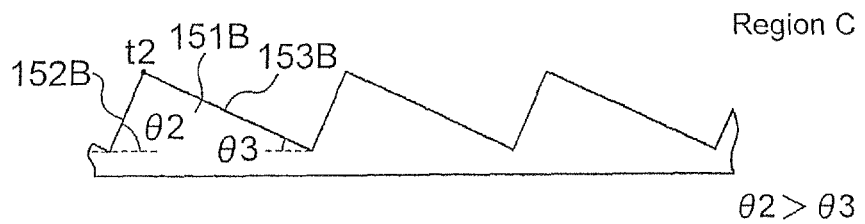

FIGS. 19A to 19D show a surface optical layer 15B in a modification of Third Embodiment. FIG. 19A shows a section parallel to the screen left-right direction of the reflection screen 10B, wherein a central area in the screen left-right direction is referred to as Region A, a right end area (as viewed from the observer O side) in the screen left-right direction is referred to as Region B, and a left end area is referred to as Region C. FIG. 19B shows a unit optical element 151B in Region A of the modification; FIG. 19C shows a unit optical element 151B in Region B of the modification; and FIG. 19D shows a unit optical element 151B in Region C of the modification. In FIGS. 19B to 19D, of the surface optical layer 15B in the modification, the sectional shape in a section which is parallel to the array direction of the unit optical elements 151B and parallel to the thickness direction of the reflection screen 10B is shown.

For instance, as shown in FIG. 19B, in Region A which is central in the screen left-right direction, the unit optical element 151B is roughly isosceles triangular in sectional shape.

As one goes rightward in the screen left-right direction as viewed from the observer O, the angle θ2 gradually decreases, whereas the angle θ3 gradually increases, and the apex t2 is gradually shifted toward the left side in the screen left-right direction as viewed from the observer O. Then, as shown in FIG. 19C, in Region B as the right end area in the screen left-right direction as viewed from the observer O, the sectional shape of the unit optical element 151B is a scalene triangle with a condition of θ2<θ3.

On the other hand, as one goes leftward in the screen left-right direction as viewed from the observer O, the angle θ2 gradually increases, whereas the angle θ3 gradually decreases, and the apex t2 is gradually shifted toward the right side in the screen left-right direction as viewed from the observer O. Then, as shown in FIG. 19D, in Region C as the left end area in the screen left-right direction as viewed from the observer O, the sectional shape of the unit optical element 151B is a scalene triangle with a condition of θ2>θ3.

Furthermore, the shapes of the unit optical elements 151B are symmetrical in the screen left-right direction, about a straight line which passes through the point A (the center of the screen) and extends along the screen up-down direction.

According to this modification of the present embodiment as above-mentioned, of course, a restraining effect on the reflection of images onto the ceiling can be obtained. In addition, in both end areas in the screen left-right direction, the image light is allowed to be incident on the slant surfaces 152B and 153B of the unit optical element 151B at a smaller incidence angle, as compared with the case of a reflection screen which does not have the unit optical elements 151B but has a flat surface on the image source side. Consequently, light can be efficiently incident on and guided into the reflection screen 10B.

Third Embodiment-2

Figure 20C:
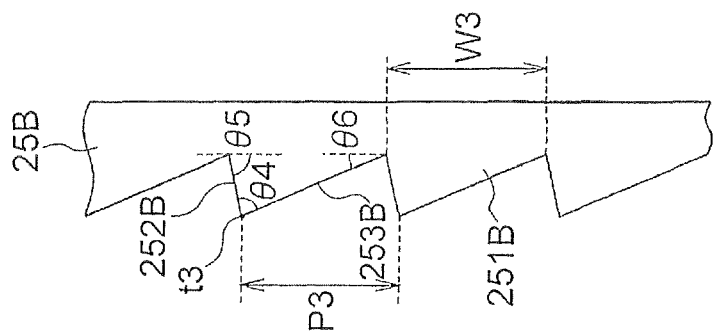
FIGS. 20A to 20C are figures for illustrating a reflection screen according to Third Embodiment-2.
Figure 20B:
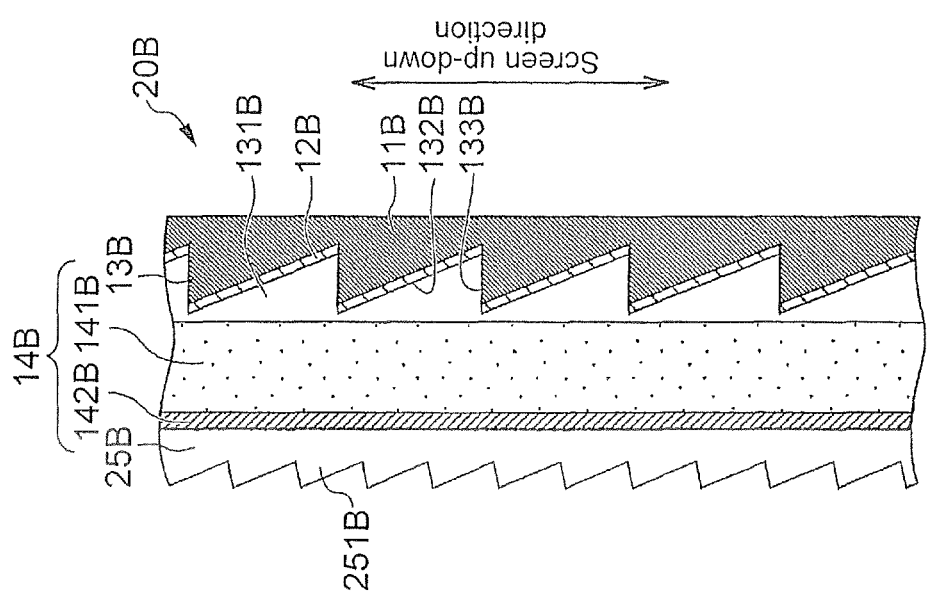
Figure 20A:
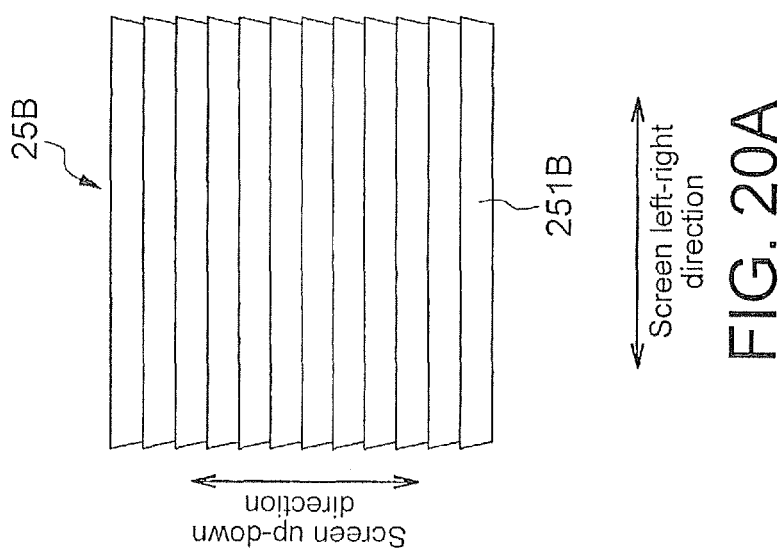

FIGS. 20A to 20C are figures for illustrating a reflection screen 20B according to Third Embodiment-2. FIG. 20A shows the reflection screen 20B as viewed from the side of a surface optical layer 25B; FIG. 20B illustrates the layer configuration of the reflection screen 20B of Third Embodiment-2; and FIG. 20C shows, in further enlarged form, the surface optical layer 25B in the section shown in FIG. 20B.

The reflection screen 20B of Third Embodiment-2 is configured in the same manner as the reflection screen 10B of Third Embodiment-1, except that the shape of unit optical elements 251B in the surface optical layer 25B differs from that in the reflection screen 10B of Third Embodiment-1. In view of this, those parts exhibiting the same functions as in Third Embodiment-1 described above are denoted by the same reference signs as used above or reference numerals with the same suffix as used above, and overlapping descriptions of those parts will be omitted appropriately.

The reflection screen 20B of Third Embodiment-2 includes a surface optical layer 25B, a base layer 14B, a lens layer 13B, a reflection layer 12B, and a protective layer 11B.

The reflection screen 20B of Third Embodiment-2 can be used for the image display system 1B shown in Third Embodiment-1 described above.

As shown in FIGS. 20A to 20C, the surface optical layer 25B has a plurality of unit optical elements 251B arrayed in the screen up-down direction, each of the unit optical elements 251B having a roughly triangular prism-like shape with its longitudinal direction set in the screen left-right direction.

The unit optical element 251B is substantially triangular in sectional shape in a section which is parallel to the screen up-down direction and parallel to the thickness direction. The unit optical element 251B has a surface 253B located on the screen up-down-directionally lower side relative to an apex t3 thereof, and a surface 252B located on the screen up-down-directionally upper side relative to the apex t3. In addition, in the unit optical element 251B, the apex angle is referred to as θ4, the angle that the surface 252B makes with a plane parallel to the screen plane is referred to as θ5, and the angle that the surface 253B makes with a plane parallel to the screen plane is referred to as θ6.

The unit optical elements 251B are so shaped that the sectional shape thereof in a section parallel to the array direction thereof and parallel to the thickness direction of the reflection screen 20B is a scalene triangle asymmetric in the screen up-down direction, wherein θ5>θ6.

In addition, the array pitch of the unit optical elements 251B is P3, and the width of each of the unit optical elements 251B in the array direction is W3. Here, the width W3 is equal to the array pitch P3.

Figure 21:
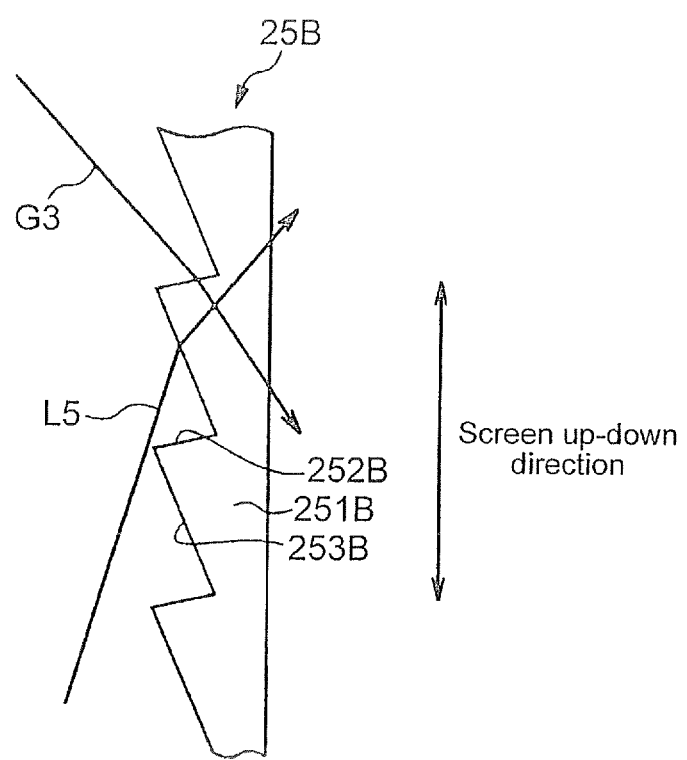
FIG. 21 is a figure for illustrating a function of a surface optical layer in Third Embodiment-2.

FIG. 21 is a figure for illustrating the function of the surface optical layer 25B in Third Embodiment-2. FIG. 21 illustrates how light (image light L5, extraneous light G3) is incident on the surface optical layer 25B in an upper screen area of the reflection screen 20B of the present embodiment.

As shown in FIG. 21, in an upper screen area of the reflection screen 20B, the image light L5 can be incident on the lower-side surface 253B of the unit optical element 251B at an incidence angle smaller than the incidence angle on a reflection screen which does not have the unit optical elements 251B but has a flat surface on the image source side. Therefore, the image light L5 can be efficiently incident on and guided through the surface 253B into the reflection screen 20B. Thus, the amount of light reflected on the surface of the reflection screen 20B toward the ceiling side can be much reduced.

In addition, the extraneous light G3 such as illumination light is incident on the upper-side surface 252B of each unit optical element 251B. Then, like the extraneous lights G1 and G2 described above, the extraneous light G3 is absorbed into the colored layer 142B, or absorbed into the protective layer 11B formed on the non-lens surface 133B of the unit lens 131B, or reflected by the reflection layer 12B toward a lower side. Therefore, the amount of extraneous light reaching the observer O side can be reduced greatly, so that the contrast of the image can be restrained from being lowered due to the extraneous light.

Accordingly, in the present embodiment, also, a favorable bright image can be displayed, and the reflection of the image onto the ceiling can be remarkably suppressed. Especially, in the present embodiment, the image light is efficiently incident on and guided into the reflection screen 20B, so that the amount of light reflected on the screen's surface toward the ceiling side can be greatly reduced.

In addition, the surface optical layer 25B is not complicated in shape, and is easy to produce. This allows the reflection screen 20B to be inexpensive and good in performance.

Furthermore, when the image light reflected by the reflection layer 12B outgoes from the reflection screen 20B, it is deflected in the screen up-down direction by the unit optical elements 251B. Therefore, the viewing angle in the screen up-down direction can be broadened, and, hence, the amount of the diffusing material to be used in the light diffusion layer 141B can be reduced.

Incidentally, the unit optical elements 251B may be configured to vary in their shape (the array pitch P2, and the angles θ4, θ5, θ6, etc.) along the array direction thereof.

In addition, in the present embodiment, for example in the case where the influence of extraneous light (e.g., illumination light) from above the screen is small, the sectional shape of the unit optical elements 251B may substantially be a scalene triangle (θ5=θ6), for example.

In that case, if the apex angle θ4 is 90°, the light reflected on the reflection layer 12B to go toward the observer side along the frontward with reference to the screen up-down direction may undergo total reflection on the slant surfaces 252B and 253B of the unit optical element 251B so as to go again toward the back side. Due to this phenomenon, the image may become darker. In view of this, the apex angle θ4 is preferably not 90°.

Besides, for example where the apex angle θ4 is an acute angle (0°<θ4<90°), the reflection of image light toward the ceiling side as described later can be restrained, but the frontal luminance tends to be somewhat lowered.

In addition, where the apex angle θ4 is an obtuse angle θ4>90°, the frontal luminance is enhanced as compared with the case of the obtuse angle, but the reflection of image light toward the ceiling side is somewhat strengthened.

Accordingly, in designing the apex angle θ4, it may be appropriately selected according to such factors as the environment in which the reflection screen 20B is used, the screen size of the same, and the desired optical performance.

In addition, the array pitch P3 of the unit optical elements 251B is preferably smaller than the array pitch P1 of the unit lenses 131B, from the viewpoint of suppression of moire or the like.

<Modifications>

The present invention is not to be restricted to the above-described embodiments, and various modifications and alteration are possible within the scope of the invention.

(1) The layer or layers located between the surface optical layer 15B (25B) and the reflection layer 12B in the thickness direction of the reflection screen 10B (20B) can be provided through appropriate selection, in conformity with the desired optical characteristics, the environment in which to use the reflection screen, etc.

For instance, the reflection screen 10B (20B) may be provided with a light-transmitting glass substrate, resin plate or the like, for maintaining the flatness of the reflection screen.

In addition, for example, the reflection screen 10B (20B) may include an anisotropic diffusion layer such that its diffusing action in the screen left-right direction is greater than its diffusing action in the screen up-down direction.

Figure 22:
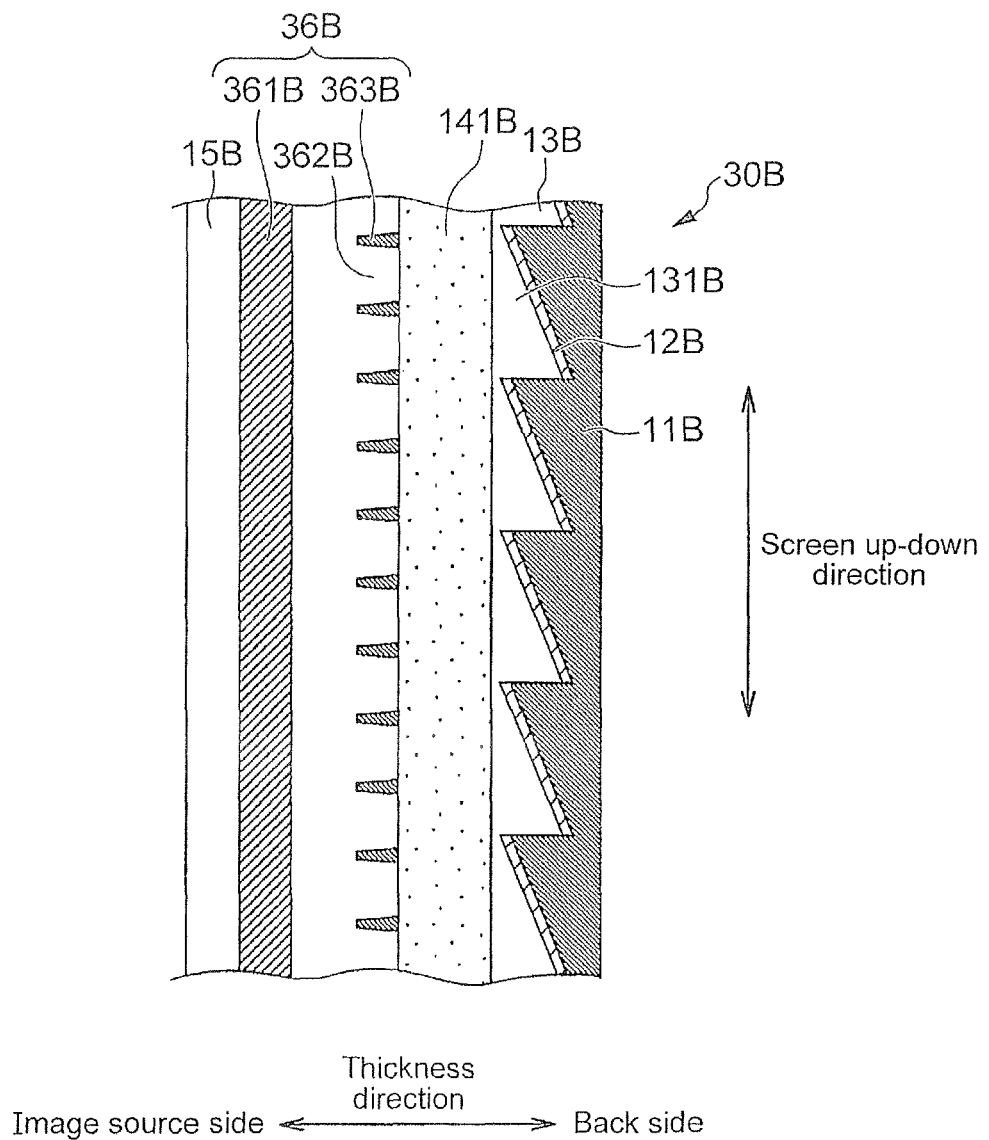
FIG. 22 is a figure for illustrating the layer configuration of a reflection screen according to a modification.

FIG. 22 illustrates the layer configuration of a reflection screen 30B according to a modification. FIG. 22 shows a section corresponding to the section shown in FIG. 15 described above.

In addition, like the reflection screen 30B shown in FIG. 22, a light control layer 36B may be provided between the surface optical layer 15B and the light diffusion layer 141B. The light control layer 36B is a layer including a support layer 361B, light transmission parts 362B, and light absorption parts 363B, and having a function of controlling the optical path for the image light and a function of absorbing part of stray light and extraneous light.

The support layer 361B is a layer serving as a base for forming the light transmission parts 362B. As the support layer 361B, there can be used a light-transmitting sheet-shaped member formed of PET resin, PC resin, acrylic resin or the like. In the modification shown in FIG. 22, the surface optical layer 15B is formed on the image source side of the support layer 361B, and the support layer 361B serves also as a base for the surface optical layer 15B. The support layer 36113 preferably contains a colorant and has a function as a colored layer 142B, from the viewpoint of enhancement of an extraneous light-absorbing effect and enhancement of screen quality in non-use state.

The light transmission parts 362B are integrally formed on the back side of the support layer 361B.

The light transmission parts 362B, having a light-transmitting property, are arrayed in plurality and mutually adjacently in the screen up-down direction, with their longitudinal direction set in the screen left-right direction. The sectional shape of each of the light transmission parts 362B in a section parallel to the array direction of these parts and parallel to the thickness direction of the reflection screen 30B is a roughly trapezoidal shape, as shown in FIG. 22.

The light transmission parts 362B are formed, for example, by use of an ionizing radiation-curing resin such as UV-curing resin.

The light absorption parts 363B are elements which are each formed at a valley portion between the light transmission parts 362B and have a light-absorbing action and an action of absorbing extraneous light, stray light, etc. As shown in FIG. 22, the light absorption part 363B is so shaped that the sectional shape thereof in a section parallel to the array direction thereof and parallel to the thickness direction of the reflection screen 30B is a roughly wedge-like shape. The wedge-like shape means a shape which is wide at one end thereof and is gradually narrowed along the direction toward the other end; thus, the wedge-like shape includes triangular shapes and trapezoidal shapes.

The light absorption parts 363B is formed, for example, by a method in which an ionizing radiation-curing resin such as a UV-curing resin containing light-absorbing particles is made to fill up the valley portions between the light transmission parts 362B by wiping (squeezing), followed by curing the resin.

The light-absorbing particles are preferably light-absorbing colored particles such as organic particulates colored with carbon black, graphite, metallic salt (e.g., black iron oxide), pigment, dye or the like, and colored glass beads, etc. Besides, as the light-absorbing particles, colored particles capable of selective absorption of light at a specified wavelength may be used in accordance with the characteristics of the image light.

The light transmission parts 362B shown in FIG. 22 are so configured that the width of each back-side end portion thereof in the screen up-down direction is smaller than each image-source-side end portion thereof. This configuration, however, is not restrictive. For instance, a configuration may also be adopted in which the width of each back-side end portion in the screen up-down direction is greater than the width of each image-source-side end portion. In this case, light transmission parts 362B and light absorption parts 363B may be formed on the image source side of the support layer 361B. Further, a configuration may be adopted in which the support layer 361B is omitted, and light transmission parts 362B and light absorption parts 363B are formed at the image-source-side surface of the light diffusion layer 141B.

The angle that the interface between the light transmission part 362B and the light absorption part 363B makes with the normal direction to the screen plane (the thickness direction of the screen) is preferably in the range from 0° to 20°.

In addition, the magnitude relationship between the refractive index Np of the light-transmitting parts 362B and the refractive index Nb of the light-absorbing parts 363B may be appropriately set according to the desired optical performance.

Such a light control layer 36B as above-mentioned may be provided, so as to control the viewing angle of the image light in the screen up-down direction, to effectively absorb extraneous light, or to contrive an enhanced contrast.

Incidentally, while an example in which the reflection screen 30B has the surface optical layer 15B has been shown in FIG. 22, this is not restrictive; for example, the reflection screen 30B may have the surface optical layer 25B.

(2) While an example has been described in which the surface optical layer 15B (25B) has the hard coating function and a function of reducing the reflection of images onto the ceiling, this is not restrictive. For example, an anti-reflection function, an anti-glare function, a UV-absorbing function, an anti-fouling function, an antistatic function, or the like may further be imparted to the surface optical layer 15B (25B) through appropriate selection. In that case, the surface optical layer 1513 (25B) may be provided with these function. Alternatively, a layer or layers having these functions may be provided as a separate layer or layers between the surface optical layer 15B (25B) and the base layer 1413. Furthermore, as the resin for forming the surface optical layer 15B (25B), a resin having the above-mentioned functions may be selected and used for the formation.

(3) The unit optical element 151B (251B) may have smooth surfaces or rough surfaces.

(4) The reflection layer 12B may be formed by a method wherein a white or silver-colored coating material, a UV-curing resin or thermoplastic resin containing a white or silver-colored pigment or beads or the like, a coating material containing particles or minute flakes obtained by pulverizing a vapor-deposited metallic film, metallic foil or the like based on silver, aluminum or the like is applied by any of various coating methods such as spray coating, die coating, screen printing, groove filling by wiping, etc., followed by curing.

In addition, the reflection layer 12B may be formed also on the non-lens surfaces 133B. In that case, a configuration may be adopted in which the reflection layer 12B fills up the valley portions between the unit lenses 131B and has a back-side surface formed to be substantially flat. Alternatively, the reflection layer 12B may be formed in a predetermined thickness along the rugged (recessed-and-projected) shape of the unit lenses 131B. Further, the reflection layer 12B may not necessarily be uniform in thickness, insofar as it has sufficient reflection characteristics.

(5) The unit lens 131B may be so configured that the sectional shape thereof is, for example, a roughly trapezoidal shape having a lens surface 132B and a non-lens surface 133B which are opposed to each other, with an apex surface (not shown) parallel to the screen plane being interposed therebetween. In this instance, the apex surface is preferably formed in such a region as not to contribute to reflection of image light. On the apex surface, there may be formed a protective layer 11B or a reflection layer 12B.

In addition, the unit lens 131B may be so shaped that part of the lens surface 132B and the non-lens surface 133B is in a curved line shape in the section shown in FIG. 15, etc. Further, at least one of the lens surface 132B and the non-lens surface 133B may be composed of a plurality of surfaces.

(6) The colored layer 142B may contain a diffusing material. Besides, a configuration may be adopted in which the base layer 14B is a single layer and contains a diffusing material together with a colorant such as pigment or dye.

In addition, a configuration may be adopted in which the light diffusion layer 141B and the colored layer 142B are formed as separate layers, and are integrally bonded to each other by a pressure sensitive adhesive or the like (not shown).

(7) The reflection screen 10B (20B) may have a configuration in which, for example, the support plate 50B is omitted and the screen is bonded to a wall surface or the like through a pressure sensitive adhesive or the like. Alternatively, the screen may, with the support plate 50B bonded to the back side thereof, be secured to a wall surface. Further, the screen may be suspended on a wall surface through a support member or members such as hooks.

Besides, the reflection screen 10B (20B) may be so configured that it can be rolled up and be stored in a rolled form when not used. In such a configuration, the support plate 50 or the like may be omitted, and the back side of the reflection screen 10B (20B) may be covered with a light-transmission reducing fabric- or resin-made light-blocking screen or a scratch-resistant layer or the like.

(8) In the above description, an example has been shown in which the surface optical layer 15B (25B) and the lens layer 13B are formed from a UV-curing resin, and are integrally formed on respective surfaces of the base layer 14B by a UV molding method or the like. However, this is not restrictive. For instance, the surface optical layer 15B (25B) and the lens layer 13B may be formed by extrusion, injection molding or the like using a thermoplastic resin or the like.

(9) The image source LS may be located on the vertically upper side relative to the reflection screen 10B (20B) so that the image light L is projected onto the reflection screen 10B (20B) from obliquely above. In that case, it suffices for the reflection screen 10B (20B) to have a configuration wherein the shapes of the surface optical layer 15B (25B) and the lens layer 13B shown in FIGS. 15, 16A, 16B, 20A to 20C and the like are inverted upside down.

Incidentally, the above-described embodiments and modifications may be used in an appropriate combination, of which detailed description is omitted. Besides, the present invention is not to be restricted by the above-described embodiments.

What is claimed is:

1. A reflection screen adapted to reflect image light projected from an image source to display an image in a viewable manner, the reflection screen comprising:
    a reflection layer provided on a back side of the reflection screen, the reflection layer adapted to reflect light; and
    a surface shape layer provided on the reflection screen on the side of the image source relative to the reflection layer, the surface shape layer having a plurality of unit optical shapes arrayed at a surface on the image source side, the surface shape layer adapted to deflect the image light toward the reflection layer side;
    wherein the unit optical shapes each have a sectional shape in section in a direction orthogonal to a screen plane in a direction where the unit optical shapes are arrayed, the sectional shape being a substantially triangular shape protuberant toward the image source side;
    wherein the unit optical shapes each have an incidence surface on which the light is incident, and a total reflection surface on which at least part of the light coming from the incidence surface is totally reflected to go toward the back side; and
    wherein the unit optical shape satisfies, in the section, the relationship of:

$$\alpha + 2\phi - \theta > 90°,$$

where $\theta$ is an angle that the total reflection surface makes with a plane parallel to the screen plane,
    $\phi$ is an angle that the incidence surface makes with a normal direction to the screen plane, and
    $\alpha$ is an angle that the light incident on the incidence surface makes with the normal direction to the screen plane.

2. The reflection screen according to claim 1,
    wherein the reflection screen includes at least one layer having at least one function selected from among a light-diffusing function, a light-absorbing function, and a light-transmitting function, between the reflection layer and the surface shape layer.

3. An image display system comprising:
    the reflection screen according to claim 1; and
    an image source adapted to project image light onto the reflection screen.

* * * * *